(12) United States Patent
Isogawa et al.

(10) Patent No.: US 10,286,258 B2
(45) Date of Patent: May 14, 2019

(54) GOLF BALL

(71) Applicant: DUNLOP SPORTS CO. LTD., Kobe-shi, Hyogo (JP)

(72) Inventors: Kazuhiko Isogawa, Kobe (JP); Kosuke Tachibana, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 482 days.

(21) Appl. No.: 13/872,487

(22) Filed: Apr. 29, 2013

(65) Prior Publication Data

US 2013/0324316 A1    Dec. 5, 2013

(30) Foreign Application Priority Data

May 30, 2012 (JP) .................. 2012-122590
May 30, 2012 (JP) .................. 2012-123074

(51) Int. Cl.
*A63B 37/00* (2006.01)
*A63B 37/02* (2006.01)
(Continued)

(52) U.S. Cl.
CPC ...... *A63B 37/0054* (2013.01); *A63B 37/0092* (2013.01); *C08K 5/0025* (2013.01);
(Continued)

(58) Field of Classification Search
CPC ........ C08K 5/0025; C08K 5/09; C08K 5/098; A63B 37/0051; A63B 37/0072; A63B 37/0076; A63B 37/0075; A63B 37/06
See application file for complete search history.

(56) References Cited

U.S. PATENT DOCUMENTS 4,688,801 A * 8/1987 Reiter .................. C08F 279/02
                                                     473/372
5,116,060 A * 5/1992 Sullivan et al. ............. 473/372
(Continued)

FOREIGN PATENT DOCUMENTS

EP    1 068 883 A2    1/2001
JP    61-37178 A      2/1986
(Continued)

OTHER PUBLICATIONS

Handbook of Chemistry and Physics 63rd Edition—p. C-386.*

*Primary Examiner* — John E Simms, Jr.
(74) *Attorney, Agent, or Firm* — Birch, Stewart, Kolasch & Birch LLP

(57) ABSTRACT

A golf ball 2 includes a core 4, a first mid layer 6, a second mid layer 8, and a cover 12. The core 4 includes a center 18 and an envelope layer 20. The center 18 is formed by crosslinking a first rubber composition, and the envelope layer 20 is formed by crosslinking a second rubber composition. The first rubber composition or the second rubber composition includes a base rubber, a co-crosslinking agent, a crosslinking initiator, and an acid and/or a salt. The co-crosslinking agent is:
(1) an α,β-unsaturated carboxylic acid having 3 to 8 carbon atoms; and/or
(2) a metal salt of an α,β-unsaturated carboxylic acid having 3 to 8 carbon atoms.
A hardness Hm2 of the second mid layer 8 is greater than a hardness Hm1 of the first mid layer 6. The hardness Hm2 is greater than a hardness Hc of the cover 12.

11 Claims, 4 Drawing Sheets

(51) Int. Cl.
   C08K 5/00     (2006.01)
   C08K 5/09     (2006.01)
   C08K 5/098    (2006.01)
   *A63B 37/06*      (2006.01)

(52) U.S. Cl.
   CPC .............. C08K 5/09 (2013.01); C08K 5/098
         (2013.01); *A63B 37/0076* (2013.01); *A63B*
         *37/06* (2013.01); *C08K 2201/014* (2013.01)

(56) References Cited

U.S. PATENT DOCUMENTS

| | | | |
|---|---|---|---|
| 5,403,010 | A | 4/1995 | Yabuki et al. |
| 5,716,293 | A * | 2/1998 | Yabuki ............... A63B 37/0003 273/DIG. 22 |
| 5,779,562 | A * | 7/1998 | Melvin et al. ................. 473/373 |
| 5,980,396 | A | 11/1999 | Moriyama et al. |
| 6,468,169 | B1 | 10/2002 | Hayashi et al. |
| 7,244,192 | B2 * | 7/2007 | Fujisawa ................ C08K 5/098 473/351 |
| 7,344,455 | B1 | 3/2008 | Higuchi |
| 2003/0144425 | A1 | 7/2003 | Mano et al. |
| 2005/0137344 | A1 | 6/2005 | Voorheis |
| 2005/0164809 | A1 | 7/2005 | Watanabe et al. |
| 2006/0135287 | A1 | 6/2006 | Kennedy, III et al. |
| 2006/0178231 | A1 | 8/2006 | Kasashima |
| 2006/0229143 | A1 * | 10/2006 | Watanabe .......... A63B 37/0004 473/378 |
| 2006/0229414 | A1 | 10/2006 | Nanba et al. |
| 2007/0173607 | A1 | 7/2007 | Kennedy, III et al. |
| 2007/0202965 | A1 * | 8/2007 | Shindo et al. ................. 473/351 |
| 2007/0265113 | A1 * | 11/2007 | Hirau et al. ................... 473/376 |
| 2008/0194357 | A1 | 8/2008 | Higuchi |
| 2008/0194358 | A1 | 8/2008 | Higuchi |
| 2008/0194359 | A1 | 8/2008 | Higuchi et al. |
| 2008/0214324 | A1 | 9/2008 | Nanba et al. |
| 2008/0214325 | A1 | 9/2008 | Higuchi et al. |
| 2008/0312008 | A1 | 12/2008 | Higuchi et al. |
| 2009/0036231 | A1 * | 2/2009 | Nanba et al. .................. 473/373 |
| 2009/0036236 | A1 * | 2/2009 | Nanba et al. .................. 473/376 |
| 2009/0111608 | A1 * | 4/2009 | Watanabe et al. ............. 473/373 |
| 2009/0111610 | A1 * | 4/2009 | Watanabe et al. ............. 473/373 |
| 2009/0124757 | A1 | 5/2009 | Shindo et al. |
| 2010/0069175 | A1 | 3/2010 | Kamino et al. |
| 2010/0160087 | A1 | 6/2010 | Nakamura et al. ........... 473/375 |
| 2010/0273575 | A1 * | 10/2010 | Watanabe .......... A63B 37/0003 473/373 |
| 2011/0053709 | A1 * | 3/2011 | Comeau ............. A63B 37/0003 473/376 |
| 2011/0159998 | A1 | 6/2011 | Ohama et al. |
| 2011/0306443 | A1 * | 12/2011 | Matsuyama et al. ......... 473/376 |
| 2012/0010021 | A1 | 1/2012 | Fushihara et al. |
| 2013/0131242 | A1 * | 5/2013 | Ozawa .................... C08K 5/405 524/216 |
| 2013/0131277 | A1 * | 5/2013 | Ozawa .................... C08K 5/098 525/288 |

FOREIGN PATENT DOCUMENTS

| | | |
|---|---|---|
| JP | 10-179798 A | 7/1998 |
| JP | 2003-164546 A | 6/2003 |
| JP | 2005-177511 A | 7/2005 |
| JP | 2006-346014 A | 12/2006 |
| JP | 2007-222622 A | 9/2007 |
| JP | 2008-194532 A | 8/2008 |
| JP | 2011-136021 A | 7/2011 |
| JP | 2011-254974 A | 12/2011 |
| JP | 2012-19820 A | 2/2012 |

* cited by examiner

GOLF BALL

This application claims priority on Patent Application No. 2012-123074 filed in JAPAN on May 30, 2012 and Patent Application No. 2012-122590 filed in JAPAN on May 30, 2012. The entire contents of these Japanese Patent Applications are hereby incorporated by reference.

BACKGROUND OF THE INVENTION

Field of the Invention

The present invention relates to golf balls. Specifically, the present invention relates to golf balls that include a core having a two-layer structure, a mid layer, and a cover.

Description of the Related Art

Golf players' foremost requirement for golf balls is flight performance. In particular, golf players place importance on flight performance upon a shot with a driver. Flight performance correlates with the resilience performance of a golf ball. When a golf ball having excellent resilience performance is hit, the golf ball flies at a high speed, thereby achieving a large flight distance. Golf balls that include a core having excellent resilience performance are disclosed in JP61-37178, JP2008-212681 (US2008/0214324), JP2008-523952 (US2006/0135287 and US2007/0173607), and JP2009-119256 (US2009/0124757).

The core disclosed in JP61-37178 is obtained from a rubber composition that includes a co-crosslinking agent and a crosslinking activator. This publication discloses palmitic acid, stearic acid, and myristic acid as the crosslinking activator.

The core disclosed in JP2008-212681 is obtained from a rubber composition that includes an organic peroxide, a metal salt of an $\alpha,\beta$-unsaturated carboxylic acid, and a copper salt of a fatty acid.

The core disclosed in JP2008-523952 is obtained from a rubber composition that includes a metal salt of an unsaturated monocarboxylic acid, a free radical initiator, and a non-conjugated diene monomer.

The core disclosed in JP2009-119256 is obtained from a rubber composition that includes a polybutadiene whose vinyl content is equal to or less than 2%, whose cis 1,4-bond content is equal to or greater than 80%, and which has an active end modified with an alkoxysilane compound.

An appropriate trajectory height is required in order to achieve a large flight distance. A trajectory height depends on a spin rate and a launch angle. With a golf ball that achieves a high trajectory by a high spin rate, a flight distance is insufficient. With a golf ball that achieves a high trajectory by a high launch angle, a large flight distance is obtained. Use of an outer-hard/inner-soft structure in a golf ball can achieve a low spin rate and a high launch angle. Modifications regarding a hardness distribution of a core are disclosed in JP6-154357 (U.S. Pat. No. 5,403,010), JP2008-194471 (U.S. Pat. No. 7,344,455, US2008/0194358, US2008/0194359, and US2008/0214325), and JP2008-194473 (US2008/0194357 and US2008/0312008).

In the core disclosed in JP6-154357, a JIS-C hardness H1 at the central point of the core is 58 to 73, a JIS-C hardness H2 in a region that extends over a distance range from equal to or greater than 5 mm to equal to or less than 10 mm from the central point is equal to or greater than 65 but equal to or less than 75, a JIS-C hardness H3 at a point located at a distance of 15 mm from the central point is equal to or greater than 74 but equal to or less than 82, and a JIS-C hardness H4 at the surface of the core is equal to or greater than 76 but equal to or less than 84. The hardness H2 is greater than the hardness H1, the hardness H3 is greater than the hardness H2, and the hardness H4 is equal to or greater than the hardness H3.

In the core disclosed in JP2008-194471, a Shore D hardness at the central point of the core is equal to or greater than 30 but equal to or less than 48, a Shore D hardness at a point located at a distance of 4 mm from the central point is equal to or greater than 34 but equal to or less than 52, a Shore D hardness at a point located at a distance of 8 mm from the central point is equal to or greater than 40 but equal to or less than 58, a Shore D hardness at a point located at a distance of 12 mm from the central point is equal to or greater than 43 but equal to or less than 61, a Shore D hardness in a region that extends over a distance range from equal to or greater than 2 mm to equal to or less than 3 mm from the surface of the core is equal to or greater than 36 but equal to or less than 54, and a Shore D hardness at the surface is equal to or greater than 41 but equal to or less than 59.

In the core disclosed in JP2008-194473, a Shore D hardness at the central point of the core is equal to or greater than 25 but equal to or less than 45, a Shore D hardness in a region that extends over a distance range from equal to or greater than 5 mm to equal to or less than 10 mm from the central point is equal to or greater than 39 but equal to or less than 58, a Shore D hardness at a point located at a distance of 15 mm from the central point is equal to or greater than 36 but equal to or less than 55, and a Shore D hardness at the surface of the core is equal to or greater than 55 but equal to or less than 75.

JP2010-253268 (US2010/0273575) discloses a golf ball that includes a core, an envelope layer, a mid layer, and a cover. In the core, the hardness gradually increases from the central point of the core to the surface of the core. The difference between a JIS-C hardness at the surface and a JIS-C hardness at the central point is equal to or greater than 15. The hardness of the cover is greater than the hardness of the mid layer, and the hardness of the mid layer is greater than the hardness of the envelope layer.

Golf players also place importance on spin performance of golf balls. When a backspin rate is high, the run is short. It is easy for golf players to cause a golf ball, to which backspin is easily provided, to stop at a target point. When a sidespin rate is high, the golf ball tends to curve. It is easy for golf players to intentionally cause a golf ball, to which sidespin is easily provided, to curve. A golf ball to which spin is easily provided has excellent controllability. In particular, advanced golf players place importance on controllability upon a shot with a short iron.

Golf players' requirements for flight distance and controllability have been escalated more than ever. An object of the present invention is to provide a golf ball having excellent flight performance, excellent controllability, and excellent durability. Another object of the present invention is to provide a golf ball having excellent flight performance and excellent controllability.

SUMMARY OF THE INVENTION

A golf ball according to the present invention includes a core, a first mid layer positioned outside the core, a second mid layer positioned outside the first mid layer, and a cover positioned outside the second mid layer. The core includes a center and an envelope layer positioned outside the center. The center is formed by a first rubber composition being crosslinked. The envelope layer is formed by a second rubber composition being crosslinked. The first rubber composition and/or the second rubber composition includes:
(a) a base rubber;
(b) a co-crosslinking agent;
(c) a crosslinking initiator; and
(d) an acid and/or a salt.

The co-crosslinking agent (b) is:
(b-1) an $\alpha,\beta$-unsaturated carboxylic acid having 3 to 8 carbon atoms; and/or
(b-2) a metal salt of an $\alpha,\beta$-unsaturated carboxylic acid having 3 to 8 carbon atoms.

A Shore D hardness Hm2 of the second mid layer is greater than a Shore D hardness Hm1 of the first mid layer. The Shore D hardness Hm2 of the second mid layer is greater than a Shore D hardness Hc of the cover. In the golf ball according to the present invention, a hardness distribution is appropriate. When the golf ball is hit, the energy loss is low in the golf ball. When the golf ball is hit with a driver, the spin rate is low. The low spin rate achieves a large flight distance. When the golf ball is hit with a short iron, the spin rate is high. The golf ball has excellent controllability. In addition, the golf ball has excellent durability.

According to another aspect, a golf ball according to the present invention includes a core, a mid layer positioned outside the core, and a cover positioned outside the mid layer. The core includes a center and an envelope layer positioned outside the center. The center is formed by a rubber composition being crosslinked. The rubber composition includes:
(a) a base rubber;
(b) a co-crosslinking agent;
(c) a crosslinking initiator; and
(d) an acid and/or a salt.

The co-crosslinking agent (b) is:
(b1) an $\alpha,\beta$-unsaturated carboxylic acid having 3 to 8 carbon atoms; or
(b2) a metal salt of an $\alpha,\beta$-unsaturated carboxylic acid having 3 to 8 carbon atoms.

A Shore D hardness Hm of the mid layer is greater than a Shore D hardness Hc of the cover. In the golf ball according to the present invention, a hardness distribution of the center is appropriate. When the golf ball is hit, the energy loss is low in the center. When the golf ball is hit with a driver, the spin rate is low. The low spin rate achieves a large flight distance. When the golf ball is hit with a short iron, the spin rate is high. The golf ball has excellent controllability.

DESCRIPTION OF THE PREFERRED EMBODIMENTS

The following will describe in detail the present invention, based on preferred embodiments with reference to the accompanying drawings.

First Embodiment

Figure 1:
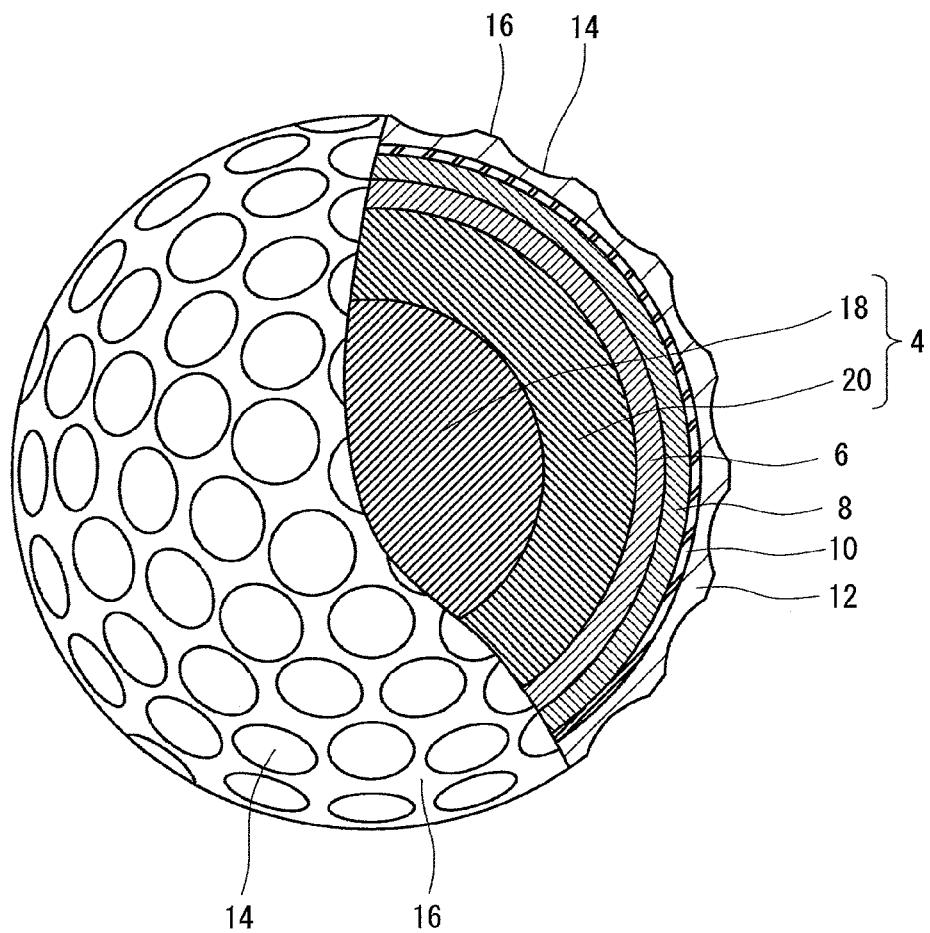
FIG. 1 is a partially cutaway cross-sectional view of a golf ball according to a first embodiment of the present invention.

A golf ball 2 shown in FIG. 1 includes a spherical core 4, a first mid layer 6 positioned outside the core 4, a second mid layer 8 positioned outside the first mid layer 6, a reinforcing layer 10 positioned outside the second mid layer 8, and a cover 12 positioned outside the reinforcing layer 10. On the surface of the cover 12, a large number of dimples 14 are formed. Of the surface of the golf ball 2, a part other than the dimples 14 is a land 16. The golf ball 2 includes a paint layer and a mark layer on the external side of the cover 12, but these layers are not shown in the drawing.

The golf ball 2 has a diameter of 40 mm or greater but 45 mm or less. From the standpoint of conformity to the rules established by the United States Golf Association (USGA), the diameter is preferably equal to or greater than 42.67 mm. In light of suppression of air resistance, the diameter is preferably equal to or less than 44 mm and more preferably equal to or less than 42.80 mm. The golf ball 2 has a weight of 40 g or greater but 50 g or less. In light of attainment of great inertia, the weight is preferably equal to or greater than 44 g and more preferably equal to or greater than 45.00 g. From the standpoint of conformity to the rules established by the USGA, the weight is preferably equal to or less than 45.93 g.

The core 4 preferably has a diameter of 33.0 mm or greater but 42.0 mm or less. The core 4 having a diameter of 33.0 mm or greater can achieve excellent resilience performance of the golf ball 2. In this respect, the diameter is more preferably equal to or greater than 35.0 mm and particularly preferably equal to or greater than 37.0 mm. In the golf ball 2 that includes the core 4 having a diameter of 42.0 mm or less, the first mid layer 6, the second mid layer 8, and the cover 12 can have sufficient thicknesses. The golf ball 2 that includes the first mid layer 6, the second mid layer 8, and the cover 12 which have large thicknesses have excellent durability. In this respect, the diameter is more preferably equal to or less than 41.0 mm and particularly preferably equal to or less than 40.0 mm.

Figure 2:
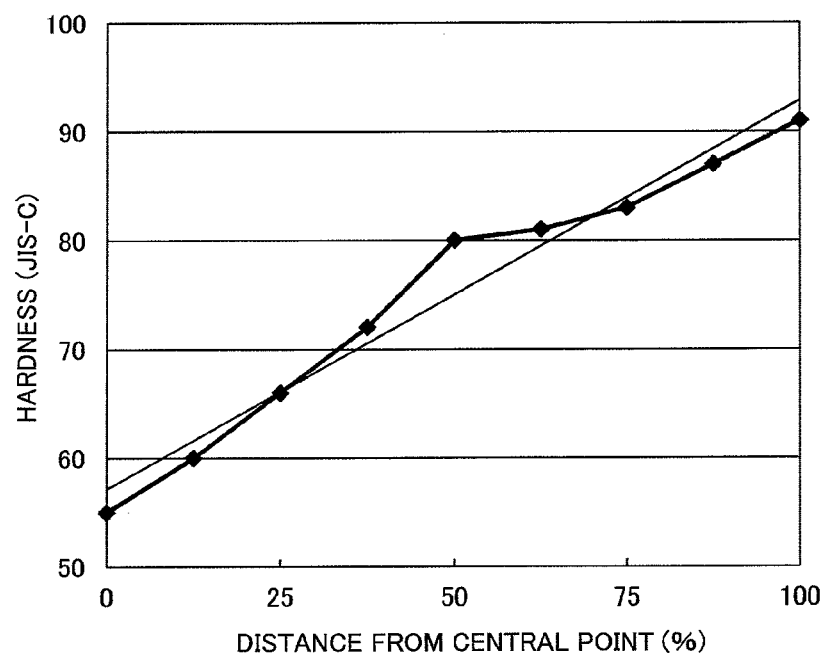
FIG. 2 is a line graph showing a hardness distribution of a core of the golf ball in FIG. 1.

FIG. 2 is a line graph showing a hardness distribution of the core 4 of the golf ball 2 in FIG. 1. The horizontal axis of the graph indicates the ratio (%) of a distance from the central point of the core 4 to the radius of the core 4. The vertical axis of the graph indicates a JIS-C hardness. Nine measuring points obtained by dividing a region from the central point of the core 4 to the surface of the core 4 at intervals of 12.5% of the radius of the core 4 are plotted in the graph. The ratio of the distance from the central point of the core 4 to each of these measuring points to the radius of the core 4 is as follows.

First point: 0.0% (central point)
Second point: 12.5%
Third point: 25.0%
Fourth point: 37.5%
Fifth point: 50.0%
Sixth point: 62.5%
Seventh point: 75.0%
Eighth point: 87.5%
Ninth point: 100.0% (surface)

Hardnesses at the first to eighth points are measured by pressing a JIS-C type hardness scale against a cut plane of the core 4 that has been cut into two halves. A hardness at the ninth point is measured by pressing the JIS-C type hardness scale against the surface of the spherical core 4. For the measurement, an automated rubber hardness measurement machine (trade name "P1", manufactured by Kobunshi Keiki Co., Ltd.), to which this hardness scale is mounted, is used. In the present invention, a JIS-C hardness at a measuring point whose distance from the central point of the core 4 is x (%) is represented by H(x). The hardness at the central point of the core 4 is represented by H(0). The hardness at the ninth point, namely, the hardness at the surface of the core 4, is represented by H(100).

FIG. 2 also shows a linear approximation curve obtained by a least-square method on the basis of the distances and the hardnesses of the nine measuring points. As is clear from FIG. 2, the broken line does not greatly deviate from the linear approximation curve. In other words, the broken line has a shape close to the linear approximation curve. In the core 4, the hardness linearly increases from its central point toward its surface. When the golf ball 2 is hit with a driver, the energy loss is low in the core 4. The golf ball 2 has excellent resilience performance. When the golf ball 2 is hit with a driver, the flight distance is large. When the golf ball 2 is hit with a golf club, stress concentration does not occur. Thus, the golf ball 2 has excellent durability.

In the core 4, $R^2$ of the linear approximation curve obtained by the least-square method is preferably equal to or greater than 0.95. $R^2$ is an index indicating the linearity of the broken line. For the core 4 for which $R^2$ is equal to or greater than 0.95, the shape of the broken line of the hardness distribution is close to a straight line. The golf ball 2 that includes the core 4 for which $R^2$ is equal to or greater than 0.95 has excellent resilience performance. $R^2$ is more preferably equal to or greater than 0.96 and particularly preferably equal to or greater than 0.97. $R^2$ is calculated by squaring a correlation coefficient R. The correlation coefficient R is calculated by dividing the covariance of the distance (%) from the central point and the hardness (JIS-C) by the standard deviation of the distance (%) from the central point and the standard deviation of the hardness (JIS-C).

In light of suppression of spin, the gradient a of the linear approximation curve is preferably equal to or greater than 0.30, more preferably equal to or greater than 0.33, and particularly preferably equal to or greater than 0.35.

In the golf ball 2, the difference (H(100)–H(0)) between the surface hardness H(100) and the central hardness H(0) is preferably equal to or greater than 15. The core 4 in which the difference (H(100)–H(0)) is equal to or greater than 15 has an outer-hard/inner-soft structure. When the golf ball 2 is hit with a driver, the recoil (torsional return) in the core 4 is great, and thus spin is suppressed. The core 4 contributes to the flight performance of the golf ball 2. In light of flight performance, the difference (H(100)–H(0)) is more preferably equal to or greater than 23 and particularly preferably equal to or greater than 24. From the standpoint that the core 4 can easily be formed, the difference (H(100)–H(0)) is preferably equal to or less than 50. In the core 4, the hardness gradually increases from its central point toward its surface.

The central hardness H(0) is preferably equal to or greater than 40 but equal to or less than 70. The golf ball 2 having a hardness H(0) of 40 or greater has excellent resilience performance. In this respect, the hardness H(0) is more preferably equal to or greater than 45 and particularly preferably equal to or greater than 50. In the core 4 having a hardness H(0) of 70 or less, an outer-hard/inner-soft structure can be achieved. In the golf ball 2 that includes the core 4, spin can be suppressed. In this respect, the hardness H(0) is more preferably equal to or less than 65 and particularly preferably equal to or less than 60.

The surface hardness H(100) is preferably equal to or greater than 80 but equal to or less than 96. In the core 4 having a hardness H(100) of 80 or greater, an outer-hard/inner-soft structure can be achieved. In the golf ball 2 that includes the core 4, spin can be suppressed. In this respect, the hardness H(100) is more preferably equal to or greater than 82 and particularly preferably equal to or greater than 84. The golf ball 2 having a hardness H(100) of 96 or less has excellent durability. In this respect, the hardness H(100) is more preferably equal to or less than 94 and particularly preferably equal to or less than 92.

In the golf ball 2, the core 4 includes a spherical center 18 and an envelope layer 20. The envelope layer 20 is positioned outside the center 18.

In the golf ball 2, the center 18 is more flexible than the envelope layer 20. The center 18 can suppress spin.

The center 18 preferably has a diameter of 18.0 mm or greater but 30.0 mm or less. In the golf ball 2 that includes the center 18 having a diameter of 18.0 mm or greater, spin can be suppressed. In this respect, the diameter is more preferably equal to or greater than 20.0 mm and particularly preferably equal to or greater than 22.0 mm. The golf ball 2 that includes the center 18 having a diameter of 30.0 mm or less has excellent resilience performance. In this respect, the diameter is more preferably equal to or less than 27.0 mm and particularly preferably equal to or less than 25.0 mm.

The envelope layer 20 is harder than the center 18. When the golf ball 2 is hit with a driver, the energy loss is low in the envelope layer 20. The envelope layer 20 can contribute to the resilience performance of the golf ball 2. When the golf ball 2 is hit with a driver, the flight distance is large.

In the golf ball 2, the ratio of the radius of the center 18 to the radius of the core 4 is preferably equal to or greater than 40% but equal to or less than 85%. In the golf ball 2 in which the ratio is equal to or greater than 40%, spin is suppressed. In this respect, the ratio is preferably equal to or greater than 50%. The golf ball 2 in which the ratio is equal to or less than 85% has excellent resilience performance. In this respect, the ratio is more preferably equal to or less than 70%. When the golf ball 2 is hit with a driver, the flight distance is large.

The center 18 is formed by crosslinking a first rubber composition. The first rubber composition includes:
(1a) a base rubber;
(1b) a co-crosslinking agent;
(1c) a crosslinking initiator; and
(1d) an acid and/or a salt.

Examples of the base rubber (1a) include polybutadienes, polyisoprenes, styrene-butadiene copolymers, ethylene-propylene-diene copolymers, and natural rubbers. In light of resilience performance, polybutadienes are preferred. When a polybutadiene and another rubber are used in combination, it is preferred that the polybutadiene is included as a principal component. Specifically, the proportion of the polybutadiene to the entire base rubber is preferably equal to or greater than 50% by weight and more preferably equal to or greater than 80% by weight. The proportion of cis-1,4 bonds in the polybutadiene is preferably equal to or greater than 40% by weight and more preferably equal to or greater than 80% by weight.

A polybutadiene in which the proportion of 1,2-vinyl bonds is equal to or less than 2.0% by weight is preferred. The polybutadiene can contribute to the resilience performance of the golf ball 2. In this respect, the proportion of 1,2-vinyl bonds is preferably equal to or less than 1.7% by weight and particularly preferably equal to or less than 1.5% by weight.

From the standpoint that a polybutadiene having a low proportion of 1,2-vinyl bonds and excellent polymerization activity is obtained, a rare-earth-element-containing catalyst is preferably used for synthesis of a polybutadiene. In particular, a polybutadiene synthesized with a catalyst containing neodymium, which is a lanthanum-series rare earth element compound, is preferred.

The polybutadiene has a Mooney viscosity ($ML_{1+4}$ (100° C.)) of preferably 30 or greater, more preferably 32 or greater, and particularly preferably 35 or greater. The Mooney viscosity ($ML_{1+4}$(100° C.)) is preferably equal to or less than 140, more preferably equal to or less than 120, even more preferably equal to or less than 100, and particularly preferably equal to or less than 80. The Mooney viscosity ($ML_{1+4}$(100° C.)) is measured according to the standards of "JIS K6300". The measurement conditions are as follows.

Rotor: L rotor
Preheating time: 1 minute
Rotating time of rotor: 4 minutes
Temperature: 100° C.

In light of workability, the polybutadiene has a molecular weight distribution (Mw/Mn) of preferably 2.0 or greater, more preferably 2.2 or greater, even more preferably 2.4 or greater, and particularly preferably 2.6 or greater. In light of resilience performance, the molecular weight distribution (Mw/Mn) is preferably equal to or less than 6.0, more preferably equal to or less than 5.0, even more preferably equal to or less than 4.0, and particularly preferably equal to or less than 3.4. The molecular weight distribution (Mw/Mn) is calculated by dividing the weight average molecular weight Mw by the number average molecular weight Mn.

The molecular weight distribution is measured by gel permeation chromatography ("HLC-8120GPC" manufactured by Tosoh Corporation). The measurement conditions are as follows.

Detector: differential refractometer
Column: GMHHXL (manufactured by Tosoh Corporation)
Column temperature: 40° C.
Mobile phase: tetrahydrofuran The molecular weight distribution is calculated as a value obtained by conversion using polystyrene standard.

The co-crosslinking agent (1b) is:
(1b-1) an α,β-unsaturated carboxylic acid having 3 to 8 carbon atoms; and/or
(1b-2) a metal salt of an α,β-unsaturated carboxylic acid having 3 to 8 carbon atoms.

The first rubber composition may include only the α,β-unsaturated carboxylic acid (1b-1) or only the metal salt (1b-2) of the α,β-unsaturated carboxylic acid as the co-crosslinking agent (1b). The first rubber composition may include both the α,β-unsaturated carboxylic acid (1b-1) and the metal salt (1b-2) of the α,β-unsaturated carboxylic acid as the co-crosslinking agent (1b).

The metal salt (1b-2) of the α,β-unsaturated carboxylic acid graft-polymerizes with the molecular chain of the base rubber, thereby crosslinking the rubber molecules. When the first rubber composition includes the α,β-unsaturated carboxylic acid (1b-1), the first rubber composition preferably further includes a metal compound (1f). The metal compound (1f) reacts with the α,β-unsaturated carboxylic acid (1b-1) in the first rubber composition. A salt obtained by this reaction graft-polymerizes with the molecular chain of the base rubber.

Examples of the metal compound (1f) include metal hydroxides such as magnesium hydroxide, zinc hydroxide, calcium hydroxide, sodium hydroxide, lithium hydroxide, potassium hydroxide, and copper hydroxide; metal oxides such as magnesium oxide, calcium oxide, zinc oxide, and copper oxide; and metal carbonates such as magnesium carbonate, zinc carbonate, calcium carbonate, sodium carbonate, lithium carbonate, and potassium carbonate. A compound that includes a bivalent metal is preferred. The compound that includes the bivalent metal reacts with the co-crosslinking agent (1b) to form metal crosslinks. The metal compound (1f) is particularly preferably a zinc compound. Two or more metal compounds may be used in combination.

Examples of the α,β-unsaturated carboxylic acid include acrylic acid, methacrylic acid, fumaric acid, maleic acid, and crotonic acid. Examples of the metal component in the metal salt (1b-2) of the α,β-unsaturated carboxylic acid include sodium ion, potassium ion, lithium ion, magnesium ion, calcium ion, zinc ion, barium ion, cadmium ion, aluminum ion, tin ion, and zirconium ion. The metal salt (1b-2) of the α,β-unsaturated carboxylic acid may include two or more types of ions. From the standpoint that metal crosslinks are likely to occur between the rubber molecules, bivalent metal ions such as magnesium ion, calcium ion, zinc ion, barium ion, and cadmium ion are preferred. The metal salt (1b-2) of the α,β-unsaturated carboxylic acid is particularly preferably zinc acrylate.

In light of resilience performance of the golf ball 2, the amount of the co-crosslinking agent (1b) is preferably equal to or greater than 15 parts by weight and particularly preferably equal to or greater than 20 parts by weight, per 100 parts by weight of the base rubber. In light of feel at impact, the amount is preferably equal to or less than 50 parts by weight, more preferably equal to or less than 45 parts by weight, and particularly preferably equal to or less than 40 parts by weight, per 100 parts by weight of the base rubber.

The crosslinking initiator (1c) is preferably an organic peroxide. The organic peroxide contributes to the resilience performance of the golf ball 2. Examples of preferable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. In light of versatility, dicumyl peroxide is preferred.

In light of resilience performance of the golf ball 2, the amount of the crosslinking initiator (1c) is preferably equal to or greater than 0.2 parts by weight and particularly preferably equal to or greater than 0.5 parts by weight, per 100 parts by weight of the base rubber. In light of feel at impact and durability of the golf ball 2, the amount is preferably equal to or less than 5.0 parts by weight and particularly preferably equal to or less than 2.5 parts by weight, per 100 parts by weight of the base rubber.

In the present invention, the co-crosslinking agent (1b) is not included in the concept of the acid and/or the salt (1d). It is inferred that as described later, during heating and forming of the core 4, the acid and/or the salt (1d) breaks the metal crosslinks by the co-crosslinking agent (1b).

Examples of the acid and/or the salt (1d) include oxo acids, such as carboxylic acids, sulfonic acids, and phosphoric acid, and salts thereof; and hydroacids, such as hydrochloric acid and hydrofluoric acid, and salts thereof. Oxo acids and/or salts thereof are preferred. A carboxylic acid and/or a salt thereof (1d-1) is more preferred. Carboxylates are particularly preferred.

The carboxylic acid component of the carboxylic acid and/or the salt thereof (1d-1) has a carboxyl group. The carboxylic acid component reacts with the co-crosslinking agent (1b). It is inferred that by this reaction, metal crosslinks are broken.

The carbon number of the carboxylic acid component of the carboxylic acid and/or the salt thereof (1d-1) is preferably equal to or greater than 1 but equal to or less than 30, more preferably equal to or greater than 3 but equal to or less than 30, and even more preferably equal to or greater than 5 but equal to or less than 28. Examples of the carboxylic acid include aliphatic carboxylic acids (fatty acids) and aromatic carboxylic acids. As the carboxylic acid and/or the salt thereof (1*d*-1), a fatty acid and/or a salt thereof is preferred. The carbon number of the fatty acid component of the fatty acid and/or the salt thereof is preferably equal to or greater than 1 but equal to or less than 30.

The first rubber composition may include a saturated fatty acid and/or a salt thereof, or may include an unsaturated fatty acid and/or a salt thereof. The saturated fatty acid and/or the salt thereof is preferred.

Examples of fatty acids include butyric acid (C4), valeric acid (C5), caproic acid (C6), enanthic acid (C7), caprylic acid (octanoic acid) (C8), pelargonic acid (C9), capric acid (decanoic acid) (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linolic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30). Two or more fatty acids may be used in combination. Octanoic acid, lauric acid, myristic acid, palmitic acid, stearic acid, oleic acid, and behenic acid are preferred.

An aromatic carboxylic acid has an aromatic ring and a carboxyl group. Examples of aromatic carboxylic acids include benzoic acid, phthalic acid, isophthalic acid, terephthalic acid, hemimellitic acid (benzene-1,2,3-tricarboxylic acid), trimellitic acid (benzene-1,2,4-tricarboxylic acid), trimesic acid (benzene-1,3,5-tricarboxylic acid), mellophanic acid (benzene-1,2,3,4-tetracarboxylic acid), prehnitic acid (benzene-1,2,3,5-tetracarboxylic acid), pyromellitic acid (benzene-1,2,4,5-tetracarboxylic acid), mellitic acid (benzene hexacarboxylic acid), diphenic acid (biphenyl-2,2'-dicarboxylic acid), toluic acid (methylbenzoic acid), xylic acid, prehnitylic acid (2,3,4-trimethylbenzoic acid), γ-isodurylic acid (2,3,5-trimethylbenzoic acid), durylic acid (2,4,5-trimethylbenzoic acid), β-isodurylic acid (2,4,6-trimethylbenzoic acid), α-isodurylic acid (3,4,5-trimethylbenzoic acid), cuminic acid (4-isopropylbenzoic acid), uvitic acid (5-methylisophthalic acid), α-toluic acid (phenylacetic acid), hydratropic acid (2-phenylpropanoic acid), and hydrocinnamic acid (3-phenylpropanoic acid).

The first rubber composition may include an aromatic carboxylate substituted with a hydroxyl group, an alkoxy group, or an oxo group. Specific examples of this carboxylic acid can include salicylic acid (2-hydroxybenzoic acid), anisic acid (methoxybenzoic acid), cresotinic acid (hydroxy(methyl)benzoic acid), o-homosalicylic acid (2-hydroxy-3-methylbenzoic acid), m-homosalicylic acid (2-hydroxy-4-methylbenzoic acid), p-homosalicylic acid (2-hydroxy-5-methylbenzoic acid), o-pyrocatechuic acid (2,3-dihydroxybenzoic acid), β-resorcylic acid (2,4-dihydroxybenzoic acid), γ-resorcylic acid (2,6-dihydroxybenzoic acid), protocatechuic acid (3,4-dihydroxybenzoic acid), α-resorcylic acid (3,5-dihydroxybenzoic acid), vanillic acid (4-hydroxy-3-methoxybenzoic acid), isovanillic acid (3-hydroxy-4-methoxybenzoic acid), veratric acid (3,4-dimethoxybenzoic acid), o-veratric acid (2,3-dimethoxybenzoic acid), orsellinic acid (2,4-dihydroxy-6-methylbenzoic acid), m-hemipinic acid (4,5-dimethoxyphthalic acid), gallic acid (3,4,5-trihydroxybenzoic acid), syringic acid (4-hydroxy-3,5-dimethoxybenzoic acid), asaronic acid (2,4,5-trimethoxybenzoic acid), mandelic acid (hydroxy(phenyl)acetic acid), vanillylmandelic acid (hydroxy(4-hydroxy-3-methoxyphenyl)acetic acid), homoanisic acid ((4-methoxyphenyl)acetic acid), homogentisic acid ((2,5-dihydroxyphenyl)acetic acid), homoprotocatechuic acid ((3,4-dihydroxyphenyl)acetic acid), homovanillic acid ((4-hydroxy-3-methoxyphenyl)acetic acid), homoisovanillic acid ((3-hydroxy-4-methoxyphenyl)acetic acid), homoveratric acid ((3,4-dimethoxyphenyl)acetic acid), o-homoveratric acid ((2,3-dimethoxyphenyl)acetic acid), homophthalic acid (2-(carboxymethyl)benzoic acid), homoisophthalic acid (3-(carboxymethyl)benzoic acid), homoterephthalic acid (4-(carboxymethyl)benzoic acid), phthalonic acid (2-(carboxycarbonyl)benzoic acid), isophthalonic acid (3-(carboxycarbonyl)benzoic acid), terephthalonic acid (4-(carboxycarbonyl)benzoic acid), benzilic acid (hydroxydiphenylacetic acid), atrolactic acid (2-hydroxy-2-phenylpropanoic acid), tropic acid (3-hydroxy-2-phenylpropanoic acid), melilotic acid (3-(2-hydroxyphenyl)propanoic acid), phloretic acid (3-(4-hydroxyphenyl)propanoic acid), hydrocaffeic acid (3-(3,4-dihydroxyphenyl)propanoic acid), hydroferulic acid (3-(4-hydroxy-3-methoxyphenyl)propanoic acid), hydroisoferulic acid (3-(3-hydroxy-4-methoxyphenyl)propanoic acid), p-coumaric acid (3-(4-hydroxyphenyl)acrylic acid), umbellic acid (3-(2,4-dihydroxyphenyl)acrylic acid), caffeic acid (3-(3,4-dihydroxyphenyl)acrylic acid), ferulic acid (3-(4-hydroxy-3-methoxyphenyl)acrylic acid), isoferulic acid (3-(3-hydroxy-4-methoxyphenyl)acrylic acid), and sinapic acid (3-(4-hydroxy-3,5-dimethoxyphenyl)acrylic acid).

The cationic component of the carboxylate is a metal ion or an organic cation. Examples of the metal ion include sodium ion, potassium ion, lithium ion, silver ion, magnesium ion, calcium ion, zinc ion, barium ion, cadmium ion, copper ion, cobalt ion, nickel ion, manganese ion, aluminum ion, iron ion, tin ion, zirconium ion, and titanium ion. Two or more types of ions may be used in combination.

The organic cation is a cation having a carbon chain. Examples of the organic cation include organic ammonium ions. Examples of organic ammonium ions include primary ammonium ions such as stearylammonium ion, hexylammonium ion, octylammonium ion, and 2-ethylhexylammonium ion; secondary ammonium ions such as dodecyl(lauryl) ammonium ion, and octadecyl(stearyl) ammonium ion; tertiary ammonium ions such as trioctylammonium ion; and quaternary ammonium ions such as dioctyldimethylammonium ion, and distearyldimethylammonium ion. Two or more types of organic cations may be used in combination.

Examples of preferable carboxylates include a potassium salt, a magnesium salt, an aluminum salt, a zinc salt, an iron salt, a copper salt, a nickel salt, or a cobalt salt of octanoic acid, lauric acid, myristic acid, palmitic acid, stearic acid, oleic acid, or behenic acid. Zinc salts of carboxylic acids are particularly preferred. Specific examples of preferable zinc salts of carboxylic acids include zinc octoate, zinc laurate, zinc myristate, and zinc stearate. A particularly preferable zinc salt of a carboxylic acid is zinc octoate.

In light of linearity of the hardness distribution of the core 4, the amount of the acid and/or the salt (1*d*) is preferably equal to or greater than 0.5 parts by weight, more preferably equal to or greater than 1.0 parts by weight, and particularly preferably equal to or greater than 2.0 parts by weight, per 100 parts by weight of the base rubber. In light of resilience performance, the amount is preferably equal to or less than 45 parts by weight, more preferably equal to or less than 40 parts by weight, and particularly preferably equal to or less than 30 parts by weight, per 100 parts by weight of the base rubber.

The weight ratio of the co-crosslinking agent (1b) and the acid and/or the salt (1d) in the first rubber composition is preferably equal to or greater than 3/7 but equal to or less than 9/1. From the first rubber composition in which this weight ratio is within the above range, the center 18 whose hardness linearly increases from its inside toward its outside can be obtained.

As the co-crosslinking agent (1b), zinc acrylate is preferably used. Zinc acrylate whose surface is coated with stearic acid or zinc stearate for the purpose of improving dispersibility to rubber is present. In the present invention, when the first rubber composition includes this zinc acrylate, this coating material is not included in the concept of the acid and/or the salt (1d).

Preferably, the first rubber composition further includes an organic sulfur compound (1e). The organic sulfur compound (1e) increases the linearity of the hardness distribution of the core 4. In addition, the organic sulfur compound (1e) increases the degree of the outer-hard/inner-soft structure.

An example of the organic sulfur compound (1e) is an organic compound having a thiol group or a polysulfide linkage having 2 to 4 sulfur atoms. A metal salt of this organic compound is also included in the organic sulfur compound (1e). Examples of the organic sulfur compound (1e) include aliphatic compounds such as aliphatic thiols, aliphatic thiocarboxylic acids, aliphatic dithiocarboxylic acids, and aliphatic polysulfides; heterocyclic compounds; alicyclic compounds such as alicyclic thiols, alicyclic thiocarboxylic acids, alicyclic dithiocarboxylic acids, and alicyclic polysulfides; and aromatic compounds. Specific examples of the organic sulfur compound (1e) include thiophenols, thionaphthols, polysulfides, thiocarboxylic acids, dithiocarboxylic acids, sulfenamides, thiurams, dithiocarbamates, and thiazoles. Preferable organic sulfur compounds (1e) are thiophenols, diphenyl disulfides, thionaphthols, thiuram disulfides, and metal salts thereof.

Specific examples of the organic sulfur compound (1e) are represented by the following chemical formulas (1) to (4).

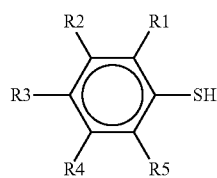

(1)

In the chemical formula (1), R1 to R5 each represent H or a substituent.

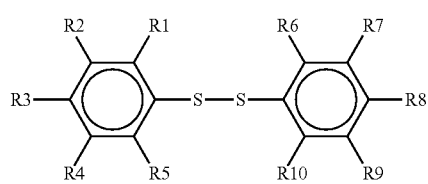

(2)

In the chemical formula (2), R1 to R10 each represent H or a substituent.

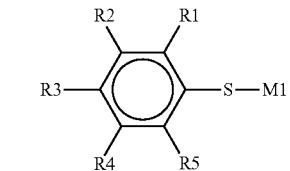

(3)

In the chemical formula (3), R1 to R5 each represent H or a substituent, and M1 represents a monovalent metal atom.

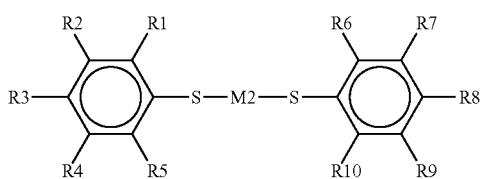

(4)

In the chemical formula (4), R1 to R10 each represent H or a substituent, and M2 represents a bivalent metal atom.

In the formulas (1) to (4), each substituent is at least one group selected from the group consisting of a halogen group (F, Cl, Br, I), an alkyl group, a carboxyl group (—COOH), an ester (—COOR) of a carboxyl group, a formyl group (—CHO), an acyl group (—COR), a carbonyl halide group (—COX), a sulfo group (—SO$_3$H), an ester (—SO$_3$R) of a sulfo group, a sulfonyl halide group (—SO$_2$X), a sulfino group (—SO$_2$H), an alkylsulfinyl group (—SOR), a carbamoyl group (—CONH$_2$), an alkyl halide group, a cyano group (—CN), and an alkoxy group (—OR).

Examples of the organic sulfur compound (1e) represented by the chemical formula (1) include thiophenol; thiophenols substituted with halogen groups, such as 4-fluorothiophenol, 2,5-difluorothiophenol, 2,4,5-trifluorothiophenol, 2,4,5,6-tetrafluorothiophenol, pentafluorothiophenol, 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol, 4-bromothiophenol, 2,5-dibromothiophenol, 2,4,5-tribromothiophenol, 2,4,5,6-tetrabromothiophenol, pentabromothiophenol, 4-iodothiophenol, 2,5-diiodothiophenol, 2,4,5-triiodothiophenol, 2,4,5,6-tetraiodothiophenol, and pentaiodothiophenol; thiophenols substituted with alkyl groups, such as 4-methylthiophenol, 2,4,5-trimethylthiophenol, pentamethylthiophenol, 4-t-butylthiophenol, 2,4,5-tri-t-butylthiophenol, and penta-t-butylthiophenol; thiophenols substituted with carboxyl groups, such as 4-carboxythiophenol, 2,4,6-tricarboxythiophenol, and pentacarboxythiophenol; thiophenols substituted with alkoxycarbonyl groups, such as 4-methoxycarbonylthiophenol, 2,4,6-trimethoxycarbonylthiophenol, and pentamethoxycarbonylthiophenol; thiophenols substituted with formyl groups, such as 4-formylthiophenol, 2,4,6-triformylthiophenol, and pentaformylthiophenol; thiophenols substituted with acyl groups, such as 4-acetylthiophenol, 2,4,6-triacetylthiophenol, and pentaacetylthiophenol; thiophenols substituted with carbonyl halide groups, such as 4-chlorocarbonylthiophenol, 2,4,6-tri(chlorocarbonyl)thiophenol, and penta(chlorocarbonyl)thiophenol; thiophenols substituted with sulfo groups, such as 4-sulfothiophenol, 2,4,6-trisulfothiophenol, and pentasulfothiophenol; thiophenols substituted with alkoxysulfonyl groups, such as 4-methoxysulfonylthiophenol, 2,4,6-trimethoxysulfonylthiophenol, and pentamethoxysulfonylthiophenol; thiophenols substituted with sulfonyl halide groups, such as 4-chlorosulfonylthiophenol, 2,4,6-tri(chlorosulfonyl)thiophenol, and penta(chlorosulfonyl)thiophenol; thiophenols substituted with sulfino groups, such as 4-sulfinothiophenol, 2,4,6-trisulfinothiophenol, and pentasulfinothiophenol; thiophenols substituted with alkylsulfinyl groups, such as 4-methylsulfinylthiophenol, 2,4,6-tri(methylsulfinyl)thiophenol, and penta(methylsulfinyl)thiophenol; thiophenols substituted with carbamoyl groups, such as 4-carbamoylthiophenol, 2,4,6-tricarbamoylthiophenol, and pentacarbamoylthiophenol; thiophenols substituted with alkyl halide groups, such as 4-trichloromethylthiophenol, 2,4,6-tri(trichloromethyl)thiophenol, and penta(trichloromethyl)thiophenol; thiophenols substituted with cyano groups, such as 4-cyanothiophenol, 2,4,6-tricyanothiophenol, and pentacyanothiophenol; and thiophenols substituted with alkoxy groups, such as 4-methoxythiophenol, 2,4,6-trimethoxythiophenol, and pentamethoxythiophenol. Each of these thiophenols is substituted with one type of substituent.

Another example of the organic sulfur compound (1e) represented by the chemical formula (1) is a compound substituted with at least one type of the above substituents and another substituent. Examples of the other substituent include a nitro group (—NO$_2$), an amino group (—NH$_2$), a hydroxyl group (—OH), and a phenylthio group (—SPh). Specific examples of the compound include 4-chloro-2-nitrothiophenol, 4-chloro-2-aminothiophenol, 4-chloro-2-hydroxythiophenol, 4-chloro-2-phenylthiothiophenol, 4-methyl-2-nitrothiophenol, 4-methyl-2-aminothiophenol, 4-methyl-2-hydroxythiophenol, 4-methyl-2-phenylthiothiophenol, 4-carboxy-2-nitrothiophenol, 4-carboxy-2-aminothiophenol, 4-carboxy-2-hydroxythiophenol, 4-carboxy-2-phenylthiothiophenol, 4-methoxycarbonyl-2-nitrothiophenol, 4-methoxycarbonyl-2-aminothiophenol, 4-methoxycarbonyl-2-hydroxythiophenol, 4-methoxycarbonyl-2-phenylthiothiophenol, 4-formyl-2-nitrothiophenol, 4-formyl-2-aminothiophenol, 4-formyl-2-hydroxythiophenol, 4-formyl-2-phenylthiothiophenol, 4-acetyl-2-nitrothiophenol, 4-acetyl-2-aminothiophenol, 4-acetyl-2-hydroxythiophenol, 4-acetyl-2-phenylthiothiophenol, 4-chlorocarbonyl-2-nitrothiophenol, 4-chlorocarbonyl-2-aminothiophenol, 4-chlorocarbonyl-2-hydroxythiophenol, 4-chlorocarbonyl-2-phenylthiothiophenol, 4-sulfo-2-nitrothiophenol, 4-sulfo-2-aminothiophenol, 4-sulfo-2-hydroxythiophenol, 4-sulfo-2-phenylthiothiophenol, 4-methoxysulfonyl-2-nitrothiophenol, 4-methoxysulfonyl-2-aminothiophenol, 4-methoxysulfonyl-2-hydroxythiophenol, 4-methoxysulfonyl-2-phenylthiothiophenol, 4-chlorosulfonyl-2-nitrothiophenol, 4-chlorosulfonyl-2-aminothiophenol, 4-chlorosulfonyl-2-hydroxythiophenol, 4-chlorosulfonyl-2-phenylthiothiophenol, 4-sulfino-2-nitrothiophenol, 4-sulfino-2-aminothiophenol, 4-sulfino-2-hydroxythiophenol, 4-sulfino-2-phenylthiothiophenol, 4-methylsulfinyl-2-nitrothiophenol, 4-methylsulfinyl-2-aminothiophenol, 4-methylsulfinyl-2-hydroxythiophenol, 4-methylsulfinyl-2-phenylthiothiophenol, 4-carbamoyl-2-nitrothiophenol, 4-carbamoyl-2-aminothiophenol, 4-carbamoyl-2-hydroxythiophenol, 4-carbamoyl-2-phenylthiothiophenol, 4-trichloromethyl-2-aminothiophenol, 4-trichloromethyl-2-hydroxythiophenol, 4-trichloromethyl-2-phenylthiothiophenol, 4-cyano-2-nitrothiophenol, 4-cyano-2-aminothiophenol, 4-cyano-2-hydroxythiophenol, 4-cyano-2-phenylthiothiophenol, 4-methoxy-2-nitrothiophenol, 4-methoxy-2-aminothiophenol, 4-methoxy-2-hydroxythiophenol, and 4-methoxy-2-phenylthiothiophenol.

Still another example of the organic sulfur compound (1e) represented by the chemical formula (1) is a compound substituted with two or more types of substituents. Specific examples of the compound include 4-acetyl-2-chlorothiophenol, 4-acetyl-2-methylthiophenol, 4-acetyl-2-carboxythiophenol, 4-acetyl-2-methoxycarbonylthiophenol, 4-acetyl-2-formylthiophenol, 4-acetyl-2-chlorocarbonylthiophenol, 4-acetyl-2-sulfothiophenol, 4-acetyl-2-methoxysulfonylthiophenol, 4-acetyl-2-chlorosulfonylthiophenol, 4-acetyl-2-sulfinothiophenol, 4-acetyl-2-methylsulfinylthiophenol, 4-acetyl-2-carbamoylthiophenol, 4-acetyl-2-trichloromethylthiophenol, 4-acetyl-2-cyanothiophenol, and 4-acetyl-2-methoxythiophenol.

Examples of the organic sulfur compound (1e) represented by the chemical formula (2) include diphenyl disulfide; diphenyl disulfides substituted with halogen groups, such as bis(4-fluorophenyl)disulfide, bis(2,5-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl) disulfide, bis(2,4,5-trichlorophenyl)disulfide, bis(2,4,5,6-tetrachlorophenyl)disulfide, bis(pentachlorophenyl) disulfide, bis(4-bromophenyl)disulfide, bis(2,5-dibromophenyl)disulfide, bis(2,4,5-tribromophenyl) disulfide, bis(2,4,5,6-tetrabromophenyl)disulfide, bis (pentabromophenyl)disulfide, bis(4-iodophenyl)disulfide, bis(2,5-diiodophenyl)disulfide, bis(2,4,5-triiodophenyl)disulfide, bis(2,4,5,6-tetraiodophenyl)disulfide, and bis(pentaiodophenyl)disulfide; diphenyl disulfides substituted with alkyl groups, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide; diphenyl disulfides substituted with carboxyl groups, such as bis(4-carboxyphenyl)disulfide, bis(2,4,6-tricarboxyphenyl) disulfide, and bis(pentacarboxyphenyl)disulfide; diphenyl disulfides substituted with alkoxycarbonyl groups, such as bis(4-methoxycarbonylphenyl)disulfide, bis(2,4,6-trimethoxycarbonylphenyl)disulfide, and bis(pentamethoxycarbonylphenyl)disulfide; diphenyl disulfides substituted with formyl groups, such as bis(4-formylphenyl)disulfide, bis(2,4,6-triformylphenyl)disulfide, and bis(pentaformylphenyl)disulfide; diphenyl disulfides substituted with acyl groups, such as bis(4-acetylphenyl)disulfide, bis(2,4,6-triacetylphenyl)disulfide, and bis(pentaacetylphenyl)disulfide; diphenyl disulfides substituted with carbonyl halide groups, such as bis(4-chlorocarbonylphenyl)disulfide, bis(2,4,6-tri (chlorocarbonyl)phenyl)disulfide, and bis(penta(chlorocarbonyl)phenyl)disulfide; diphenyl disulfides substituted with sulfo groups, such as bis(4-sulfophenyl)disulfide, bis(2,4,6-trisulfophenyl)disulfide, and bis(pentasulfophenyl)disulfide; diphenyl disulfides substituted with alkoxysulfonyl groups, such as bis(4-methoxysulfonylphenyl)disulfide, bis(2,4,6-trimethoxysulfonylphenyl)disulfide, and bis(pentamethoxysulfonylphenyl)disulfide; diphenyl disulfides substituted with sulfonyl halide groups, such as bis(4-chlorosulfonylphenyl)disulfide, bis(2,4,6-tri(chlorosulfonyl)phenyl)disulfide, and bis(penta(chlorosulfonyl)phenyl)disulfide; diphenyl disulfides substituted with sulfino groups, such as bis (4-sulfinophenyl)disulfide, bis(2,4,6-trisulfinophenyl) disulfide, and bis(pentasulfinophenyl)disulfide; diphenyl disulfides substituted with alkylsulfinyl groups, such as bis(4-methylsulfinylphenyl)disulfide, bis(2,4,6-tri(methylsulfinyl)phenyl)disulfide, and bis(penta(methylsulfinyl)phenyl)disulfide; diphenyl disulfides substituted with carbamoyl groups, such as bis(4-carbamoylphenyl)disulfide, bis(2,4,6-tricarbamoylphenyl)disulfide, and bis(pentacarbamoylphenyl)disulfide; diphenyl disulfides substituted with alkyl halide groups, such as bis(4-trichloromethylphenyl)disulfide, bis(2,4,6-tri(trichloromethyl)phenyl)disulfide, and bis(penta(trichloromethyl)phenyl)disulfide; diphenyl disulfides substituted with cyano groups, such as bis(4-cyanophenyl)disulfide, bis(2,4,6-tricyanophenyl)disulfide, and bis(pentacyanophenyl)disulfide; and diphenyl disulfides substituted with alkoxy groups, such as bis(4-methoxyphenyl)disulfide, bis(2,4,6-trimethoxyphenyl)disulfide, and bis(pentamethoxyphenyl)disulfide. Each of these diphenyl disulfides is substituted with one type of substituent.

Another example of the organic sulfur compound (1e) represented by the chemical formula (2) is a compound substituted with at least one type of the above substituents and another substituent. Examples of the other substituent include a nitro group (—NO$_2$), an amino group (—NH$_2$), a hydroxyl group (—OH), and a phenylthio group (—SPh). Specific examples of the compound include bis(4-chloro-2-nitrophenyl)disulfide, bis(4-chloro-2-aminophenyl)disulfide, bis(4-chloro-2-hydroxyphenyl)disulfide, bis(4-chloro-2-phenylthiophenyl)disulfide, bis(4-methyl-2-nitrophenyl)disulfide, bis(4-methyl-2-aminophenyl)disulfide, bis(4-methyl-2-hydroxyphenyl)disulfide, bis(4-methyl-2-phenylthiophenyl)disulfide, bis(4-carboxy-2-nitrophenyl)disulfide, bis(4-carboxy-2-aminophenyl)disulfide, bis(4-carboxy-2-hydroxyphenyl)disulfide, bis(4-carboxy-2-phenylthiophenyl)disulfide, bis(4-methoxycarbonyl-2-nitrophenyl)disulfide, bis(4-methoxycarbonyl-2-aminophenyl)disulfide, bis(4-methoxycarbonyl-2-hydroxyphenyl)disulfide, bis(4-methoxycarbonyl-2-phenylthiophenyl)disulfide, bis(4-formyl-2-nitrophenyl)disulfide, bis(4-formyl-2-aminophenyl)disulfide, bis(4-formyl-2-hydroxyphenyl)disulfide, bis(4-formyl-2-phenylthiophenyl)disulfide, bis(4-acetyl-2-nitrophenyl)disulfide, bis(4-acetyl-2-aminophenyl)disulfide, bis(4-acetyl-2-hydroxyphenyl)disulfide, bis(4-acetyl-2-phenylthiophenyl)disulfide, bis(4-chlorocarbonyl-2-nitrophenyl)disulfide, bis(4-chlorocarbonyl-2-aminophenyl)disulfide, bis(4-chlorocarbonyl-2-hydroxyphenyl)disulfide, bis(4-chlorocarbonyl-2-phenylthiophenyl)disulfide, bis(4-sulfo-2-nitrophenyl)disulfide, bis(4-sulfo-2-aminophenyl)disulfide, bis(4-sulfo-2-hydroxyphenyl)disulfide, bis(4-sulfo-2-phenylthiophenyl)disulfide, bis(4-methoxysulfonyl-2-nitrophenyl)disulfide, bis(4-methoxysulfonyl-2-aminophenyl)disulfide, bis(4-methoxysulfonyl-2-hydroxyphenyl)disulfide, bis(4-methoxysulfonyl-2-phenylthiophenyl)disulfide, bis(4-chlorosulfonyl-2-nitrophenyl)disulfide, bis(4-chlorosulfonyl-2-aminophenyl)disulfide, bis(4-chlorosulfonyl-2-hydroxyphenyl)disulfide, bis(4-chlorosulfonyl-2-phenylthiophenyl)disulfide, bis(4-sulfino-2-nitrophenyl)disulfide, bis(4-sulfino-2-aminophenyl)disulfide, bis(4-sulfino-2-hydroxyphenyl)disulfide, bis(4-sulfino-2-phenylthiophenyl)disulfide, bis(4-methylsulfinyl-2-nitrophenyl)disulfide, bis(4-methylsulfinyl-2-aminophenyl)disulfide, bis(4-methylsulfinyl-2-hydroxyphenyl)disulfide, bis(4-methylsulfinyl-2-phenylthiophenyl)disulfide, bis(4-carbamoyl-2-nitrophenyl)disulfide, bis(4-carbamoyl-2-aminophenyl)disulfide, bis(4-carbamoyl-2-hydroxyphenyl)disulfide, bis(4-carbamoyl-2-phenylthiophenyl)disulfide, bis(4-trichloromethyl-2-nitrophenyl)disulfide, bis(4-trichloromethyl-2-aminophenyl)disulfide, bis(4-trichloromethyl-2-hydroxyphenyl)disulfide, bis(4-trichloromethyl-2-phenylthiophenyl)disulfide, bis(4-cyano-2-nitrophenyl)disulfide, bis(4-cyano-2-aminophenyl)disulfide, bis(4-cyano-2-hydroxyphenyl)disulfide, bis(4-cyano-2-phenylthiophenyl)disulfide, bis(4-methoxy-2-nitrophenyl)disulfide, bis(4-methoxy-2-aminophenyl)disulfide, bis(4-methoxy-2-hydroxyphenyl)disulfide, and bis(4-methoxy-2-phenylthiophenyl)disulfide.

Still another example of the organic sulfur compound (1e) represented by the chemical formula (2) is a compound substituted with two or more types of substituents. Specific examples of the compound include bis(4-acetyl-2-chlorophenyl)disulfide, bis(4-acetyl-2-methylphenyl)disulfide, bis(4-acetyl-2-carboxyphenyl)disulfide, bis(4-acetyl-2-methoxycarbonylphenyl)disulfide, bis(4-acetyl-2-formylphenyl)disulfide, bis(4-acetyl-2-chlorocarbonylphenyl)disulfide, bis(4-acetyl-2-sulfophenyl)disulfide, bis(4-acetyl-2-methoxysulfonylphenyl)disulfide, bis(4-acetyl-2-chlorosulfonylphenyl)disulfide, bis(4-acetyl-2-sulfinophenyl)disulfide, bis(4-acetyl-2-methylsulfinylphenyl)disulfide, bis(4-acetyl-2-carbamoylphenyl)disulfide, bis(4-acetyl-2-trichloromethylphenyl)disulfide, bis(4-acetyl-2-cyanophenyl)disulfide, and bis(4-acetyl-2-methoxyphenyl)disulfide.

Examples of the organic sulfur compound (1e) represented by the chemical formula (3) include thiophenol sodium salt; thiophenol sodium salts substituted with halogen groups, such as 4-fluorothiophenol sodium salt, 2,5-difluorothiophenol sodium salt, 2,4,5-trifluorothiophenol sodium salt, 2,4,5,6-tetrafluorothiophenol sodium salt, pentafluorothiophenol sodium salt, 4-chlorothiophenol sodium salt, 2,5-dichlorothiophenol sodium salt, 2,4,5-trichlorothiophenol sodium salt, 2,4,5,6-tetrachlorothiophenol sodium salt, pentachlorothiophenol sodium salt, 4-bromothiophenol sodium salt, 2,5-dibromothiophenol sodium salt, 2,4,5-tribromothiophenol sodium salt, 2,4,5,6-tetrabromothiophenol sodium salt, pentabromothiophenol sodium salt, 4-iodothiophenol sodium salt, 2,5-diiodothiophenol sodium salt, 2,4,5-triiodothiophenol sodium salt, 2,4,5,6-tetraiodothiophenol sodium salt, and pentaiodothiophenol sodium salt; thiophenol sodium salts substituted with alkyl groups, such as 4-methylthiophenol sodium salt, 2,4,5-trimethylthiophenol sodium salt, pentamethylthiophenol sodium salt, 4-t-butylthiophenol sodium salt, 2,4,5-tri-t-butylthiophenol sodium salt, and penta(t-butyl)thiophenol sodium salt; thiophenol sodium salts substituted with carboxyl groups, such as 4-carboxythiophenol sodium salt, 2,4,6-tricarboxythiophenol sodium salt, and pentacarboxythiophenol sodium salt; thiophenol sodium salts substituted with alkoxycarbonyl groups, such as 4-methoxycarbonylthiophenol sodium salt, 2,4,6-trimethoxycarbonylthiophenol sodium salt, and pentamethoxycarbonylthiophenol sodium salt; thiophenol sodium salts substituted with formyl groups, such as 4-formylthiophenol sodium salt, 2,4,6-triformylthiophenol sodium salt, and pentaformylthiophenol sodium salt; thiophenol sodium salts substituted with acyl groups, such as 4-acetylthiophenol sodium salt, 2,4,6-triacetylthiophenol sodium salt, and pentaacetylthiophenol sodium salt; thiophenol sodium salts substituted with carbonyl halide groups, such as 4-chlorocarbonylthiophenol sodium salt, 2,4,6-tri(chlorocarbonyl)thiophenol sodium salt, and penta(chlorocarbonyl)thiophenol sodium salt; thiophenol sodium salts substituted with sulfo groups, such as 4-sulfothiophenol sodium salt, 2,4,6-trisulfothiophenol sodium salt, and pentasulfothiophenol sodium salt; thiophenol sodium salts substituted with alkoxysulfonyl groups, such as 4-methoxysulfonylthiophenol sodium salt, 2,4,6-trimethoxysulfonylthiophenol sodium salt, and pentamethoxysulfonylthiophenol sodium salt; thiophenol sodium salts substituted with sulfonyl halide groups, such as 4-chlorosulfonylthiophenol sodium salt, 2,4,6-tri(chlorosulfonyl)thiophenol sodium salt, and penta(chlorosulfonyl)thiophenol sodium salt; thiophenol sodium salts substituted with sulfino groups, such as 4-sulfinothiophenol sodium salt, 2,4,6-trisulfinothiophenol sodium salt, and pentasulfinothiophenol sodium salt; thiophenol sodium salts substituted with alkylsulfinyl groups, such as 4-methylsulfinylthiophenol sodium salt, 2,4,6-tri(methylsulfinyl)thiophenol sodium salt, and penta(methylsulfinyl)thiophenol sodium salt; thiophenol sodium salts substituted with carbamoyl groups, such as 4-carbamoylthiophenol sodium salt, 2,4,6-tricarbamoylthiophenol sodium salt, and pentacarbamoylthiophenol sodium salt; thiophenol sodium salts substituted with alkyl halide groups, such as 4-trichloromethylthiophenol sodium salt, 2,4,6-tri(trichloromethyl)thiophenol sodium salt, and penta(trichloromethyl)thiophenol sodium salt; thiophenol sodium salts substituted with cyano groups, such as 4-cyanothiophenol sodium salt, 2,4,6-tricyanothiophenol sodium salt, and pentacyanothiophenol sodium salt; and thiophenol sodium salts substituted with alkoxy groups, such as 4-methoxythiophenol sodium salt, 2,4,6-trimethoxythiophenol sodium salt, and pentamethoxythiophenol sodium salt. Each of these thiophenol sodium salts is substituted with one type of substituent.

Another example of the organic sulfur compound (1e) represented by the chemical formula (3) is a compound substituted with at least one type of the above substituents and another substituent. Examples of the other substituent include a nitro group (—NO$_2$), an amino group (—NH$_2$), a hydroxyl group (—OH), and a phenylthio group (—SPh). Specific examples of the compound include 4-chloro-2-nitrothiophenol sodium salt, 4-chloro-2-aminothiophenol sodium salt, 4-chloro-2-hydroxythiophenol sodium salt, 4-chloro-2-phenylthiothiophenol sodium salt, 4-methyl-2-nitrothiophenol sodium salt, 4-methyl-2-aminothiophenol sodium salt, 4-methyl-2-hydroxythiophenol sodium salt, 4-methyl-2-phenylthiothiophenol sodium salt, 4-carboxy-2-nitrothiophenol sodium salt, 4-carboxy-2-aminothiophenol sodium salt, 4-carboxy-2-hydroxythiophenol sodium salt, 4-carboxy-2-phenylthiothiophenol sodium salt, 4-methoxycarbonyl-2-nitrothiophenol sodium salt, 4-methoxycarbonyl-2-aminothiophenol sodium salt, 4-methoxycarbonyl-2-hydroxythiophenol sodium salt, 4-methoxycarbonyl-2-phenylthiothiophenol sodium salt, 4-formyl-2-nitrothiophenol sodium salt, 4-formyl-2-aminothiophenol sodium salt, 4-formyl-2-hydroxythiophenol sodium salt, 4-formyl-2-phenylthiothiophenol sodium salt, 4-acetyl-2-nitrothiophenol sodium salt, 4-acetyl-2-aminothiophenol sodium salt, 4-acetyl-2-hydroxythiophenol sodium salt, 4-acetyl-2-phenylthiothiophenol sodium salt, 4-chlorocarbonyl-2-nitrothiophenol sodium salt, 4-chlorocarbonyl-2-aminothiophenol sodium salt, 4-chlorocarbonyl-2-hydroxythiophenol sodium salt, 4-chlorocarbonyl-2-phenylthiothiophenol sodium salt, 4-sulfo-2-nitrothiophenol sodium salt, 4-sulfo-2-aminothiophenol sodium salt, 4-sulfo-2-hydroxythiophenol sodium salt, 4-sulfo-2-phenylthiothiophenol sodium salt, 4-methoxysulfonyl-2-nitrothiophenol sodium salt, 4-methoxysulfonyl-2-aminothiophenol sodium salt, 4-methoxysulfonyl-2-hydroxythiophenol sodium salt, 4-methoxysulfonyl-2-phenylthiothiophenol sodium salt, 4-chlorosulfonyl-2-nitrothiophenol sodium salt, 4-chlorosulfonyl-2-aminothiophenol sodium salt, 4-chlorosulfonyl-2-hydroxythiophenol sodium salt, 4-chlorosulfonyl-2-phenylthiothiophenol sodium salt, 4-sulfino-2-nitrothiophenol sodium salt, 4-sulfino-2-aminothiophenol sodium salt, 4-sulfino-2-hydroxythiophenol sodium salt, 4-sulfino-2-phenylthiothiophenol sodium salt, 4-methylsulfinyl-2-nitrothiophenol sodium salt, 4-methylsulfinyl-2-aminothiophenol sodium salt, 4-methylsulfinyl-2-hydroxythiophenol sodium salt, 4-methylsulfinyl-2-phenylthiothiophenol sodium salt, 4-carbamoyl-2-nitrothiophenol sodium salt, 4-carbamoyl-2-aminothiophenol sodium salt, 4-carbamoyl-2-hydroxythiophenol sodium salt, 4-carbamoyl-2-phenylthiothiophenol sodium salt, 4-trichloromethyl-2-nitrothiophenol sodium salt, 4-trichloromethyl-2-aminothiophenol sodium salt, 4-trichloromethyl-2-hydroxythiophenol sodium salt, 4-trichloromethyl-2-phenylthiothiophenol sodium salt, 4-cyano-2-nitrothiophenol sodium salt, 4-cyano-2-aminothiophenol sodium salt, 4-cyano-2-hydroxythiophenol sodium salt, 4-cyano-2-phenylthiothiophenol sodium salt, 4-methoxy-2-nitrothiophenol sodium salt, 4-methoxy-2-aminothiophenol sodium salt, 4-methoxy-2-hydroxythiophenol sodium salt, and 4-methoxy-2-phenylthiothiophenol sodium salt.

Still another example of the organic sulfur compound (1e) represented by the chemical formula (3) is a compound substituted with two or more types of substituents. Specific examples of the compound include 4-acetyl-2-chlorothiophenol sodium salt, 4-acetyl-2-methylthiophenol sodium salt, 4-acetyl-2-carboxythiophenol sodium salt, 4-acetyl-2-methoxycarbonylthiophenol sodium salt, 4-acetyl-2-formylthiophenol sodium salt, 4-acetyl-2-chlorocarbonylthiophenol sodium salt, 4-acetyl-2-sulfothiophenol sodium salt, 4-acetyl-2-methoxysulfonylthiophenol sodium salt, 4-acetyl-2-chlorosulfonylthiophenol sodium salt, 4-acetyl-2-sulfinothiophenol sodium salt, 4-acetyl-2-methylsulfinylthiophenol sodium salt, 4-acetyl-2-carbamoylthiophenol sodium salt, 4-acetyl-2-trichloromethylthiophenol sodium salt, 4-acetyl-2-cyanothiophenol sodium salt, and 4-acetyl-2-methoxythiophenol sodium salt. Examples of the monovalent metal represented by M1 in the chemical formula (3) include sodium, lithium, potassium, copper (I), and silver (I).

Examples of the organic sulfur compound (1e) represented by the chemical formula (4) include thiophenol zinc salt; thiophenol zinc salts substituted with halogen groups, such as 4-fluorothiophenol zinc salt, 2,5-difluorothiophenol zinc salt, 2,4,5-trifluorothiophenol zinc salt, 2,4,5,6-tetrafluorothiophenol zinc salt, pentafluorothiophenol zinc salt, 4-chlorothiophenol zinc salt, 2,5-dichlorothiophenol zinc salt, 2,4,5-trichlorothiophenol zinc salt, 2,4,5,6-tetrachlorothiophenol zinc salt, pentachlorothiophenol zinc salt, 4-bromothiophenol zinc salt, 2,5-dibromothiophenol zinc salt, 2,4,5-tribromothiophenol zinc salt, 2,4,5,6-tetrabromothiophenol zinc salt, pentabromothiophenol zinc salt, 4-iodothiophenol zinc salt, 2,5-diiodothiophenol zinc salt, 2,4,5-triiodothiophenol zinc salt, 2,4,5,6-tetraiodothiophenol zinc salt, and pentaiodothiophenol zinc salt; thiophenol zinc salts substituted with alkyl groups, such as 4-methylthiophenol zinc salt, 2,4,5-trimethylthiophenol zinc salt, pentamethylthiophenol zinc salt, 4-t-butylthiophenol zinc salt, 2,4,5-tri-t-butylthiophenol zinc salt, and penta-t-butylthiophenol zinc salt; thiophenol zinc salts substituted with carboxyl groups, such as 4-carboxythiophenol zinc salt, 2,4,6-tricarboxythiophenol zinc salt, and pentacarboxythiophenol zinc salt; thiophenol zinc salts substituted with alkoxycarbonyl groups, such as 4-methoxycarbonylthiophenol zinc salt, 2,4,6-trimethoxycarbonylthiophenol zinc salt, and pentamethoxycarbonylthiophenol zinc salt; thiophenol zinc salts substituted with formyl groups, such as 4-formylthiophenol zinc salt, 2,4,6-triformylthiophenol zinc salt, and pentaformylthiophenol zinc salt; thiophenol zinc salts substituted with acyl groups, such as 4-acetylthiophenol zinc salt, 2,4,6- triacetylthiophenol zinc salt, and pentaacetylthiophenol zinc salt; thiophenol zinc salts substituted with carbonyl halide groups, such as 4-chlorocarbonylthiophenol zinc salt, 2,4,6-tri(chlorocarbonyl)thiophenol zinc salt, and penta(chlorocarbonyl)thiophenol zinc salt; thiophenol zinc salts substituted with sulfo groups, such as 4-sulfothiophenol zinc salt, 2,4,6-trisulfothiophenol zinc salt, and pentasulfothiophenol zinc salt; thiophenol zinc salts substituted with alkoxysulfonyl groups, such as 4-methoxysulfonylthiophenol zinc salt, 2,4,6-trimethoxysulfonylthiophenol zinc salt, and pentamethoxysulfonylthiophenol zinc salt; thiophenol zinc salts substituted with sulfonyl halide groups, such as 4-chlorosulfonylthiophenol zinc salt, 2,4,6-tri(chlorosulfonyl)thiophenol zinc salt, and penta(chlorosulfonyl)thiophenol zinc salt; thiophenol zinc salts substituted with sulfino groups, such as 4-sulfinothiophenol zinc salt, 2,4,6-trisulfinothiophenol zinc salt, and pentasulfinothiophenol zinc salt; thiophenol zinc salts substituted with alkylsulfinyl groups, such as 4-methylsulfinylthiophenol zinc salt, 2,4,6-tri(methylsulfinyl)thiophenol zinc salt, and penta(methylsulfinyl)thiophenol zinc salt; thiophenol zinc salts substituted with carbamoyl groups, such as 4-carbamoylthiophenol zinc salt, 2,4,6-tricarbamoylthiophenol zinc salt, and pentacarbamoylthiophenol zinc salt; thiophenol zinc salts substituted with alkyl halide groups, such as 4-trichloromethylthiophenol zinc salt, 2,4,6-tri(trichloromethyl)thiophenol zinc salt, and penta(trichloromethyl)thiophenol zinc salt; thiophenol zinc salts substituted with cyano groups, such as 4-cyanothiophenol zinc salt, 2,4,6-tricyanothiophenol zinc salt, and pentacyanothiophenol zinc salt; and thiophenol zinc salts substituted with alkoxy groups, such as 4-methoxythiophenol zinc salt, 2,4,6-trimethoxythiophenol zinc salt, and pentamethoxythiophenol zinc salt. Each of these thiophenol zinc salts is substituted with one type of substituent.

Another example of the organic sulfur compound (1e) represented by the chemical formula (4) is a compound substituted with at least one type of the above substituents and another substituent. Examples of the other substituent include a nitro group (—$NO_2$), an amino group (—$NH_2$), a hydroxyl group (—OH), and a phenylthio group (—SPh). Specific examples of the compound include 4-chloro-2-nitrothiophenol zinc salt, 4-chloro-2-aminothiophenol zinc salt, 4-chloro-2-hydroxythiophenol zinc salt, 4-chloro-2-phenylthiothiophenol zinc salt, 4-methyl-2-nitrothiophenol zinc salt, 4-methyl-2-aminothiophenol zinc salt, 4-methyl-2-hydroxythiophenol zinc salt, 4-methyl-2-phenylthiothiophenol zinc salt, 4-carboxy-2-nitrothiophenol zinc salt, 4-carboxy-2-aminothiophenol zinc salt, 4-carboxy-2-hydroxythiophenol zinc salt, 4-carboxy-2-phenylthiothiophenol zinc salt, 4-methoxycarbonyl-2-nitrothiophenol zinc salt, 4-methoxycarbonyl-2-aminothiophenol zinc salt, 4-methoxycarbonyl-2-hydroxythiophenol zinc salt, 4-methoxycarbonyl-2-phenylthiothiophenol zinc salt, 4-formyl-2-nitrothiophenol zinc salt, 4-formyl-2-aminothiophenol zinc salt, 4-formyl-2-hydroxythiophenol zinc salt, 4-formyl-2-phenylthiothiophenol zinc salt, 4-acetyl-2-nitrothiophenol zinc salt, 4-acetyl-2-aminothiophenol zinc salt, 4-acetyl-2-hydroxythiophenol zinc salt, 4-acetyl-2-phenylthiothiophenol zinc salt, 4-chlorocarbonyl-2-nitrothiophenol zinc salt, 4-chlorocarbonyl-2-aminothiophenol zinc salt, 4-chlorocarbonyl-2-hydroxythiophenol zinc salt, 4-chlorocarbonyl-2-phenylthiothiophenol zinc salt, 4-sulfo-2-nitrothiophenol zinc salt, 4-sulfo-2-aminothiophenol zinc salt, 4-sulfo-2-hydroxythiophenol zinc salt, 4-sulfo-2-phenylthiothiophenol zinc salt, 4-methoxysulfonyl-2-nitrothiophenol zinc salt, 4-methoxysulfonyl-2-aminothiophenol zinc salt, 4-methoxysulfonyl-2-hydroxythiophenol zinc salt, 4-methoxysulfonyl-2-phenylthiothiophenol zinc salt, 4-chlorosulfonyl-2-nitrothiophenol zinc salt, 4-chlorosulfonyl-2-aminothiophenol zinc salt, 4-chlorosulfonyl-2-hydroxythiophenol zinc salt, 4-chlorosulfonyl-2-phenylthiothiophenol zinc salt, 4-sulfino-2-nitrothiophenol zinc salt, 4-sulfino-2-aminothiophenol zinc salt, 4-sulfino-2-hydroxythiophenol zinc salt, 4-sulfino-2-phenylthiothiophenol zinc salt, 4-methylsulfinyl-2-nitrothiophenol zinc salt, 4-methylsulfinyl-2-aminothiophenol zinc salt, 4-methylsulfinyl-2-hydroxythiophenol zinc salt, 4-methylsulfinyl-2-phenylthiothiophenol zinc salt, 4-carbamoyl-2-nitrothiophenol zinc salt, 4-carbamoyl-2-aminothiophenol zinc salt, 4-carbamoyl-2-hydroxythiophenol zinc salt, 4-carbamoyl-2-phenylthiothiophenol zinc salt, 4-trichloromethyl-2-nitrothiophenol zinc salt, 4-trichloromethyl-2-aminothiophenol zinc salt, 4-trichloromethyl-2-hydroxythiophenol zinc salt, 4-trichloromethyl-2-phenylthiothiophenol zinc salt, 4-cyano-2-nitrothiophenol zinc salt, 4-cyano-2-aminothiophenol zinc salt, 4-cyano-2-hydroxythiophenol zinc salt, 4-cyano-2-phenylthiothiophenol zinc salt, 4-methoxy-2-nitrothiophenol zinc salt, 4-methoxy-2-aminothiophenol zinc salt, 4-methoxy-2-hydroxythiophenol zinc salt, and 4-methoxy-2-phenylthiothiophenol zinc salt.

Still another example of the organic sulfur compound (1e) represented by the chemical formula (4) is a compound substituted with two or more types of substituents. Specific examples of the compound include 4-acetyl-2-chlorothiophenol zinc salt, 4-acetyl-2-methylthiophenol zinc salt, 4-acetyl-2-carboxythiophenol zinc salt, 4-acetyl-2-methoxycarbonylthiophenol zinc salt, 4-acetyl-2-formylthiophenol zinc salt, 4-acetyl-2-chlorocarbonylthiophenol zinc salt, 4-acetyl-2-sulfothiophenol zinc salt, 4-acetyl-2-methoxysulfonylthiophenol zinc salt, 4-acetyl-2-chlorosulfonylthiophenol zinc salt, 4-acetyl-2-sulfinothiophenol zinc salt, 4-acetyl-2-methylsulfinylthiophenol zinc salt, 4-acetyl-2-carbamoylthiophenol zinc salt, 4-acetyl-2-trichloromethylthiophenol zinc salt, 4-acetyl-2-cyanothiophenol zinc salt, and 4-acetyl-2-methoxythiophenol zinc salt. Examples of the bivalent metal represented by M2 in the chemical formula (4) include zinc, magnesium, calcium, strontium, barium, titanium (II), manganese (II), iron (II), cobalt (II), nickel (II), zirconium (II), and tin (II).

Examples of thionaphthols include 2-thionaphthol, 1-thionaphthol, 2-chloro-1-thionaphthol, 2-bromo-1-thionaphthol, 2-fluoro-1-thionaphthol, 2-cyano-1-thionaphthol, 2-acetyl-1-thionaphthol, 1-chloro-2-thionaphthol, 1-bromo-2-thionaphthol, 1-fluoro-2-thionaphthol, 1-cyano-2-thionaphthol, 1-acetyl-2-thionaphthol, and metal salts thereof. 1-thionaphthol, 2-thionaphthol, and zinc salts thereof are preferred.

Examples of sulfenamide type organic sulfur compounds (1e) include N-cyclohexyl-2-benzothiazole sulfenamide, N-oxydiethylene-2-benzothiazole sulfenamide, and N-t-butyl-2-benzothiazole sulfenamide. Examples of thiuram type organic sulfur compounds include tetramethylthiuram monosulfide, tetramethylthiuram disulfide, tetraethylthiuram disulfide, tetrabutylthiuram disulfide, and dipentamethylenethiuram tetrasulfide. Examples of dithiocarbamates include zinc dimethyldithiocarbamate, zinc diethyldithiocarbamate, zinc dibutyldithiocarbamate, zinc ethylphenyldithiocarbamate, sodium dimethyldithiocarbamate, sodium diethyldithiocarbamate, copper (II) dimethyldithiocarbamate, iron (III) dimethyldithiocarbamate, selenium diethyldithiocarbamate, and tellurium diethyldithiocarbamate. Examples of thiazole type organic sulfur compounds include 2-mercaptobenzothiazole (MBT); dibenzothiazyl disulfide (MBTS); a sodium salt, a zinc salt, a copper salt, or a cyclohexylamine salt of 2-mercaptobenzothiazole; 2-(2,4-dinitrophenyl)mercaptobenzothiazole; and 2-(2,6-diethyl-4-morpholinothio)benzothiazole.

From the standpoint that an outer-hard/inner-soft structure is easily obtained, preferable organic sulfur compounds (1e) are 2-thionaphthol, bis(pentabromophenyl)disulfide, and 2,6-dichlorothiophenol. A more preferable organic sulfur compound (1e) is 2-thionaphthol.

From the standpoint that an outer-hard/inner-soft structure is easily obtained, the amount of the organic sulfur compound (1e) is preferably equal to or greater than 0.05 parts by weight, more preferably equal to or greater than 0.1 parts by weight, and particularly preferably equal to or greater than 0.2 parts by weight, per 100 parts by weight of the base rubber. In light of resilience performance, the amount is preferably equal to or less than 5.0 parts by weight, more preferably equal to or less than 3.0 parts by weight, and particularly preferably equal to or less than 1.0 parts by weight, per 100 parts by weight of the base rubber.

For the purpose of adjusting specific gravity and the like, a filler may be included in the center 18. Examples of suitable fillers include zinc oxide, barium sulfate, calcium carbonate, and magnesium carbonate. The amount of the filler is determined as appropriate so that the intended specific gravity of the center 18 is accomplished. A particularly preferable filler is zinc oxide. Zinc oxide serves not only as a specific gravity adjuster but also as a crosslinking activator.

According to need, an anti-aging agent, a coloring agent, a plasticizer, a dispersant, sulfur, a vulcanization accelerator, and the like are added to the first rubber composition of the center 18. Crosslinked rubber powder or synthetic resin powder may also be dispersed in the first rubber composition.

The envelope layer 20 is formed by crosslinking a second rubber composition. The second rubber composition includes:

(2a) a base rubber;
(2b) a co-crosslinking agent;
(2c) a crosslinking initiator; and
(2d) an acid and/or a salt.

Examples of the base rubber (2a) include polybutadienes, polyisoprenes, styrene-butadiene copolymers, ethylene-propylene-diene copolymers, and natural rubbers. In light of resilience performance, polybutadienes are preferred. When a polybutadiene and another rubber are used in combination, it is preferred that the polybutadiene is included as a principal component. Specifically, the proportion of the polybutadiene to the entire base rubber is preferably equal to or greater than 50% by weight and more preferably equal to or greater than 80% by weight. The proportion of cis-1,4 bonds in the polybutadiene is preferably equal to or greater than 40% by weight and more preferably equal to or greater than 80% by weight.

A polybutadiene in which the proportion of 1,2-vinyl bonds is equal to or less than 2.0% by weight is preferred. The polybutadiene can contribute to the resilience performance of the golf ball 2. In this respect, the proportion of 1,2-vinyl bonds is preferably equal to or less than 1.7% by weight and particularly preferably equal to or less than 1.5% by weight.

From the standpoint that a polybutadiene having a low proportion of 1,2-vinyl bonds and excellent polymerization activity is obtained, a rare-earth-element-containing catalyst is preferably used for synthesis of a polybutadiene. In particular, a polybutadiene synthesized with a catalyst containing neodymium, which is a lanthanum-series rare earth element compound, is preferred.

The polybutadiene has a Mooney viscosity ($ML_{1+4}$ (100° C.)) of preferably 30 or greater, more preferably 32 or greater, and particularly preferably 35 or greater. The Mooney viscosity ($ML_{1+4}$ (100° C.)) is preferably equal to or less than 140, more preferably equal to or less than 120, even more preferably equal to or less than 100, and particularly preferably equal to or less than 80. The Mooney viscosity ($ML_{1+4}$ (100° C.)) is measured according to the standards of "JIS K6300". The measurement conditions are as follows.

Rotor: L rotor
Preheating time: 1 minute
Rotating time of rotor: 4 minutes
Temperature: 100° C.

In light of workability, the polybutadiene has a molecular weight distribution (Mw/Mn) of preferably 2.0 or greater, more preferably 2.2 or greater, even more preferably 2.4 or greater, and particularly preferably 2.6 or greater. In light of resilience performance, the molecular weight distribution (Mw/Mn) is preferably equal to or less than 6.0, more preferably equal to or less than 5.0, even more preferably equal to or less than 4.0, and particularly preferably equal to or less than 3.4. The molecular weight distribution (Mw/Mn) is calculated by dividing the weight average molecular weight Mw by the number average molecular weight Mn.

The molecular weight distribution is measured by gel permeation chromatography ("HLC-8120GPC" manufactured by Tosoh Corporation). The measurement conditions are as follows.

Detector: differential refractometer
Column: GMHHXL (manufactured by Tosoh Corporation)
Column temperature: 40° C.
Mobile phase: tetrahydrofuran The molecular weight distribution is calculated as a value obtained by conversion using polystyrene standard.

The co-crosslinking agent (2b) is:
(2b-1) an α,β-unsaturated carboxylic acid having 3 to 8 carbon atoms; and/or
(2b-2) a metal salt of an α,β-unsaturated carboxylic acid having 3 to 8 carbon atoms.

The second rubber composition may include only the α,β-unsaturated carboxylic acid (2b-1) or only the metal salt (2b-2) of the α,β-unsaturated carboxylic acid as the co-crosslinking agent (2b). The second rubber composition may include both the α,β-unsaturated carboxylic acid (2b-1) and the metal salt (2b-2) of the α,β-unsaturated carboxylic acid as the co-crosslinking agent (2b).

The metal salt (2b-2) of the α,β-unsaturated carboxylic acid graft-polymerizes with the molecular chain of the base rubber, thereby crosslinking the rubber molecules. When the second rubber composition includes the α,β-unsaturated carboxylic acid (2b-1), the second rubber composition preferably further includes a metal compound (2f). The metal compound (2f) reacts with the α,β-unsaturated carboxylic acid (2b-1) in the second rubber composition. A salt obtained by this reaction graft-polymerizes with the molecular chain of the base rubber.

Examples of the metal compound (2f) include metal hydroxides such as magnesium hydroxide, zinc hydroxide, calcium hydroxide, sodium hydroxide, lithium hydroxide, potassium hydroxide, and copper hydroxide; metal oxides such as magnesium oxide, calcium oxide, zinc oxide, and copper oxide; and metal carbonates such as magnesium carbonate, zinc carbonate, calcium carbonate, sodium carbonate, lithium carbonate, and potassium carbonate. A compound that includes a bivalent metal is preferred. The compound that includes the bivalent metal reacts with the co-crosslinking agent (2b) to form metal crosslinks. The metal compound (2f) is particularly preferably a zinc compound. Two or more metal compounds may be used in combination.

Examples of the α,β-unsaturated carboxylic acid include acrylic acid, methacrylic acid, fumaric acid, maleic acid, and crotonic acid. Examples of the metal component in the metal salt (2b-2) of the α,β-unsaturated carboxylic acid include sodium ion, potassium ion, lithium ion, magnesium ion, calcium ion, zinc ion, barium ion, cadmium ion, aluminum ion, tin ion, and zirconium ion. The metal salt (2b-2) of the α,β-unsaturated carboxylic acid may include two or more types of ions. From the standpoint that metal crosslinks are likely to occur between the rubber molecules, bivalent metal ions such as magnesium ion, calcium ion, zinc ion, barium ion, and cadmium ion are preferred. The metal salt (2b-2) of the α,β-unsaturated carboxylic acid is particularly preferably zinc acrylate.

In light of resilience performance of the golf ball 2, the amount of the co-crosslinking agent (2b) is preferably equal to or greater than 15 parts by weight and particularly preferably equal to or greater than 20 parts by weight, per 100 parts by weight of the base rubber. In light of feel at impact, the amount is preferably equal to or less than 50 parts by weight, more preferably equal to or less than 45 parts by weight, and particularly preferably equal to or less than 40 parts by weight, per 100 parts by weight of the base rubber.

In the golf ball 2, the amount of the co-crosslinking agent (2b) in the envelope layer 20 is preferably greater than the amount of the co-crosslinking agent (1b) in the center 18. Thus, the degree of the outer-hard/inner-soft structure of the core 4 is increased. In this respect, the difference between the amount of the co-crosslinking agent (2b) in the envelope layer 20 and the amount of the co-crosslinking agent (1b) in the center 18 is preferably equal to or greater than 5 parts by weight. From the standpoint that a core 4 whose hardness linearly increases from its central point toward its surface is obtained, the difference in amount is preferably equal to or less than 20 parts by weight. In the golf ball 2, spin is effectively suppressed when the golf ball 2 is hit with a driver. The golf ball 2 has excellent flight performance.

The crosslinking initiator (2c) is preferably an organic peroxide. The organic peroxide contributes to the resilience performance of the golf ball 2. Examples of preferable organic peroxides include dicumyl peroxide, 1,1-bis(t-butylperoxy)-3,3,5-trimethylcyclohexane, 2,5-dimethyl-2,5-di(t-butylperoxy) hexane, and di-t-butyl peroxide. In light of versatility, dicumyl peroxide is preferred.

In light of resilience performance of the golf ball 2, the amount of the crosslinking initiator (2c) is preferably equal to or greater than 0.2 parts by weight and particularly preferably equal to or greater than 0.5 parts by weight, per 100 parts by weight of the base rubber. In light of feel at impact and durability of the golf ball 2, the amount is preferably equal to or less than 5.0 parts by weight and particularly preferably equal to or less than 2.5 parts by weight, per 100 parts by weight of the base rubber.

In the present invention, the co-crosslinking agent (2b) is not included in the concept of the acid and/or the salt (2d). It is inferred that as described later, during heating and forming of the core 4, the acid and/or the salt (2d) breaks the metal crosslinks by the co-crosslinking agent (2b).

Examples of the acid and/or the salt (2d) include oxo acids, such as carboxylic acids, sulfonic acids, and phosphoric acid, and salts thereof; and hydroacids, such as hydrochloric acid and hydrofluoric acid, and salts thereof. Oxo acids and salts thereof are preferred. A carboxylic acid and/or a salt thereof (2d-1) is more preferred. Carboxylates are particularly preferred.

The carboxylic acid component of the carboxylic acid and/or the salt thereof (2d-1) has a carboxyl group. The carboxylic acid component reacts with the co-crosslinking agent (2b). It is inferred that by this reaction, metal crosslinks are broken.

The carbon number of the carboxylic acid component of the carboxylic acid and/or the salt thereof (2d-1) is preferably equal to or greater than 1 but equal to or less than 30, more preferably equal to or greater than 3 but equal to or less than 30, and even more preferably equal to or greater than 5 but equal to or less than 28. Examples of the carboxylic acid include aliphatic carboxylic acids (fatty acids) and aromatic carboxylic acids. As the carboxylic acid and/or the salt thereof (2d-1), a fatty acid and/or a salt thereof is preferred. The carbon number of the fatty acid component of the fatty acid and/or the salt thereof is preferably equal to or greater than 1 but equal to or less than 30.

The second rubber composition may include a saturated fatty acid and/or a salt thereof, or may include an unsaturated fatty acid and/or a salt thereof. The saturated fatty acid and/or the salt thereof is preferred.

Examples of fatty acids include butyric acid (C4), valeric acid (C5), caproic acid (C6), enanthic acid (C7), caprylic acid (octanoic acid) (C8), pelargonic acid (C9), capric acid (decanoic acid) (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linolic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30). Two or more fatty acids may be used in combination. Octanoic acid, lauric acid, myristic acid, palmitic acid, stearic acid, oleic acid, and behenic acid are preferred.

An aromatic carboxylic acid has an aromatic ring and a carboxyl group. Examples of aromatic carboxylic acids include benzoic acid, phthalic acid, isophthalic acid, terephthalic acid, hemimellitic acid (benzene-1,2,3-tricarboxylic acid), trimellitic acid (benzene-1,2,4-tricarboxylic acid), trimesic acid (benzene-1,3,5-tricarboxylic acid), mellophanic acid (benzene-1,2,3,4-tetracarboxylic acid), prehnitic acid (benzene-1,2,3,5-tetracarboxylic acid), pyromellitic acid (benzene-1,2,4,5-tetracarboxylic acid), mellitic acid (benzene hexacarboxylic acid), diphenic acid (biphenyl-2,2'-dicarboxylic acid), toluic acid (methylbenzoic acid), xylic acid, prehnitylic acid (2,3,4-trimethylbenzoic acid), γ-isodurylic acid (2,3,5-trimethylbenzoic acid), durylic acid (2,4,5-trimethylbenzoic acid), β-isodurylic acid (2,4,6-trimethylbenzoic acid), α-isodurylic acid (3,4,5-trimethylbenzoic acid), cuminic acid (4-isopropylbenzoic acid), uvitic acid (5-methylisophthalic acid), α-toluic acid (phenylacetic acid), hydratropic acid (2-phenylpropanoic acid), and hydrocinnamic acid (3-phenylpropanoic acid).

The second rubber composition may include an aromatic carboxylate substituted with a hydroxyl group, an alkoxy group, or an oxo group. Specific examples of this carboxylic acid can include salicylic acid (2-hydroxybenzoic acid), anisic acid (methoxybenzoic acid), cresotinic acid (hydroxy (methyl)benzoic acid), o-homosalicylic acid (2-hydroxy-3-methylbenzoic acid), m-homosalicylic acid (2-hydroxy-4-methylbenzoic acid), p-homosalicylic acid (2-hydroxy-5-methylbenzoic acid), o-pyrocatechuic acid (2,3-dihydroxybenzoic acid), p-resorcylic acid (2,4-dihydroxybenzoic acid), γ-resorcylic acid (2,6-dihydroxybenzoic acid), protocatechuic acid (3,4-dihydroxybenzoic acid), α-resorcylic acid (3,5-dihydroxybenzoic acid), vanillic acid (4-hydroxy-3-methoxybenzoic acid), isovanillic acid (3-hydroxy-4-methoxybenzoic acid), veratric acid (3,4-dimethoxybenzoic acid), o-veratric acid (2,3-dimethoxybenzoic acid), orsellinic acid (2,4-dihydroxy-6-methylbenzoic acid), m-hemipinic acid (4,5-dimethoxyphthalic acid), gallic acid (3,4,5-trihydroxybenzoic acid), syringic acid (4-hydroxy-3,5-dimethoxybenzoic acid), asaronic acid (2,4,5-trimethoxybenzoic acid), mandelic acid (hydroxy(phenyl) acetic acid), vanillylmandelic acid (hydroxy(4-hydroxy-3-methoxyphenyl)acetic acid), homoanisic acid ((4-methoxyphenyl)acetic acid), homogentisic acid ((2,5-dihydroxyphenyl)acetic acid), homoprotocatechuic acid ((3,4-dihydroxyphenyl)acetic acid), homovanillic acid ((4-hydroxy-3-methoxyphenyl)acetic acid), homoisovanillic acid ((3-hydroxy-4-methoxyphenyl)acetic acid), homoveratric acid ((3,4-dimethoxyphenyl)acetic acid), o-homoveratric acid ((2,3-dimethoxyphenyl)acetic acid), homophthalic acid (2-(carboxymethyl)benzoic acid), homoisophthalic acid (3-(carboxymethyl)benzoic acid), homoterephthalic acid (4-(carboxymethyl)benzoic acid), phthalonic acid (2-(carboxycarbonyl)benzoic acid), isophthalonic acid (3-(carboxycarbonyl)benzoic acid), terephthalonic acid (4-(carboxycarbonyl)benzoic acid), benzilic acid (hydroxydiphenylacetic acid), atrolactic acid (2-hydroxy-2-phenylpropanoic acid), tropic acid (3-hydroxy-2-phenylpropanoic acid), melilotic acid (3-(2-hydroxyphenyl)propanoic acid), phloretic acid (3-(4-hydroxyphenyl)propanoic acid), hydrocaffeic acid (3-(3,4-dihydroxyphenyl)propanoic acid), hydroferulic acid (3-(4-hydroxy-3-methoxyphenyl)propanoic acid), hydroisoferulic acid (3-(3-hydroxy-4-methoxyphenyl)propanoic acid), p-coumaric acid (3-(4-hydroxyphenyl)acrylic acid), umbellic acid (3-(2,4-dihydroxyphenyl)acrylic acid), caffeic acid (3-(3,4-dihydroxyphenyl)acrylic acid), ferulic acid (3-(4-hydroxy-3-methoxyphenyl)acrylic acid), isoferulic acid (3-(3-hydroxy-4-methoxyphenyl)acrylic acid), and sinapic acid (3-(4-hydroxy-3,5-dimethoxyphenyl)acrylic acid).

The cationic component of the carboxylate is a metal ion or an organic cation. Examples of the metal ion include sodium ion, potassium ion, lithium ion, silver ion, magnesium ion, calcium ion, zinc ion, barium ion, cadmium ion, copper ion, cobalt ion, nickel ion, manganese ion, aluminum ion, iron ion, tin ion, zirconium ion, and titanium ion. Two or more types of ions may be used in combination.

The organic cation is a cation having a carbon chain. Examples of the organic cation include organic ammonium ions. Examples of organic ammonium ions include primary ammonium ions such as stearylammonium ion, hexylammonium ion, octylammonium ion, and 2-ethylhexylammonium ion; secondary ammonium ions such as dodecyl(lauryl)ammonium ion, and octadecyl(stearyl)ammonium ion; tertiary ammonium ions such as trioctylammonium ion; and quaternary ammonium ions such as dioctyldimethylammonium ion, and distearyldimethylammonium ion. Two or more types of organic cations may be used in combination.

Examples of preferable carboxylates include a potassium salt, a magnesium salt, an aluminum salt, a zinc salt, an iron salt, a copper salt, a nickel salt, or a cobalt salt of octanoic acid, lauric acid, myristic acid, palmitic acid, stearic acid, oleic acid, or behenic acid. Zinc salts of carboxylic acids are particularly preferred. Specific examples of preferable zinc salts of carboxylic acids include zinc octoate, zinc laurate, zinc myristate, and zinc stearate. A particularly preferable zinc salt of a carboxylic acid is zinc octoate.

In light of linearity of the hardness distribution of the core 4, the amount of the acid and/or the salt (2d) is preferably equal to or greater than 0.5 parts by weight, more preferably equal to or greater than 1.0 parts by weight, and particularly preferably equal to or greater than 2.0 parts by weight, per 100 parts by weight of the base rubber. In light of resilience performance, the amount is preferably equal to or less than 45 parts by weight, more preferably equal to or less than 40 parts by weight, and particularly preferably equal to or less than 30 parts by weight, per 100 parts by weight of the base rubber.

The weight ratio of the co-crosslinking agent (2b) and the acid and/or the salt (2d) in the second rubber composition is preferably equal to or greater than 3/7 but equal to or less than 9/1. From the second rubber composition in which this weight ratio is within the above range, the envelope layer 20 whose hardness linearly increases from its inside toward its outside can be obtained.

As the co-crosslinking agent (2b), zinc acrylate is preferably used. Zinc acrylate whose surface is coated with stearic acid or zinc stearate for the purpose of improving dispersibility to rubber is present. In the present invention, when the second rubber composition includes this zinc acrylate, this coating material is not included in the concept of the acid and/or the salt (2d).

Preferably, the second rubber composition further includes an organic sulfur compound (2e). The organic sulfur compound (2e) increases the linearity of the hardness distribution of the core 4. In addition, the organic sulfur compound (2e) increases the degree of the outer-hard/inner-soft structure.

In the golf ball 2, the same compounds as those described above for the organic sulfur compound (1e) in the first rubber composition can be used for the organic sulfur compound (2e). Thus, preferable organic sulfur compounds (2e) are thiophenols, diphenyl disulfides, thionaphthols, thiuram disulfides, and metal salts thereof. From the standpoint that an outer-hard/inner-soft structure is easily obtained, preferable organic sulfur compounds (2e) are 2-thionaphthol, bis(pentabromophenyl)disulfide, and 2,6-dichlorothiophenol. A more preferable organic sulfur compound (2e) is 2-thionaphthol.

From the standpoint that an outer-hard/inner-soft structure is easily obtained, the amount of the organic sulfur compound (2e) is preferably equal to or greater than 0.05 parts by weight, more preferably equal to or greater than 0.1 parts by weight, and particularly preferably equal to or greater than 0.2 parts by weight, per 100 parts by weight of the base rubber. In light of resilience performance, the amount is preferably equal to or less than 5.0 parts by weight, more preferably equal to or less than 3.0 parts by weight, and particularly preferably equal to or less than 1.0 parts by weight, per 100 parts by weight of the base rubber.

For the purpose of adjusting specific gravity and the like, a filler may be included in the envelope layer 20. Examples of suitable fillers include zinc oxide, barium sulfate, calcium carbonate, and magnesium carbonate. The amount of the filler is determined as appropriate so that the intended specific gravity of the envelope layer 20 is accomplished. A particularly preferable filler is zinc oxide. Zinc oxide serves not only as a specific gravity adjuster but also as a cross-linking activator.

According to need, an anti-aging agent, a coloring agent, a plasticizer, a dispersant, sulfur, a vulcanization accelerator, and the like are added to the second rubber composition of the envelope layer 20. Crosslinked rubber powder or synthetic resin powder may also be dispersed in the second rubber composition.

During heating and forming of the core 4, the base rubber (1a) is crosslinked by the co-crosslinking agent (1b). The base rubber (2a) is crosslinked by the co-crosslinking agent (2b). The heat of these crosslinking reactions remains near the central point of the core 4. Thus, during heating and forming of the core 4, the temperature at the central portion is high. The temperature gradually decreases from the central point toward the surface. In the first rubber composition which forms the center 18 of the core 4, the acid reacts with a metal salt of the co-crosslinking agent (1b) to bond to cation. In the first rubber composition, the salt reacts with the metal salt of the co-crosslinking agent (1b) to exchange cation. By the bonding and the exchange, metal crosslinks are broken. In the second rubber composition which forms the envelope layer 20 of the core 4, the acid reacts with a metal salt of the co-crosslinking agent (2b) to bond to cation. The salt reacts with the metal salt of the co-crosslinking agent (2b) to exchange cation. By the bonding and the exchange, metal crosslinks are broken. Breaking of metal crosslinks in the core 4 is likely to occur in the central portion of the core 4 where the temperature is high, and is unlikely to occur near the surface of the core 4. As a result, the crosslinking density of the core 4 increases from its central point toward its surface. In the core 4, an outer-hard/inner-soft structure can be achieved. Furthermore, since the first rubber composition includes the organic sulfur compound (1e) together with the acid and/or the salt (1d) and/or the second rubber composition includes the organic sulfur compound (2e) together with the acid and/or the salt (2d), the gradient of the hardness distribution can be controlled, and the degree of the outer-hard/inner-soft structure of the core 4 can be increased. In light of ease of controlling the gradient of the hardness distribution, the first rubber composition preferably includes the organic sulfur compound (1e) together with the acid and/or the salt (1d) and the second rubber composition preferably includes the organic sulfur compound (2e) together with the acid and/or the salt (2d). When the golf ball 2 that includes the core 4 is hit with a driver, the spin rate is low. In the golf ball 2, excellent flight performance is achieved upon a shot with a driver.

In the golf ball 2, when the first rubber composition of the center 18 includes the acid and/or the salt (1d), the second rubber composition of the envelope layer 20 may not include the acid and/or the salt (2d). When the second rubber composition of the envelope layer 20 includes the acid and/or the salt (2d), the first rubber composition of the center 18 may not include the acid and/or the salt (1d). From the standpoint that the gradient of the hardness distribution can be effectively controlled and the degree of the outer-hard/inner-soft structure of the core 4 can be further increased, the first rubber composition of the center 18 preferably includes the acid and/or the salt (1d) and the second rubber composition of the envelope layer 20 preferably includes the acid and/or the salt (2d).

For the first mid layer 6, a resin composition is suitably used. Examples of the base polymer of the resin composition include ionomer resins, polystyrenes, polyesters, polyamides, and polyolefins.

Particularly preferable base polymers are ionomer resins. The golf ball 2 that includes the first mid layer 6 including an ionomer resin has excellent resilience performance. An ionomer resin and another resin may be used in combination for the first mid layer 6. In this case, the principal component of the base polymer is preferably the ionomer resin. Specifically, the proportion of the ionomer resin to the entire base polymer is preferably equal to or greater than 50% by weight, more preferably equal to or greater than 60% by weight, and particularly preferably equal to or greater than 70% by weight.

Examples of preferable ionomer resins include binary copolymers formed with an $\alpha$-olefin and an $\alpha,\beta$-unsaturated carboxylic acid having 3 to 8 carbon atoms. A preferable binary copolymer includes 80% by weight or greater but 90% by weight or less of an $\alpha$-olefin, and 10% by weight or greater but 20% by weight or less of an $\alpha,\beta$-unsaturated carboxylic acid. The binary copolymer has excellent resilience performance. Examples of other preferable ionomer resins include ternary copolymers formed with: an $\alpha$-olefin; an $\alpha,\beta$-unsaturated carboxylic acid having 3 to 8 carbon atoms; and an $\alpha,\beta$-unsaturated carboxylate ester having 2 to 22 carbon atoms. A preferable ternary copolymer includes 70% by weight or greater but 85% by weight or less of an $\alpha$-olefin, 5% by weight or greater but 30% by weight or less of an $\alpha,\beta$-unsaturated carboxylic acid, and 1% by weight or greater but 25% by weight or less of an $\alpha,\beta$-unsaturated carboxylate ester. The ternary copolymer has excellent resilience performance. For the binary copolymers and the ternary copolymers, preferable $\alpha$-olefins are ethylene and propylene, while preferable $\alpha,\beta$-unsaturated carboxylic acids are acrylic acid and methacrylic acid. A particularly preferable ionomer resin is a copolymer formed with ethylene and acrylic acid or methacrylic acid.

In the binary copolymers and the ternary copolymers, some of the carboxyl groups are neutralized with metal ions. Examples of metal ions for use in neutralization include sodium ion, potassium ion, lithium ion, zinc ion, calcium ion, magnesium ion, aluminum ion, and neodymium ion. The neutralization may be carried out with two or more types of metal ions. Particularly suitable metal ions in light of resilience performance and durability of the golf ball 2 are sodium ion, zinc ion, lithium ion, and magnesium ion.

Specific examples of ionomer resins include trade names "Himilan 1555", "Himilan 1557", "Himilan 1605", "Himilan 1706", "Himilan 1707", "Himilan 1856", "Himilan 1855", "Himilan AM7311", "HimilanAM7315", "HimilanAM7317", "Himilan AM7318", "Himilan AM7329", "Himilan MK7320", and "Himilan MK7329", manufactured by Du Pont-MITSUI POLYCHEMICALS Co., Ltd.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000", and "HPF2000", manufactured by E.I. du Pont de Nemours and Company; and trade names "IOTEK 7010", "IOTEK 7030", "IOTEK 7510", "IOTEK 7520", "IOTEK 8000", and "IOTEK 8030", manufactured by ExxonMobil Chemical Company.

Two or more ionomer resins may be used in combination for the first mid layer 6. An ionomer resin neutralized with a monovalent metal ion, and an ionomer resin neutralized with a bivalent metal ion may be used in combination.

A preferable resin that can be used in combination with an ionomer resin is a styrene block-containing thermoplastic elastomer. The styrene block-containing thermoplastic elastomer has excellent compatibility with ionomer resins. A resin composition including the styrene block-containing thermoplastic elastomer has excellent fluidity.

The styrene block-containing thermoplastic elastomer includes a polystyrene block as a hard segment, and a soft segment. A typical soft segment is a diene block. Examples of compounds for the diene block include butadiene, isoprene, 1,3-pentadiene, and 2,3-dimethyl-1,3-butadiene. Butadiene and isoprene are preferred. Two or more compounds may be used in combination.

Examples of styrene block-containing thermoplastic elastomers include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS include styrene-ethylene-butylene-styrene block copolymers (SEBS). Examples of hydrogenated SIS include styrene-ethylene-propylene-styrene block copolymers (SEPS). Examples of hydrogenated SIBS include styrene-ethylene-ethylene-propylene-styrene block copolymers (SEEPS).

In light of resilience performance of the golf ball 2, the content of the styrene component in the styrene block-containing thermoplastic elastomer is preferably equal to or greater than 10% by weight, more preferably equal to or greater than 12% by weight, and particularly preferably equal to or greater than 15% by weight. In light of feel at impact of the golf ball 2, the content is preferably equal to or less than 50% by weight, more preferably equal to or less than 47% by weight, and particularly preferably equal to or less than 45% by weight.

In the present invention, styrene block-containing thermoplastic elastomers include an alloy of an olefin and one or more members selected from the group consisting of SBS, SIS, SIBS, SEBS, SEPS, and SEEPS. The olefin component in the alloy is presumed to contribute to improvement of compatibility with ionomer resins. Use of this alloy improves the resilience performance of the golf ball 2. An olefin having 2 to 10 carbon atoms is preferably used. Examples of suitable olefins include ethylene, propylene, butene, and pentene. Ethylene and propylene are particularly preferred.

Specific examples of polymer alloys include trade names "Rabalon T3221C", "Rabalon T3339C", "Rabalon SJ4400N", "Rabalon SJ5400N", "Rabalon SJ6400N", "Rabalon SJ7400N", "Rabalon SJ8400N", "Rabalon SJ9400N", and "Rabalon SR04", manufactured by Mitsubishi Chemical Corporation. Other specific examples of styrene block-containing thermoplastic elastomers include trade name "Epofriend A1010" manufactured by Daicel Chemical Industries, Ltd., and trade name "Septon HG-252" manufactured by Kuraray Co., Ltd.

The first mid layer 6 may include a highly elastic resin as the base polymer. The highly elastic resin contributes to high rigidity of the first mid layer 6. Specific examples of the highly elastic resin include polyamides.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the resin composition of the first mid layer 6 in an adequate amount.

From the standpoint that an outer-hard/inner-soft structure can be achieved in the sphere consisting of the core 4 and the first mid layer 6, the first mid layer 6 has a hardness Hm1 of preferably 30 or greater and more preferably 40 or greater. In light of controllability, the hardness Hm1 is preferably equal to or less than 60 and more preferably equal to or less than 54. The hardness Hm1 is measured according to the standards of "ASTM-D 2240-68" with a Shore D type hardness scale mounted to an automated rubber hardness measurement machine (trade name "P1", manufactured by Kobunshi Keiki Co., Ltd.). For the measurement, a slab that is formed by hot press and that has a thickness of about 2 mm is used. A slab kept at 23° C. for two weeks is used for the measurement. At the measurement, three slabs are stacked. A slab formed from the same resin composition as the resin composition of the first mid layer 6 is used.

The first mid layer 6 preferably has a thickness Tm1 of 0.5 mm or greater but 1.6 mm or less. The first mid layer 6 having a thickness Tm1 of 0.5 mm or greater can contribute to the durability of the golf ball 2. In this respect, the thickness Tm1 is particularly preferably equal to or greater than 0.7 mm. The golf ball 2 that includes the first mid layer 6 having a thickness Tm1 of 1.6 mm or less can include a large core 4. The large core 4 can contribute to the resilience performance of the golf ball 2. In this respect, the thickness Tm1 is particularly preferably equal to or less than 1.4 mm.

For forming the first mid layer 6, known methods such as injection molding, compression molding, or the like can be used.

For the second mid layer 8, a resin composition is suitably used. A preferable base polymer of the resin composition is an ionomer resin. The golf ball 2 that includes the second mid layer 8 including the ionomer resin has excellent resilience performance. The ionomer resin described above for the first mid layer 6 can be used for the second mid layer 8.

An ionomer resin and another resin may be used in combination. In this case, the ionomer resin is included as the principal component of the base polymer, in light of resilience performance. The proportion of the ionomer resin to the entire base polymer is preferably equal to or greater than 50% by weight, more preferably equal to or greater than 60% by weight, and particularly preferably equal to or greater than 70% by weight.

A preferable other resin that can be used in combination with an ionomer resin is a styrene block-containing thermoplastic elastomer. The styrene block-containing thermoplastic elastomer described above for the first mid layer 6 can be used for the second mid layer 8.

According to need, a coloring agent such as titanium dioxide and a fluorescent pigment, a filler such as barium sulfate, a dispersant, an antioxidant, an ultraviolet absorber, a light stabilizer, a fluorescent material, a fluorescent brightener, and the like are included in the second mid layer 8 in an adequate amount.

From the standpoint that an outer-hard/inner-soft structure can be achieved in the sphere consisting of the core 4, the first mid layer 6, and the second mid layer 8, the second mid layer 8 has a hardness Hm2 of preferably 55 or greater and more preferably 60 or greater. In light of controllability, the hardness Hm2 is preferably equal to or less than 70 and more preferably equal to or less than 68. The hardness Hm2 is measured by the same measurement method as that for the hardness Hm1.

The second mid layer 8 preferably has a thickness Tm2 of 0.5 mm or greater but 1.6 mm or less. The second mid layer 8 having a thickness Tm2 of 0.5 mm or greater can contribute to the durability of the golf ball 2. In this respect, the thickness Tm2 is particularly preferably equal to or greater than 0.7 mm. The golf ball 2 that includes the second mid layer 8 having a thickness Tm2 of 1.6 mm or less can include a large core 4. The large core 4 can contribute to the resilience performance of the golf ball 2. In this respect, the thickness Tm2 is particularly preferably equal to or less than 1.4 mm.

For forming the second mid layer 8, known methods such as injection molding, compression molding, and the like can be used.

For the cover 12, a resin composition is suitably used. A preferable base polymer of the resin composition is a polyurethane. The polyurethane is flexible. When the golf ball 2 that includes the cover 12 formed from the resin composition that includes the polyurethane is hit with a short iron, the spin rate is high. The cover 12 formed from this resin composition contributes to controllability upon a shot with a short iron. Furthermore, the polyurethane can also contribute to excellent feel at impact when the golf ball 2 is hit with a putter or a short iron.

In light of ease of forming the cover 12, a preferable base polymer is a thermoplastic polyurethane elastomer. The thermoplastic polyurethane elastomer includes a polyurethane component as a hard segment, and a polyester component or a polyether component as a soft segment. Examples of isocyanates for the polyurethane component include alicyclic diisocyanates, aromatic diisocyanates, and aliphatic diisocyanates. Two or more diisocyanates may be used in combination.

Examples of alicyclic diisocyanates include 4,4'-dicyclohexylmethane diisocyanate ($H_{12}MDI$), 1,3-bis(isocyanatomethyl)cyclohexane ($H_6XDI$), isophorone diisocyanate (IPDI), and trans-1,4-cyclohexane diisocyanate (CHDI). In light of versatility and processability, $H_{12}MDI$ is preferred.

Examples of aromatic diisocyanates include 4,4'-diphenylmethane diisocyanate (MDI) and toluene diisocyanate (TDI). Examples of aliphatic diisocyanates include hexamethylene diisocyanate (HDI).

Specific examples of thermoplastic polyurethane elastomers include trade names "Elastollan NY80A", "Elastollan NY82A", "Elastollan NY84A", "Elastollan NY85A", "Elastollan NY88A", "Elastollan NY90A", "Elastollan NY97A", "Elastollan NY585", and "Elastollan XKP016N", manufactured by BASF Japan Ltd.; and trade names "RESAMINE P4585LS" and "RESAMINE PS62490", manufactured by Dainichiseika Color & Chemicals Mfg. Co., Ltd.

From the standpoint that a low hardness of the cover 12 can be achieved, particularly preferable thermoplastic polyurethane elastomers are "Elastollan NY80A", "Elastollan NY82A", "Elastollan NY84A", "Elastollan NY85A", and "Elastollan NY90A".

A thermoplastic polyurethane elastomer and another resin may be used in combination. Examples of the resin that can be used in combination include thermoplastic polyester elastomers, thermoplastic polyamide elastomers, thermoplastic polyolefin elastomers, styrene block-containing thermoplastic elastomers, and ionomer resins. When a thermoplastic polyurethane elastomer and another resin are used in combination, the thermoplastic polyurethane elastomer is included as the principal component of the base polymer, in light of spin performance. The proportion of the thermoplastic polyurethane elastomer to the entire base polymer is preferably equal to or greater than 50% by weight, more preferably equal to or greater than 70% by weight, and particularly preferably equal to or greater than 85% by weight.

According to need, a coloring agent such as titanium dioxide and a fluorescent pigment, a filler such as barium sulfate, a dispersant, an antioxidant, an ultraviolet absorber, a light stabilizer, a fluorescent material, a fluorescent brightener, and the like are included in the cover 12 in an adequate amount.

The cover 12 preferably has a Shore D hardness Hc of 55 or less. The golf ball 2 that includes the cover 12 having a hardness Hc of 55 or less has excellent controllability. In this respect, the hardness Hc is more preferably equal to or less than 50 and particularly preferably equal to or less than 48. In light of flight distance upon a shot with a driver, the hardness Hc is preferably equal to or greater than 10. The hardness Hc is measured by the same measurement method as that for the hardness Hm1.

The cover 12 preferably has a thickness Tc of 1.1 mm or less. The golf ball 2 having a thickness Tc of 1.1 mm or less has excellent resilience performance. In this respect, the thickness Tc is more preferably equal to or less than 1.0 mm and particularly preferably equal to or less than 0.8 mm. In light of controllability, the thickness Tc is preferably equal to or greater than 0.1 mm.

For forming the cover 12, known methods such as injection molding, compression molding, and the like can be used. When forming the cover 12, the dimples 14 are formed by pimples formed on the cavity face of a mold.

In the golf ball 2, the first mid layer 6 is positioned outside the core 4, and the second mid layer 8 is positioned outside the first mid layer 6. In other words, the core 4 is covered with the first mid layer 6 and the second mid layer 8. The first mid layer 6 and the second mid layer 8 can contribute to the durability of the golf ball 2. In this respect, the sum (Tm1+Tm2) of the thickness Tm1 of the first mid layer 6 and the thickness Tm2 of the second mid layer 8 is preferably equal to or greater than 1.0 mm and more preferably equal to or greater than 1.3 mm. A large core 4 can contribute to the resilience performance of the golf ball 2. In this respect, the sum (Tm1+Tm2) is preferably equal to or less than 3.2 mm and more preferably equal to or less than 3.0 mm.

In the golf ball 2, the hardness Hm1 of the first mid layer 6, the hardness Hm2 of the second mid layer 8, and the hardness Hc of the cover 12 meet the relationships of the following mathematical formulas.

$$Hm2 > Hm1$$

$$Hm2 > Hc$$

When the golf ball 2 is hit with a driver, the sphere consisting of the core 4, the first mid layer 6, and the second mid layer 8 becomes significantly distorted since the head speed is high. Since this sphere has an outer-hard/inner-soft structure, the spin rate is suppressed. The hardness of the core 4 linearly changes. Thus, the golf ball 2 is launched at a high speed due to deformation and restoration of the core 4. The suppression of the spin rate and the high launch speed achieve a large flight distance. When the golf ball 2 is hit with a short iron, this sphere becomes less distorted since the head speed is low. When the golf ball 2 is hit with a short iron, the behavior of the golf ball 2 depends on the cover 12. Since the cover 12 is flexible, a slip between the golf ball 2 and a clubface is suppressed. Due to the suppression of the slip, a high spin rate is obtained. The high spin rate achieves excellent controllability. In the golf ball 2, both desired flight performance upon a shot with a driver and desired controllability upon a shot with a short iron are achieved.

When the golf ball 2 is hit, the cover 12 absorbs the shock. This absorption achieves soft feel at impact. Particularly, when the golf ball 2 is hit with a short iron or a putter, the cover 12 achieves excellent feel at impact.

In light of achievement of both desired flight performance and desired controllability, the difference (Hm2−Hm1) between the hardness Hm2 and the hardness Hm1 is preferably equal to or greater than 8 and more preferably equal to or greater than 14. The difference (Hm2−Hm1) is preferably equal to or less than 40.

In light of achievement of both desired flight performance and desired controllability, the difference (Hm2−Hc) between the hardness Hm2 and the hardness Hc is preferably equal to or greater than 15 and more preferably equal to or greater than 17. The difference (Hm2−Hc) is preferably equal to or less than 60.

In the golf ball 2, the hardness Hm1 of the first mid layer 6 and the hardness Hc of the cover 12 preferably meet the relationship of the following mathematical formula.

Hm1>Hc

The golf ball 2 has excellent controllability and excellent feel at impact.

In light of controllability and feel at impact, the difference (Hm1−Hc) between the hardness Hm1 of the first mid layer 6 and the hardness Hc of the cover 12 is preferably equal to or greater than 1. In light of durability, the difference (Hm1−Hc) is preferably equal to or less than 25.

The reinforcing layer 10 is positioned between the second mid layer 8 and the cover 12. The reinforcing layer 10 firmly adheres to the second mid layer 8 and also to the cover 12. The reinforcing layer 10 suppresses separation of the cover 12 from the second mid layer 8. In the golf ball 2, when the second mid layer 8 is formed from a resin composition and the cover 12 is formed from a resin composition whose base resin is different from the base resin of the second mid layer 8, the reinforcing layer 10 effectively suppresses separation of the cover 12 from the second mid layer 8.

As the base polymer of the reinforcing layer 10, a two-component curing type thermosetting resin is suitably used. Specific examples of two-component curing type thermosetting resins include epoxy resins, urethane resins, acrylic resins, polyester resins, and cellulose resins. In light of strength and durability of the reinforcing layer 10, two-component curing type epoxy resins and two-component curing type urethane resins are preferred.

A two-component curing type epoxy resin is obtained by curing an epoxy resin with a polyamide type curing agent. Examples of epoxy resins used in two-component curing type epoxy resins include bisphenol A type epoxy resins, bisphenol F type epoxy resins, and bisphenol AD type epoxy resins. A bisphenol A type epoxy resin is obtained by a reaction of bisphenol A and an epoxy group-containing compound such as epichlorohydrin or the like. A bisphenol F type epoxy resin is obtained by a reaction of bisphenol F and an epoxy group-containing compound. A bisphenol AD type epoxy resin is obtained by a reaction of bisphenol AD and an epoxy group-containing compound. In light of balance among flexibility, chemical resistance, heat resistance, and toughness, bisphenol A type epoxy resins are preferred.

The polyamide type curing agent has a plurality of amino groups and one or more amide groups. The amino groups can react with epoxy groups. Specific examples of the polyamide type curing agent include polyamide amine curing agents and modified products thereof. A polyamide amine curing agent is obtained by a condensation reaction of a polymerized fatty acid and a polyamine. A typical polymerized fatty acid is obtained by heating and combining natural fatty acids including a large amount of unsaturated fatty acids, such as linoleic acid, linolenic acid, and the like, in the presence of a catalyst. Specific examples of unsaturated fatty acids include tall oil, soybean oil, linseed oil, and fish oil. A hydrogenated polymerized fatty acid having a dimer content of 90% by weight or greater and a trimer content of 10% by weight or less is preferred. Examples of preferable polyamines include polyethylene diamines, polyoxyalkylene diamines, and derivatives thereof.

In a mixture of an epoxy resin and a polyamide type curing agent, the ratio of the epoxy equivalent of the epoxy resin to the amine active hydrogen equivalent of the polyamide type curing agent is preferably equal to or greater than 1.0/1.4 but equal to or less than 1.0/1.0.

A two-component curing type urethane resin is obtained by a reaction of a base material and a curing agent. A two-component curing type urethane resin obtained by a reaction of a base material containing a polyol component and a curing agent containing a polyisocyanate or a derivative thereof, and a two-component curing type urethane resin obtained by a reaction of a base material containing an isocyanate group-terminated urethane prepolymer and a curing agent having active hydrogen, can be used. Particularly, a two-component curing type urethane resin obtained by a reaction of a base material containing a polyol component and a curing agent containing a polyisocyanate or a derivative thereof, is preferred.

As the polyol component of the base material, a urethane polyol is preferably used. The urethane polyol has urethane bonds and at least two or more hydroxyl groups. Preferably, the urethane polyol has hydroxyl groups at its ends. The urethane polyol can be obtained by causing a reaction of a polyol and a polyisocyanate at such a ratio that the hydroxyl groups of the polyol component are excessive in mole ratio with respect to the isocyanate groups of the polyisocyanate.

The polyol used for producing the urethane polyol has a plurality of hydroxyl groups. Polyols having a weight average molecular weight of 50 or greater but 2000 or less are preferred, and polyols having a weight average molecular weight of 100 or greater but 1000 or less are particularly preferred. Examples of low-molecular-weight polyols include diols and triols. Specific examples of diols include ethylene glycol, diethylene glycol, triethylene glycol, 1,3-butanediol, 1,4-butanediol, neopentyl glycol, and 1,6-hexanediol. Specific examples of triols include trimethylol propane and hexanetriol. Examples of high-molecular-weight polyols include polyether polyols such as polyoxyethylene glycol (PEG), polyoxypropylene glycol (PPG), and polyoxytetramethylene glycol (PTMG); condensed polyester polyols such as polyethylene adipate (PEA), polybutylene adipate (PBA), and polyhexamethylene adipate (PHMA); lactone polyester polyols such as poly-ε-caprolactone (PCL); polycarbonate polyols such as polyhexamethylene carbonate; and acrylic polyols. Two or more polyols may be used in combination.

The polyisocyanate used for producing the urethane polyol has a plurality of isocyanate groups. Specific examples of the polyisocyanate include aromatic polyisocyanates such as 2,4-toluene diisocyanate, 2,6-toluene diisocyanate, a mixture (TDI) of 2,4-toluene diisocyanate and 2,6-toluene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and paraphenylene diisocyanate (PPDI); alicyclic polyisocyanates such as 4,4'-dicyclohexylmethane diisocyanate ($H_{12}$MDI), hydrogenated xylylene diisocyanate ($H_6$XDI), and isophorone diisocyanate (IPDI); and aliphatic polyisocyanates such as hexamethylene diisocyanate (HDI). Two or more of these polyisocyanates may be used in combination.

In light of weather resistance, TMXDI, XDI, HDI, H$_6$XDI, IPDI, and H$_{17}$MDI are preferred.

In the reaction of the polyol and the polyisocyanate for producing the urethane polyol, a known catalyst can be used. A typical catalyst is dibutyl tin dilaurate.

In light of strength of the reinforcing layer 10, the proportion of the urethane bonds included in the urethane polyol is preferably equal to or greater than 0.1 mmol/g. In light of followability of the reinforcing layer 10 to the cover 12, the proportion of the urethane bonds included in the urethane polyol is preferably equal to or less than 5 mmol/g. The proportion of the urethane bonds can be adjusted by adjusting the molecular weight of the polyol, which is the material for the urethane polyol, and adjusting the blending ratio of the polyol and the polyisocyanate.

From the standpoint that the time taken for the reaction of the base material and the curing agent is short, the weight average molecular weight of the urethane polyol is preferably equal to or greater than 4000 and particularly preferably equal to or greater than 4500. In light of adhesion of the reinforcing layer 10, the weight average molecular weight of the urethane polyol is preferably equal to or less than 10000 and particularly preferably equal to or less than 9000.

In light of adhesion of the reinforcing layer 10, the hydroxyl value (mg KOH/g) of the urethane polyol is preferably equal to or greater than 15 and particularly preferably equal to or greater than 73. From the standpoint that the time taken for the reaction of the base material and the curing agent is short, the hydroxyl value of the urethane polyol is preferably equal to or less than 130 and particularly preferably equal to or less than 120.

The base material may contain, together with a urethane polyol, a polyol that does not have any urethane bond. The aforementioned polyol that is the material for the urethane polyol can be used in the base material. Polyols compatible with the urethane polyol are preferred. From the standpoint that the time taken for the reaction of the base material and the curing agent is short, the proportion of the urethane polyol in the base material on the solid content basis is preferably equal to or greater than 50% by weight and particularly preferably equal to or greater than 80% by weight. Ideally, the proportion is 100% by weight.

The curing agent contains a polyisocyanate or a derivative thereof. The aforementioned polyisocyanate that is the material for the urethane polyol can be used in the curing agent.

The reinforcing layer 10 may include additives such as a coloring agent (typically, titanium dioxide), a phosphate-based stabilizer, an antioxidant, a light stabilizer, a fluorescent brightener, an ultraviolet absorber, an anti-blocking agent, and the like. The additives may be added to the base material of the two-component curing type thermosetting resin, or may be added to the curing agent of the two-component curing type thermosetting resin.

The reinforcing layer 10 is obtained by applying, to the surface of the second mid layer 8, a liquid that is prepared by dissolving or dispersing the base material and the curing agent in a solvent. In light of workability, application with a spray gun is preferred. After the application, the solvent is volatilized to permit a reaction of the base material with the curing agent, thereby forming the reinforcing layer 10. Examples of preferable solvents include toluene, isopropyl alcohol, xylene, methyl ethyl ketone, methyl isobutyl ketone, ethylene glycol monomethyl ether, ethylbenzene, propylene glycol monomethyl ether, isobutyl alcohol, and ethyl acetate.

In light of feel at impact, the golf ball 2 has an amount of compressive deformation (comp'n) of preferably 2.3 mm or greater, more preferably 2.5 mm or greater, and particularly preferably 2.7 mm or greater. In light of resilience performance, the amount of compressive deformation is preferably equal to or less than 3.5 mm, more preferably equal to or less than 3.3 mm, and particularly preferably equal to or less than 3.1 mm.

For measurement of the amount of compressive deformation, a YAMADA type compression tester is used. In the tester, the golf ball 2 is placed on a hard plate made of metal. Next, a cylinder made of metal gradually descends toward the golf ball 2. The golf ball 2, squeezed between the bottom face of the cylinder and the hard plate, becomes deformed. A migration distance of the cylinder, starting from the state in which an initial load of 98 N is applied to the golf ball 2 up to the state in which a final load of 1274 N is applied thereto, is measured.

Second Embodiment

Figure 3:
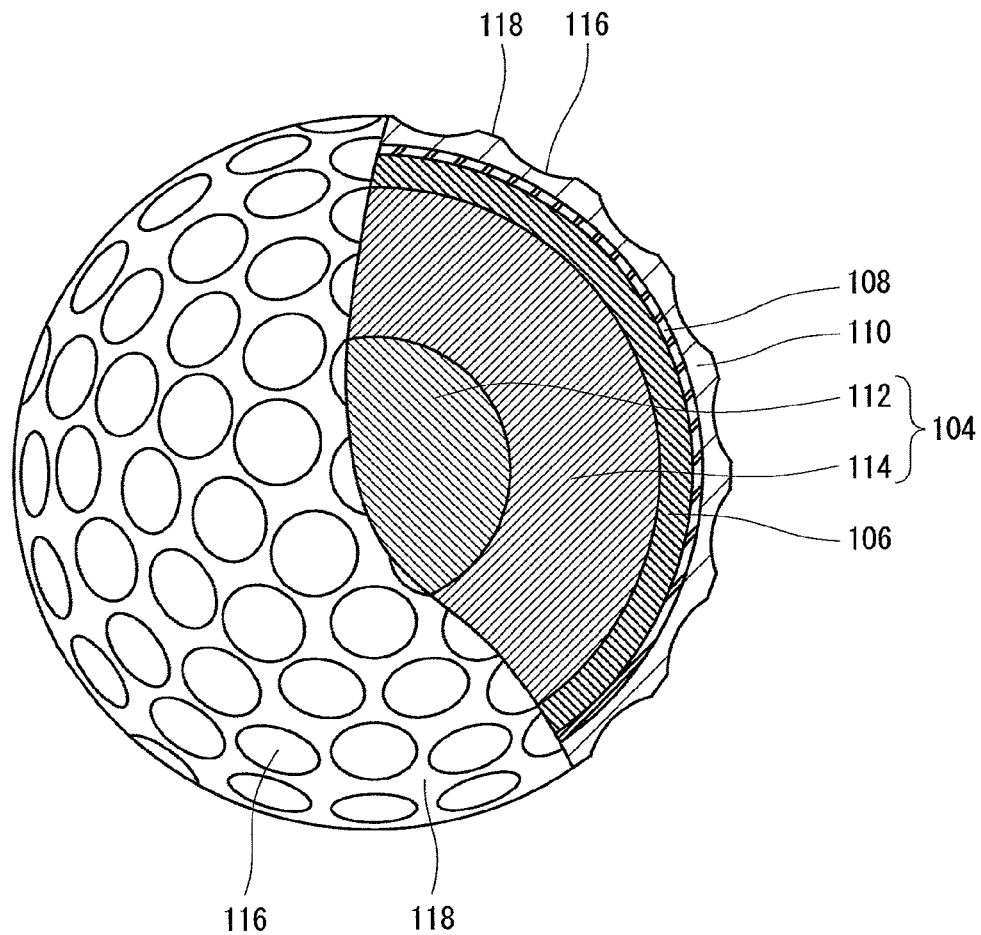
FIG. 3 is a partially cutaway cross-sectional view of a golf ball according to a second embodiment of the present invention.

FIG. 3 shows a golf ball 102 according to a second embodiment of the present invention. The golf ball 102 includes a spherical core 104, a mid layer 106 positioned outside the core 104, a reinforcing layer 108 positioned outside the mid layer 106, and a cover 110 positioned outside the reinforcing layer 108. The core 104 includes a spherical center 112 and an envelope layer 114 positioned outside the center 112. On the surface of the cover 110, a large number of dimples 116 are formed. Of the surface of the golf ball 102, a part other than the dimples 116 is a land 118. The golf ball 102 includes a paint layer and a mark layer on the external side of the cover 110, but these layers are not shown in the drawing.

The golf ball 102 preferably has a diameter of 40 mm or greater but 45 mm or less. From the standpoint of conformity to the rules established by the United States Golf Association (USGA), the diameter is particularly preferably equal to or greater than 42.67 mm. In light of suppression of air resistance, the diameter is more preferably equal to or less than 44 mm and particularly preferably equal to or less than 42.80 mm. The golf ball 102 preferably has a weight of 40 g or greater but 50 g or less. In light of attainment of great inertia, the weight is more preferably equal to or greater than 44 g and particularly preferably equal to or greater than 45.00 g. From the standpoint of conformity to the rules established by the USGA, the weight is particularly preferably equal to or less than 45.93 g.

In the present invention, JIS-C hardnesses are measured at ten measuring points from the central point of the core 104 to the surface of the core 104. The ratio of the distance from the central point of the core 104 to each of these measuring points to the radius of the core 104 is as follows.

First point: 0.0% (central point)
Second point: 12.5%
Third point: 25.0%
Fourth point: 37.5%
Fifth point: 45.0%
Sixth point: 50.0%
Seventh point: 62.5%
Eighth point: 75.0%
Ninth point: 87.5%
Tenth point: 100.0% (surface)

Hardnesses at the first to ninth points are measured by pressing a JIS-C type hardness scale against a cut plane of the core 104 that has been cut into two halves. A hardness at the tenth point is measured by pressing the JIS-C type hardness scale against the surface of the spherical core 104. For the measurement, an automated rubber hardness measurement machine (trade name "P1", manufactured by Kobunshi Keiki Co., Ltd.), to which this hardness scale is mounted, is used.

Figure 4:
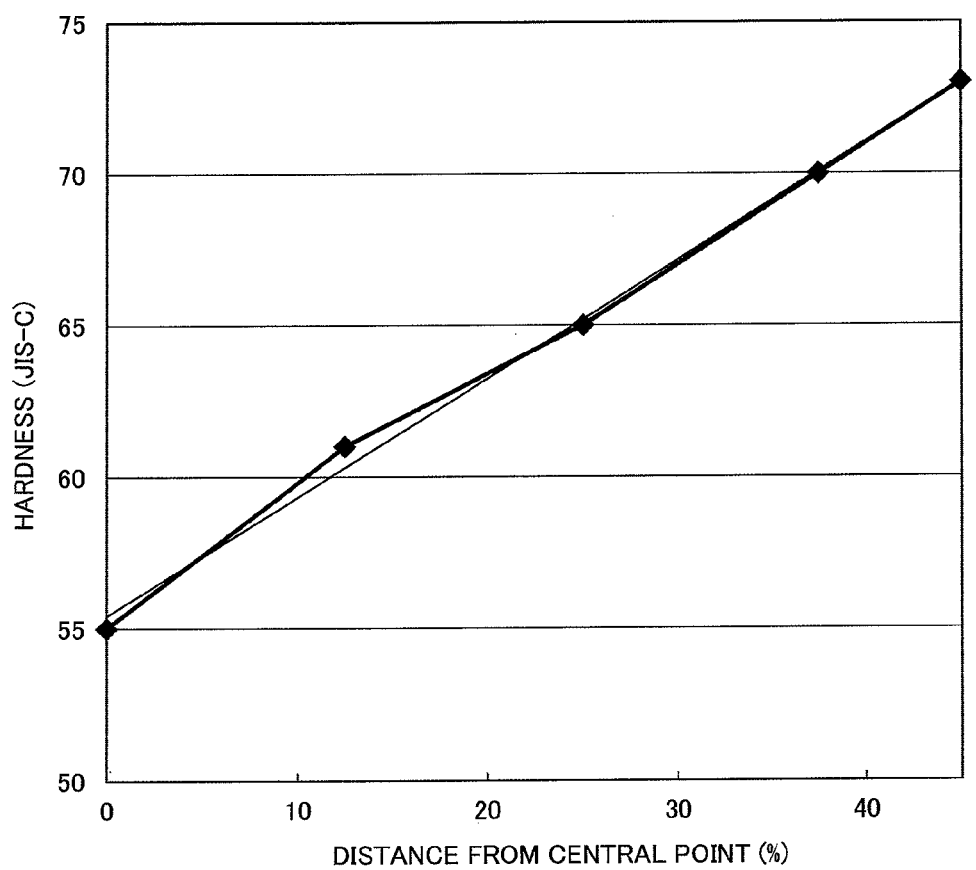
FIG. 4 is a line graph showing a hardness distribution of a center of the golf ball in FIG. 3.

FIG. 4 is a line graph showing a hardness distribution of the center 112 of the golf ball 102 in FIG. 3. The horizontal axis of the graph indicates the ratio (%) of a distance from the central point of the core 104 to the radius of the core 104. The vertical axis of the graph indicates a JIS-C hardness. In the graph, the points included in the center 112, among the first to tenth points, are plotted. In the present embodiment, five points including the first to fifth points are plotted in the graph.

FIG. 4 also shows a linear approximation curve obtained by a least-square method on the basis of the ratios and the hardnesses of the five measuring points. In FIG. 4, the broken line does not greatly deviate from the linear approximation curve. In other words, the broken line has a shape close to the linear approximation curve. In the center 112, the hardness linearly increases from its central point toward its surface. When the golf ball 102 is hit with a driver, the energy loss is low in the center 112. The golf ball 102 has excellent resilience performance. When the golf ball 102 is hit with a driver, the flight distance is large. When the golf ball 102 is hit with a golf club, stress concentration does not occur. Thus, the golf ball 102 has excellent durability.

$R^2$ of the linear approximation curve obtained for the center 112 by the least-square method is preferably equal to or greater than 0.95. $R^2$ is an index indicating the linearity of the broken line. For the center 112 for which $R^2$ is equal to or greater than 0.95, the shape of the broken line of the hardness distribution is close to a straight line. The golf ball 102 that includes the center 112 for which $R^2$ is equal to or greater than 0.95 has excellent resilience performance. $R^2$ is more preferably equal to or greater than 0.96 and particularly preferably equal to or greater than 0.97. $R^2$ is calculated by squaring a correlation coefficient R. The correlation coefficient R is calculated by dividing the covariance of the distance (%) from the central point and the hardness (JIS-C) by the standard deviation of the distance (%) from the central point and the standard deviation of the hardness (JIS-C).

In light of suppression of spin, the gradient a of the linear approximation curve is preferably equal to or greater than 0.30, more preferably equal to or greater than 0.33, and particularly preferably equal to or greater than 0.35.

In the present invention, a JIS-C hardness at a measuring point whose ratio of the distance from the central point of the core 104 to the radius of the core 104 is x (%) is represented by H(x). The hardness at the central point of the core 104 is represented by H(0), and the surface hardness of the core 104 is represented by Hs. The difference (Hs−H(0)) between the surface hardness Hs and the central hardness H(0) is preferably equal to or greater than 20. The core 104 in which the difference (Hs−H(0)) is equal to or greater than 20 has an outer-hard/inner-soft structure. When the golf ball 102 is hit with a driver, the recoil (torsional return) in the core 104 is great, and thus spin is suppressed. The core 104 contributes to the flight performance of the golf ball 102. In light of flight performance, the difference (Hs−H(0)) is more preferably equal to or greater than 25 and particularly preferably equal to or greater than 28. From the standpoint that the core 104 can easily be formed, the difference (Hs−H(0)) is preferably equal to or less than 50. In the core 104, the hardness gradually increases from its central point toward its surface.

The center 112 is formed by crosslinking a rubber composition. The rubber composition includes:

(a) a base rubber;
(b) a co-crosslinking agent;
(c) a crosslinking initiator; and
(d) an acid and/or a salt.

The rubber composition of the center 112 can include, as the base rubber (a), the base rubber (1a) described above for the first rubber composition of the center 18 according to the first embodiment.

The rubber composition of the center 112 can include, as the co-crosslinking agent (b), the co-crosslinking agent (1b) described above for the first rubber composition of the center 18 according to the first embodiment. The co-crosslinking agent (b) is:

(b1) an α,β-unsaturated carboxylic acid having 3 to 8 carbon atoms; and
(b2) a metal salt of an α,β-unsaturated carboxylic acid having 3 to 8 carbon atoms.

When the rubber composition includes the α,β-unsaturated carboxylic acid (b1), the rubber composition preferably further includes a metal compound (f). The metal compound (f) reacts with the α,β-unsaturated carboxylic acid (b1) in the rubber composition. A salt obtained by this reaction graft-polymerizes with the molecular chain of the base rubber. The rubber composition of the center 112 can include, as the metal compound (f), the metal compound (1f) described above for the first rubber composition of the center 18 according to the first embodiment.

In light of resilience performance of the golf ball 102, the amount of the co-crosslinking agent (b) is preferably equal to or greater than 15 parts by weight and particularly preferably equal to or greater than 20 parts by weight, per 100 parts by weight of the base rubber. In light of feel at impact, the amount is preferably equal to or less than 50 parts by weight, more preferably equal to or less than 45 parts by weight, and particularly preferably equal to or less than 40 parts by weight, per 100 parts by weight of the base rubber.

The rubber composition of the center 112 can include, as the crosslinking initiator (c), the crosslinking initiator (1c) described above for the first rubber composition of the center 18 according to the first embodiment. In light of resilience performance of the golf ball 102, the amount of the crosslinking initiator (c) is preferably equal to or greater than 0.2 parts by weight and particularly preferably equal to or greater than 0.5 parts by weight, per 100 parts by weight of the base rubber. In light of feel at impact and durability of the golf ball 102, the amount is preferably equal to or less than 5.0 parts by weight and particularly preferably equal to or less than 2.5 parts by weight, per 100 parts by weight of the base rubber.

During heating and forming of the center 112, the base rubber (a) is crosslinked by the co-crosslinking agent (b). The heat of the crosslinking reaction remains near the central point of the center 112. Thus, during heating and forming of the center 112, the temperature at the central portion is high. The temperature gradually decreases from the central point toward the surface. It is inferred that in the rubber composition, the acid reacts with a metal salt of the co-crosslinking agent (b) to bond to cation. It is inferred that in the rubber composition, the salt reacts with the metal salt of the co-crosslinking agent (b) to exchange cation. By the bonding and the exchange, metal crosslinks are broken. The breaking is likely to occur in the central portion of the center 112 where the temperature is high, and is unlikely to occur near the surface of the center 112. As a result, the crosslinking density of the center 112 increases from its central point toward its surface. In the center 112, an outer-hard/ inner-soft structure can be achieved. When the golf ball 102 that includes the center 112 is hit with a driver, the spin rate is low. In the golf ball 102, excellent flight performance is achieved upon a shot with a driver.

The rubber composition of the center 112 can include, as the acid and/or the salt (d), the acid and/or the salt (1d) described above for the first rubber composition of the center 18 according to the first embodiment. Thus, the acid and/or the salt (d) is not included in the concept of the co-crosslinking agent (b). Examples of the acid and/or the salt (d) include oxo acids, such as carboxylic acids, sulfonic acids, and phosphoric acid, and salts thereof; and hydroacids, such as hydrochloric acid and hydrofluoric acid, and salts thereof. Oxo acids and salts thereof are preferred. A carboxylic acid and/or a salt thereof (d1) is more preferred. Carboxylates are particularly preferred.

In light of linearity of the hardness distribution of the center 112, the amount of the acid and/or the salt (d) is preferably equal to or greater than 1.0 parts by weight, more preferably equal to or greater than 2.0 parts by weight, and particularly preferably equal to or greater than 3.0 parts by weight, per 100 parts by weight of the base rubber. In light of resilience performance, the amount is preferably less than 40 parts by weight, more preferably equal to or less than 35 parts by weight, and particularly preferably equal to or less than 30 parts by weight, per 100 parts by weight of the base rubber.

The weight ratio of the co-crosslinking agent (b) and the acid and/or the salt (d) in the rubber composition is preferably equal to or greater than 3/7 but equal to or less than 9/1. From the rubber composition in which this weight ratio is within the above range, the center 112 whose hardness linearly increases from its inside toward its outside can be obtained.

As the co-crosslinking agent (b), zinc acrylate is preferably used. Zinc acrylate whose surface is coated with stearic acid or zinc stearate for the purpose of improving dispersibility to rubber is present. In the present invention, when the rubber composition includes this zinc acrylate, this coating material is not included in the concept of the acid and/or the salt (d).

The rubber composition of the center 112 can include, as the organic sulfur compound (e), the organic sulfur compound (1e) described above for the first rubber composition of the center 18 according to the first embodiment. The organic sulfur compound (e) increases the linearity of the hardness distribution of the center 112. In addition, the organic sulfur compound (e) increases the degree of the outer-hard/inner-soft structure.

From the standpoint that an outer-hard/inner-soft structure is easily obtained, the amount of the organic sulfur compound (e) is preferably equal to or greater than 0.05 parts by weight, more preferably equal to or greater than 0.1 parts by weight, and particularly preferably equal to or greater than 0.2 parts by weight, per 100 parts by weight of the base rubber. In light of resilience performance, the amount is preferably equal to or less than 5.0 parts by weight, more preferably equal to or less than 3.0 parts by weight, and particularly preferably equal to or less than 1.0 parts by weight, per 100 parts by weight of the base rubber.

For the purpose of adjusting specific gravity and the like, a filler may be included in the center 112. Examples of suitable fillers include zinc oxide, barium sulfate, calcium carbonate, and magnesium carbonate. The amount of the filler is determined as appropriate so that the intended specific gravity of the center 112 is accomplished. A particularly preferable filler is zinc oxide. Zinc oxide serves not only as a specific gravity adjuster but also as a crosslinking activator.

According to need, an anti-aging agent, a coloring agent, a plasticizer, a dispersant, sulfur, a vulcanization accelerator, and the like are added to the rubber composition of the center 112. Crosslinked rubber powder or synthetic resin powder may also be dispersed in the rubber composition.

The center 112 preferably has a diameter of 10 mm or greater but 25 mm or less. The center 112 having a diameter of 10 mm or greater can contribute to suppression of spin. In this respect, the diameter is particularly preferably equal to or greater than 15 mm. The golf ball 102 that includes the center 112 having a diameter of 25 mm or less has excellent resilience performance. In this respect, the diameter is particularly preferably equal to or less than 20 mm.

The envelope layer 114 is formed by crosslinking a rubber composition. The rubber composition described above for the center 112 can be used for the envelope layer 114. The rubber composition of the envelope layer 114 may include the acid and/or the salt (d), or may not include the acid and/or the salt (d).

The hardness H(0) at the central point of the core 104 is preferably equal to or greater than 40 but equal to or less than 70. The golf ball 102 having a hardness H(0) of 40 or greater has excellent resilience performance. In this respect, the hardness H(0) is more preferably equal to or greater than 45 and particularly preferably equal to or greater than 47. In the core 104 having a hardness H(0) of 70 or less, an outer-hard/inner-soft structure can be achieved. In the golf ball 102 that includes the core 104, spin can be suppressed. In this respect, the hardness H(0) is more preferably equal to or less than 68 and particularly preferably equal to or less than 65.

The hardness Hs at the surface of the core 104 is preferably equal to or greater than 80 but equal to or less than 96. In the core 104 having a hardness Hs of 80 or greater, an outer-hard/inner-soft structure can be achieved. In the golf ball 102 that includes the core 104, spin can be suppressed. In this respect, the hardness Hs is more preferably equal to or greater than 82 and particularly preferably equal to or greater than 84. The golf ball 102 having a hardness Hs of 96 or less has excellent durability. In this respect, the hardness Hs is more preferably equal to or less than 94 and particularly preferably equal to or less than 92.

The core 104 preferably has a diameter of 38.0 mm or greater but 41.5 mm or less. The core 104 having a diameter of 38.0 mm or greater can achieve excellent resilience performance of the golf ball 102. In this respect, the diameter is more preferably equal to or greater than 39.0 mm and particularly preferably equal to or greater than 39.5 mm. In the golf ball 102 that includes the core 104 having a diameter of 41.5 mm or less, the mid layer 106 and the cover 110 can have sufficient thicknesses. The golf ball 102 that includes the mid layer 106 and the cover 110 which have large thicknesses has excellent durability. In this respect, the diameter is particularly preferably equal to or less than 41.0 mm.

For the mid layer 106, a resin composition is suitably used. Examples of the base polymer of the resin composition include ionomer resins, polystyrenes, polyesters, polyamides, and polyolefins.

Particularly preferable base polymers are ionomer resins. The golf ball 102 that includes the mid layer 106 including an ionomer resin has excellent resilience performance. An ionomer resin and another resin may be used in combination for the mid layer 106. In this case, the principal component of the base polymer is preferably the ionomer resin. Specifically, the proportion of the ionomer resin to the entire base polymer is preferably equal to or greater than 50% by weight, more preferably equal to or greater than 60% by weight, and particularly preferably equal to or greater than 70% by weight.

The mid layer 106 can include the ionomer resin described above for the golf ball 2 of the first embodiment. The mid layer 106 can include the styrene block-containing thermoplastic elastomer described above for the golf ball 2 of the first embodiment.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the resin composition of the mid layer 106 in an adequate amount.

From the standpoint that an outer-hard/inner-soft structure can be achieved in the sphere consisting of the core 104 and the mid layer 106, the mid layer 106 has a Shore D hardness Hm of preferably 48 or greater and particularly preferably 56 or greater. In light of feel at impact of the golf ball 102, the hardness Hm is preferably equal to or less than 70 and particularly preferably equal to or less than 68. The hardness Hm is measured according to the standards of "ASTM-D 2240-68" with a Shore D type hardness scale mounted to an automated rubber hardness measurement machine (trade name "P1", manufactured by Kobunshi Keiki Co., Ltd.). For the measurement, a slab that is formed by hot press and that has a thickness of about 2 mm is used. A slab kept at 23° C. for two weeks is used for the measurement. At the measurement, three slabs are stacked. A slab formed from the same resin composition as the resin composition of the mid layer 106 is used.

From the standpoint that an outer-hard/inner-soft structure can be achieved in the sphere consisting of the core 104 and the mid layer 106, the JIS-C hardness of the mid layer 106 is preferably greater than the surface hardness Hs of the core 104. In light of suppression of spin, the difference between these hardnesses is preferably equal to or greater than 2 and particularly preferably equal to or greater than 4.

The mid layer 106 preferably has a thickness of 0.5 mm or greater but 1.6 mm or less. In the sphere that includes the mid layer 106 having a thickness of 0.5 mm or greater, the spin suppression effect provided by the outer-hard/inner-soft structure is great. In this respect, the thickness is particularly preferably equal to or greater than 0.7 mm. The golf ball 102 that includes the mid layer 106 having a thickness of 1.6 mm or less can include a large core 104. The large core 104 can contribute to the resilience performance of the golf ball 102. In this respect, the thickness is particularly preferably equal to or less than 1.2 mm.

For the cover 110, a resin composition is suitably used. A preferable base polymer of the resin composition is a polyurethane or a urea resin. The polyurethane is particularly preferred. The polyurethane is flexible. When the golf ball 102 that includes the cover 110 formed from the resin composition that includes the polyurethane is hit with a short iron, the spin rate is high. The cover 110 formed from this resin composition contributes to controllability upon a shot with a short iron. The polyurethane also contributes to the scuff resistance of the cover 110. Furthermore, the polyurethane can also contribute to excellent feel at impact when the golf ball 102 is hit with a putter or a short iron.

In light of ease of forming the cover 110, a preferable base polymer is a thermoplastic polyurethane elastomer. The thermoplastic polyurethane elastomer includes a polyurethane component as a hard segment, and a polyester component or a polyether component as a soft segment. Examples of isocyanates for the polyurethane component include alicyclic diisocyanates, aromatic diisocyanates, and aliphatic diisocyanates. Two or more diisocyanates may be used in combination.

Examples of alicyclic diisocyanates include the alicyclic diisocyanates described above for the golf ball 2 of the first embodiment. Examples of aromatic diisocyanates include the aromatic diisocyanates described above for the golf ball 2 of the first embodiment. Examples of aliphatic diisocyanates include the aliphatic diisocyanate described above for the golf ball 2 of the first embodiment.

Alicyclic diisocyanates are particularly preferred. Since an alicyclic diisocyanate does not have any double bond in the main chain, the alicyclic diisocyanate suppresses yellowing of the cover 110. In addition, since an alicyclic diisocyanate has excellent strength, the alicyclic diisocyanate suppresses a scuff on the cover 110.

Specific examples of thermoplastic polyurethane elastomers include trade names "Elastollan NY80A", "Elastollan NY82A", "Elastollan NY84A", "Elastollan NY85A", "Elastollan NY88A", "Elastollan NY90A", "Elastollan NY97A", "Elastollan NY585", "Elastollan XKP016N", "Elastollan 1195ATR", "Elastollan ET890A", and "Elastollan ET88050", manufactured by BASF Japan Ltd.; and trade names "RESAMINE P4585LS" and "RESAMINE PS62490", manufactured by Dainichiseika Color & Chemicals Mfg. Co., Ltd. From the standpoint that a low hardness of the cover 110 can be achieved, "Elastollan NY80A", "Elastollan NY82A", "Elastollan NY84A", "Elastollan NY85A", and "Elastollan NY90A" are particularly preferred.

For the cover 110 of the golf ball 102, a thermoplastic polyurethane elastomer and another resin may be used in combination, similarly to the cover 12 of the golf ball 2 of the aforementioned first embodiment. Examples of the resin that can be used in combination include thermoplastic polyester elastomers, thermoplastic polyamide elastomers, thermoplastic polyolefin elastomers, styrene block-containing thermoplastic elastomers, and ionomer resins. When a thermoplastic polyurethane elastomer and another resin are used in combination, the thermoplastic polyurethane elastomer is included as the principal component of the base polymer, in light of spin performance and scuff resistance. The proportion of the thermoplastic polyurethane elastomer to the entire base polymer is preferably equal to or greater than 50% by weight, more preferably equal to or greater than 70% by weight, and particularly preferably equal to or greater than 85% by weight.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the cover 110 in an adequate amount.

The cover 110 preferably has a Shore D hardness Hc of 47 or less. In the golf ball 102 that includes the cover 110 having a hardness Hc of 47 or less, a high spin rate is obtained. The golf ball 102 has excellent controllability. In this respect, the hardness Hc is more preferably equal to or less than 40 and particularly preferably equal to or less than 36. In light of flight distance upon a shot with a driver, the hardness Hc is preferably equal to or greater than 10 and particularly preferably equal to or greater than 15. The hardness Hc is measured by the same measurement method as that for the hardness Hm.

The hardness Hc of the cover 110 is less than the hardness Hm of the mid layer 106. When the golf ball 102 is hit with a driver, the center 112 becomes significantly distorted since the head speed is high. Since the center 112 has an outer-hard/inner-soft structure, the spin rate is suppressed. The hardness of the center 112 linearly changes. Thus, the golf ball 102 is launched at a high speed due to deformation and restoration of the center 112. The suppression of the spin rate and the high launch speed achieve a large flight distance. When the golf ball 102 is hit with a short iron, the center 112 becomes less distorted since the head speed is low. When the golf ball 102 is hit with a short iron, the behavior of the golf ball 102 mainly depends on the cover 110. Since the cover 110 is flexible, a slip between the golf ball 102 and a clubface is suppressed. Due to the suppression of the slip, a high spin rate is obtained. The high spin rate achieves excellent controllability. In the golf ball 102, both desired flight performance upon a shot with a driver and desired controllability upon a shot with a short iron are achieved.

In light of achievement of both desired flight performance and desired controllability, the difference (Hm−Hc) between the hardness Hm of the mid layer 106 and the hardness Hc of the cover 110 is preferably equal to or greater than 18 and particularly preferably equal to or greater than 27. The difference (Hm−Hc) is preferably equal to or less than 50.

The hardness of the cover 110 is preferably less than the surface hardness Hs of the core 104. When the golf ball 102 is hit with a short iron, the flexible cover 110 is squeezed between the hard clubface and the hard sphere consisting of the core 104 and the mid layer 106. This squeeze suppresses a slip of the golf ball 102 relative to the clubface. Due to the suppression of the slip, a high spin rate is obtained. The suppression of the slip suppresses variation of a spin rate. In light of suppression of a slip, the difference between the surface hardness Hs of the core 104 and the JIS-C hardness of the cover 110 is preferably equal to or greater than 10 and particularly preferably equal to or greater than 15.

In light of flight performance upon a shot with a driver, the cover 110 has a thickness of preferably 1.1 mm or less, more preferably 0.6 mm or less, and particularly preferably 0.5 mm or less. In light of controllability upon a shot with a short iron, the thickness is preferably equal to or greater than 0.1 mm and particularly preferably equal to or greater than 0.2 mm.

For forming the cover 110, known methods such as injection molding, compression molding, and the like can be used. When forming the cover 110, the dimples 116 are formed by pimples formed on the cavity face of a mold.

The reinforcing layer 108 is positioned between the mid layer 106 and the cover 110. The reinforcing layer 108 firmly adheres to the mid layer 106 and also to the cover 110. The reinforcing layer 108 suppresses separation of the cover 110 from the mid layer 106. As described above, the cover 110 of the golf ball 102 is thin. When the golf ball 102 is hit by the edge of a clubface, a wrinkle is likely to occur. The reinforcing layer 108 suppresses occurrence of a wrinkle.

As the base polymer of the reinforcing layer 108, the two-component curing type thermosetting resin described above for the golf ball 2 of the first embodiment is suitably used.

The reinforcing layer 108 may include additives such as a coloring agent (typically, titanium dioxide), a phosphate-based stabilizer, an antioxidant, a light stabilizer, a fluorescent brightener, an ultraviolet absorber, an anti-blocking agent, and the like. The additives can be added to the base material or curing agent of the two-component curing type thermosetting resin.

The reinforcing layer 108 is obtained by applying, to the surface of the mid layer 106, a liquid that is prepared by dissolving or dispersing the base material and the curing agent in a solvent. In light of workability, application with a spray gun is preferred. After the application, the solvent is volatilized to permit a reaction of the base material with the curing agent, thereby forming the reinforcing layer 108. Examples of preferable solvents include toluene, isopropyl alcohol, xylene, methyl ethyl ketone, methyl isobutyl ketone, ethylene glycol monomethyl ether, ethylbenzene, propylene glycol monomethyl ether, isobutyl alcohol, and ethyl acetate.

In light of feel at impact, the golf ball 102 has an amount of compressive deformation (Comp'n) of preferably 2.1 mm or greater, more preferably 2.2 mm or greater, and particularly preferably 2.3 mm or greater. In light of resilience performance, the amount of compressive deformation is preferably equal to or less than 3.2 mm, more preferably equal to or less than 3.0 mm, and particularly preferably equal to or less than 2.8 mm.

Preferred embodiments of the invention are specified in the following paragraphs:

1. A golf ball comprising a core, a first mid layer positioned outside the core, a second mid layer positioned outside the first mid layer, and a cover positioned outside the second mid layer, wherein the core comprises a center and an envelope layer positioned outside the center, the center is formed by a first rubber composition being crosslinked, the envelope layer is formed by a second rubber composition being crosslinked, the first rubber composition and/or the second rubber composition includes:
  (a) a base rubber;
  (b) a co-crosslinking agent;
  (c) a crosslinking initiator; and
  (d) an acid and/or a salt,
  the co-crosslinking agent (b) is:
    (b-1) an $\alpha,\beta$-unsaturated carboxylic acid having 3 to 8 carbon atoms; and/or
    (b-2) a metal salt of an $\alpha,\beta$-unsaturated carboxylic acid having 3 to 8 carbon atoms,
a Shore D hardness Hm2 of the second mid layer is greater than a Shore D hardness Hm1 of the first mid layer, and
the Shore D hardness Hm2 of the second mid layer is greater than a Shore D hardness Hc of the cover.

2. The golf ball according to paragraph 1, wherein an amount of the acid and/or the salt (d) is equal to or greater than 0.5 parts by weight but equal to or less than 45 parts by weight, per 100 parts by weight of the base rubber (a).

3. The golf ball according to paragraph 1, wherein the acid and/or the salt (d) is a carboxylic acid and/or a salt thereof (d-1).

4. The golf ball according to paragraph 3, wherein a carbon number of a carboxylic acid component of the carboxylic acid and/or the salt thereof (d-1) is equal to or greater than 1 but equal to or less than 30.

5. The golf ball according to paragraph 3, wherein the carboxylic acid and/or the salt thereof (d-1) is a fatty acid and/or a salt thereof.

6. The golf ball according to paragraph 1, wherein the first rubber composition and/or the second rubber composition further includes an organic sulfur compound (e).

7. The golf ball according to paragraph 6, wherein the organic sulfur compound (e) is at least one member selected from the group consisting of thiophenols, diphenyl disulfides, thionaphthols, thiuram disulfides, and metal salts thereof.

8. The golf ball according to paragraph 6, wherein the organic sulfur compound (e) is 2-thionaphthol.

9. The golf ball according to paragraph 6, wherein an amount of the organic sulfur compound (e) is equal to or greater than 0.05 parts by weight but equal to or less than 5.0 parts by weight, per 100 parts by weight of the base rubber (a).

10. The golf ball according to paragraph 1, wherein an amount of the co-crosslinking agent (b) is equal to or greater than 15 parts by weight but equal to or less than 50 parts by weight, per 100 parts by weight of the base rubber (a).

11. The golf ball according to paragraph 1, wherein an amount of the crosslinking initiator (c) is equal to or greater than 0.2 parts by weight but equal to or less than 5.0 parts by weight, per 100 parts by weight of the base rubber (a).

12. The golf ball according to paragraph 1, wherein
the first rubber composition and/or the second rubber composition includes the α,β-unsaturated carboxylic acid (b-1), and
the first rubber composition and/or the second rubber composition further includes a metal compound (f).

13. The golf ball according to paragraph 1, wherein
a JIS-C hardness H(0) at a central point of the core is equal to or greater than 40 but equal to or less than 70, and
a JIS-C hardness H(100) at a surface of the core is equal to or greater than 80 but equal to or less than 96.

14. The golf ball according to paragraph 13, wherein a difference (H(100)−H(0)) between the hardness H(100) and the hardness H(0) is equal to or greater than 15.

15. The golf ball according to paragraph 1, wherein a difference (Hm2−Hm1) between the hardness Hm2 and the hardness Hm1 is equal to or greater than 8.

16. The golf ball according to paragraph 15, wherein a difference (Hm2−Hc) between the hardness Hm2 and the hardness Hc is equal to or greater than 15.

17. The golf ball according to paragraph 1, wherein a sum (Tm1+Tm2) of a thickness Tm1 of the first mid layer and a thickness Tm2 of the second mid layer is equal to or greater than 1.0 mm but equal to or less than 3.2 mm.

18. The golf ball according to paragraph 1, wherein a thickness Tc of the cover is equal to or less than 1.1 mm.

19. The golf ball according to paragraph 1, wherein
the second mid layer is formed from a resin composition,
the cover is formed from a resin composition whose base resin is different from a base resin of the second mid layer, and
the golf ball further comprises a reinforcing layer between the second mid layer and the cover.

20. The golf ball according to paragraph 1, wherein a diameter of the center is equal to or greater than 18 mm but equal to or less than 30 mm.

21. The golf ball according to paragraph 1, wherein the acid and/or the salt (d) is a zinc salt of a carboxylic acid.

22. The golf ball according to paragraph 21, wherein the zinc salt of the carboxylic acid is one or more members selected from the group consisting of zinc octoate, zinc laurate, zinc myristate, and zinc stearate.

23. A golf ball comprising a core, a mid layer positioned outside the core, and a cover positioned outside the mid layer, wherein
the core comprises a center and an envelope layer positioned outside the center,
the center is formed by a rubber composition being crosslinked,
the rubber composition includes:
(a) a base rubber;
(b) a co-crosslinking agent;
(c) a crosslinking initiator; and
(d) an acid and/or a salt,
the co-crosslinking agent (b) is:
(b1) an α,β-unsaturated carboxylic acid having 3 to 8 carbon atoms; or
(b2) a metal salt of an α,β-unsaturated carboxylic acid having 3 to 8 carbon atoms,
a Shore D hardness Hm of the mid layer is greater than a Shore D hardness Hc of the cover.

24. The golf ball according to paragraph 23, wherein an amount of the acid and/or the salt (d) is equal to or greater than 1.0 parts by weight but less than 40 parts by weight, per 100 parts by weight of the base rubber (a).

25. The golf ball according to paragraph 23, wherein the acid and/or the salt (d) is a carboxylic acid and/or a salt thereof (d1).

26. The golf ball according to paragraph 25, wherein a carbon number of a carboxylic acid component of the carboxylic acid and/or the salt thereof (d1) is equal to or greater than 1 but equal to or less than 30.

27. The golf ball according to paragraph 25, wherein the carboxylic acid and/or the salt thereof (d1) is a fatty acid and/or a salt thereof.

28. The golf ball according to paragraph 25, wherein the carboxylic acid and/or the salt thereof (d1) is a zinc salt of a carboxylic acid.

29. The golf ball according to paragraph 25, wherein the carboxylic acid and/or the salt thereof (d1) is one or more members selected from the group consisting of zinc octoate, zinc laurate, zinc myristate, and zinc stearate.

30. The golf ball according to paragraph 23, wherein the rubber composition includes 15 parts by weight or greater but 50 parts by weight or less of the co-crosslinking agent (b) per 100 parts by weight of the base rubber (a).

31. The golf ball according to paragraph 23, wherein the rubber composition includes 0.2 parts by weight or greater but 5.0 parts by weight or less of the crosslinking initiator (c) per 100 parts by weight of the base rubber (a).

32. The golf ball according to paragraph 23, wherein
a JIS-C hardness H(0) at a central point of the core is equal to or greater than 40 but equal to or less than 70, and
a JIS-C hardness Hs at a surface of the core is equal to or greater than 80 but equal to or less than 96.

33. The golf ball according to paragraph 23, wherein a difference (Hs−H(0)) between a JIS-C hardness Hs at a surface of the core and a JIS-C hardness H(0) at a central point of the core is equal to or greater than 20.

34. The golf ball according to paragraph 23, wherein the difference (Hm−Hc) between the hardness Hm and the hardness Hc is equal to or greater than 18.

35. The golf ball according to paragraph 23, wherein a thickness Tc of the cover is equal to or less than 1.1 mm.

36. The golf ball according to paragraph 23, wherein the rubber composition further includes an organic sulfur compound (e).

37. The golf ball according to paragraph 36, wherein the organic sulfur compound (e) is at least one member selected from the group consisting of thiophenols, diphenyl disulfides, thionaphthols, thiuram disulfides, and metal salts thereof.

38. The golf ball according to paragraph 37, wherein the organic sulfur compound (e) is 2-thionaphthol.

39. The golf ball according to paragraph 36, wherein the rubber composition includes 0.05 parts by weight or greater but 5.0 parts by weight or less of the organic sulfur compound (e) per 100 parts by weight of the base rubber (a).

40. The golf ball according to paragraph 23, wherein the rubber composition includes the metal salt (b2) of the α,β-unsaturated carboxylic acid.

41. The golf ball according to paragraph 23, wherein
the rubber composition includes the α,β-unsaturated carboxylic acid (b1), and
the rubber composition further includes a metal compound (f).

42. The golf ball according to paragraph 23, wherein
the mid layer is formed from a resin composition,
the cover is formed from a resin composition whose base resin is different from a base resin of the mid layer, and
the golf ball further comprises a reinforcing layer between the mid layer and the cover.

43. The golf ball according to paragraph 23, wherein a diameter of the center is equal to or greater than 10 mm but equal to or less than 25 mm.

EXAMPLES

Experiment 1

Example I-1

A first rubber composition was obtained by kneading 100 parts by weight of a high-cis polybutadiene (trade name "BR-730", manufactured by JSR Corporation), 29 parts by weight of zinc diacrylate (trade name "Sanceler SR", manufactured by SANSHIN CHEMICAL INDUSTRY CO., LTD.), 5 parts by weight of zinc oxide, an appropriate amount of barium sulfate, 0.2 parts by weight of 2-thionaphthol, 0.9 parts by weight of dicumyl peroxide, and 5.0 parts by weight of zinc octoate. This first rubber composition was placed into a mold including upper and lower mold halves each having a hemispherical cavity, and heated at 170° C. for 25 minutes to obtain a center with a diameter of 23.0 mm.

A second rubber composition was obtained by kneading 100 parts by weight of a high-cis polybutadiene (the aforementioned "BR-730"), 40 parts by weight of zinc diacrylate (the aforementioned "Sanceler SR"), 5 parts by weight of zinc oxide, an appropriate amount of barium sulfate, 0.2 parts by weight of 2-thionaphthol, 0.9 parts by weight of dicumyl peroxide, and 5.0 parts by weight of zinc octoate. Half shells were formed from this second rubber composition. The center was covered with two of these half shells. The center and the half shells were placed into a mold including upper and lower mold halves each having a hemispherical cavity, and heated at 170° C. for 25 minutes to obtain a core with a diameter of 37.1 mm. An envelope layer was formed from the second rubber composition. The amount of barium sulfate was adjusted such that the specific gravity of the envelope layer is equal to the specific gravity of the center and the weight of a ball is 45.4 g.

A resin composition was obtained by kneading 30 parts by weight of an ionomer resin (the aforementioned "Surlyn 8945"), 45 parts by weight of another ionomer resin (the aforementioned "Himilan AM7329"), 25 parts by weight of a styrene block-containing thermoplastic elastomer (the aforementioned "Rabalon T3221C"), and 3 parts by weight of titanium dioxide with a twin-screw kneading extruder. The core was placed into a mold. The resin composition was injected around the core by injection molding to form a first mid layer with a thickness Tm1 of 1.0 mm.

A resin composition was obtained by kneading 55 parts by weight of an ionomer resin (the aforementioned "Surlyn 8945"), 45 parts by weight of another ionomer resin (the aforementioned "Himilan AM7329"), and 3 parts by weight of titanium dioxide with a twin-screw kneading extruder. The sphere consisting of the core and the first mid layer was placed into a mold. The resin composition was injected around the sphere by injection molding to form a second mid layer with a thickness Tm2 of 1.0 mm.

A paint composition (trade name "POLIN 750LE", manufactured by SHINTO PAINT CO., LTD.) including a two-component curing type epoxy resin as a base polymer was prepared. The base material liquid of this paint composition includes 30 parts by weight of a bisphenol A type solid epoxy resin and 70 parts by weight of a solvent. The curing agent liquid of this paint composition includes 40 parts by weight of a modified polyamide amine, 55 parts by weight of a solvent, and 5 parts by weight of titanium dioxide. The weight ratio of the base material liquid to the curing agent liquid is 1/1. This paint composition was applied to the surface of the second mid layer with a spray gun, and kept at 23° C. for 12 hours to obtain a reinforcing layer with a thickness of 10 μm.

A resin composition was obtained by kneading 100 parts by weight of a thermoplastic polyurethane elastomer (the aforementioned "Elastollan NY97A"), 0.2 parts by weight of a hindered amine light stabilizer (trade name "TINUVIN 770", manufactured by Ciba Japan K. K.), 4 parts by weight of titanium dioxide, and 0.04 parts by weight of ultramarine blue with a twin-screw kneading extruder. Half shells were formed from this resin composition by compression molding. The sphere consisting of the core, the first mid layer, the second mid layer, and the reinforcing layer was covered with two of these half shells. The sphere and the half shells were placed into a mold including upper and lower mold halves each having a hemispherical cavity. A cover was obtained from the half shells by compression molding. The thickness Tc of the cover was 0.8 mm. Dimples having a shape that is the inverted shape of pimples were formed on the cover. A clear paint including a two-component curing type polyurethane as a base material was applied to this cover to obtain a golf ball of Example I-1 with a diameter of 42.7 mm.

Examples I-2 to I-22 and Comparative Examples I-1 to I-6

Golf balls of Examples I-2 to I-22 and Comparative Examples I-1 to I-6 were obtained in the same manner as Example I-1, except the specifications of the center, the envelope layer, the first mid layer, the second mid layer, and the cover were as shown in Tables I-12 to I-16 below. The compositions of the center and the envelope layer are shown in detail in Tables I-1 to I-4 below. A hardness distribution of the core is shown in Tables I-7 to I-11 below. The compositions of the first mid layer and the second mid layer are shown in detail in Table I-5 below. The composition of the cover is shown in detail in Table I-6 below.

[Hit with Driver (W#1)]

A driver with a titanium head (trade name "XXIO", manufactured by DUNLOP SPORTS CO. LTD., shaft hardness: S, loft angle: 10.0°) was attached to a swing machine manufactured by True Temper Co. A golf ball was hit under the condition of a head speed of 45 m/sec. The spin rate was measured immediately after the hit. Furthermore, the distance from the launch point to the stop point was measured.

The average value of data obtained by 10 measurements is shown in Tables I-12 to I-16 below.

[Hit with Sand Wedge (SW)]

A sand wedge (SW) was attached to the above swing machine. A golf ball was hit under the condition of a head speed of 21 m/sec. The backspin rate was measured immediately after the hit. The average value of data obtained by 10 measurements is shown in Tables I-12 to I-16 below.

[Durability]

A golf ball was kept at 23° C. for 12 hours. The above driver was attached to the above swing machine. The golf ball was repeatedly hit under the condition of a head speed of 45 m/sec. The number of hits required to break the golf ball was counted. The average value of numbers of hits obtained by 12 measurements is shown as an index in Tables I-12 to I-16 below.

TABLE I-1

Compositions of Center and Envelope Layer

| | A | B | C | D | E |
|---|---|---|---|---|---|
| | | | | | (parts by weight) |
| BR-730 | 100 | 100 | 100 | 100 | 100 |
| Sanceler SR | 25 | 29 | 31 | 36 | 40 |
| ZN-DA90S | — | — | — | — | — |
| Zinc oxide | 5 | 5 | 5 | 5 | 5 |
| Barium sulfate | * | * | * | * | * |
| 2-thionaphthol | 0.2 | 0.2 | 0.2 | 0.2 | 0.2 |
| Bis(pentabromophenyl)disulfide | — | — | — | — | — |
| Dicumyl peroxide | 0.9 | 0.9 | 0.9 | 0.9 | 0.9 |
| Zinc octoate | — | 5.0 | 5.0 | — | 0.5 |
| Zinc stearate | — | — | — | — | — |
| Zinc myristate | — | — | — | — | — |
| Acid/salt | 0.0 | 5.0 | 5.0 | 0.0 | 0.5 |

* Appropriate amount

TABLE I-2

Compositions of Center and Envelope Layer

| | F | G | H | I | J |
|---|---|---|---|---|---|
| | | | | | (parts by weight) |
| BR-730 | 100 | 100 | 100 | 100 | 100 |
| Sanceler SR | 40 | 40 | 41 | 42 | 43 |
| ZN-DA90S | — | — | — | — | — |
| Zinc oxide | 5 | 5 | 5 | 5 | 5 |
| Barium sulfate | * | * | * | * | * |
| 2-thionaphthol | 0.2 | 0.2 | 0.2 | 0.2 | 0.2 |
| Bis(pentabromophenyl)disulfide | — | — | — | — | — |
| Dicumyl peroxide | 0.9 | 0.9 | 0.9 | 0.9 | 0.9 |
| Zinc octoate | 2.0 | 5.0 | 10.0 | 30.0 | 45.0 |
| Zinc stearate | — | — | — | — | — |
| Zinc myristate | — | — | — | — | — |
| Acid/salt | 2.0 | 5.0 | 10.0 | 30.0 | 45.0 |

* Appropriate amount

TABLE I-3

Compositions of Center and Envelope Layer

| | K | L | M | N | O |
|---|---|---|---|---|---|
| | | | | | (parts by weight) |
| BR-730 | 100 | 100 | 100 | 100 | 100 |
| Sanceler SR | 37 | 38 | 40 | 41 | 42 |
| ZN-DA90S | — | — | — | — | — |
| Zinc oxide | 5 | 5 | 5 | 5 | 5 |
| Barium sulfate | * | * | * | * | * |
| 2-thionaphthol | 0.2 | 0.2 | 0.2 | 0.2 | — |
| Bis(pentabromophenyl)disulfide | — | — | — | — | 0.3 |

TABLE I-3-continued

Compositions of Center and Envelope Layer

| | K | L | M | N | O |
|---|---|---|---|---|---|
| | | | | | (parts by weight) |
| Dicumyl peroxide | 0.9 | 0.9 | 0.9 | 0.9 | 0.9 |
| Zinc octoate | — | — | — | — | 5.0 |
| Zinc stearate | 10 | 20 | — | — | — |
| Zinc myristate | — | — | 5 | 10 | — |
| Acid/salt | 10.0 | 20.0 | 5.0 | 10.0 | 5.0 |

* Appropriate amount

TABLE I-4

Compositions of Center and Envelope Layer

| | P | Q | R | S |
|---|---|---|---|---|
| | | | | (parts by weight) |
| BR-730 | 100 | 100 | 100 | 100 |
| Sanceler SR | — | 41 | 39 | 41 |
| ZN-DA90S | 40 | — | — | — |
| Zinc oxide | 5 | 5 | 5 | 5 |
| Barium sulfate | * | * | * | * |
| 2-thionaphthol | 0.2 | 0.2 | 0.2 | 0.2 |
| Bis(pentabromophenyl)disulfide | — | — | — | — |
| Dicumyl peroxide | 0.9 | 0.9 | 0.9 | 0.9 |
| Zinc octoate | 5.0 | 5.0 | 5.0 | 20.0 |
| Zinc stearate | — | — | — | — |
| Zinc myristate | — | — | — | — |
| Acid/salt | 5.0 | 5.0 | 5.0 | 20.0 |

* Appropriate amount

The details of the compounds listed in Tables I-1 to I-4 are as follows.

BR-730: a high-cis polybutadiene manufactured by JSR Corporation (cis-1,4-bond content: 96% by weight, 1,2-vinyl bond content: 1.3% by weight, Mooney viscosity ($ML_{1+4}$ (100° C.)): 55, molecular weight distribution (Mw/Mn): 3)

Sanceler SR: zinc diacrylate manufactured by SANSHIN CHEMICAL INDUSTRY CO., LTD. (a product coated with 10% by weight of stearic acid)

ZN-DA90S: zinc diacrylate manufactured by Nihon Jyoryu Kogyo Co., Ltd. (a product coated with 10% by weight of zinc stearate)

Zinc oxide: trade name "Ginrei R" manufactured by Toho Zinc Co., Ltd.

Barium sulfate: trade name "Barium Sulfate BD" manufactured by Sakai Chemical Industry Co., Ltd.

2-thionaphthol: a product of Tokyo Chemical Industry Co., Ltd.

Bis(pentabromophenyl)disulfide: a product of Kawaguchi Chemical Industry Co., LTD.

Dicumyl peroxide: trade name "Percumyl D" manufactured by NOF Corporation

Zinc octoate: a product of Mitsuwa Chemicals Co., Ltd.

Zinc stearate: a product of Wako Pure Chemical Industries, Ltd.

Zinc myristate: a product of Wako Pure Chemical Industries, Ltd.

TABLE I-5

Composition of Mid Layer

| | M1 | M2 | M3 | M4 |
|---|---|---|---|---|
| | | | | (parts by weight) |
| Surlyn 8945 | 55 | 45 | 30 | 20 |
| Himilan AM7329 | 45 | 45 | 45 | 25 |

TABLE I-5-continued

Composition of Mid Layer

| | M1 | M2 | M3 | M4 |
|---|---|---|---|---|
| | | | (parts by weight) | |
| Rabalon T3221C | — | 10 | 25 | 55 |
| Titanium dioxide | 3 | 3 | 3 | 3 |
| Hardness (Shore D) | 65 | 56 | 50 | 29 |

TABLE I-6

Composition of Cover

| | C1 | C2 | C3 | C4 | C5 |
|---|---|---|---|---|---|
| | | | | (parts by weight) | |
| Elastollan NY82A | 100 | | | | |
| Elastollan NY85A | | 50 | | | |
| Elastollan NY90A | | 50 | | | |
| Elastollan NY97A | | | 100 | | |
| Surlyn 8945 | | | | 40 | |
| Himilan AM7329 | | | | 55 | |
| Rabalon T3221C | | | | 5 | |
| Surlyn 8140 | | | | | 100 |
| TINUVIN 770 | 0.2 | 0.2 | 0.2 | 0.2 | 0.2 |
| Titanium dioxide | 4 | 4 | 4 | 4 | 4 |
| Ultramarine blue | 0.04 | 0.04 | 0.04 | 0.04 | 0.04 |
| Hardness (Shore D) | 29 | 36 | 47 | 60 | 70 |

TABLE I-7

Hardness Distribution of Core

| | Comp. Ex. I-1 | Ex. I-2 | Ex. I-3 | Ex. I-4 | Ex. I-1 | Ex. I-5 |
|---|---|---|---|---|---|---|
| H(0) | 63.0 | 55.0 | 55.0 | 55.0 | 55.0 | 55.0 |
| H(12.5) | 70.0 | 60.0 | 60.0 | 60.0 | 60.0 | 60.0 |
| H(25) | 71.0 | 66.0 | 66.0 | 66.0 | 66.0 | 66.0 |
| H(37.5) | 72.0 | 72.0 | 72.0 | 72.0 | 72.0 | 72.0 |
| H(50) | 78.0 | 80.0 | 80.0 | 80.0 | 80.0 | 80.0 |
| H(62.5) | 83.0 | 83.0 | 82.5 | 82.0 | 81.0 | 80.0 |
| H(75) | 84.0 | 84.0 | 83.5 | 83.0 | 83.0 | 82.0 |
| H(87.5) | 85.0 | 85.0 | 85.0 | 85.0 | 87.0 | 86.0 |
| H(100) | 89.0 | 89.0 | 89.5 | 90.0 | 91.0 | 89.0 |

TABLE I-8

Hardness Distribution of Core

| | Ex. I-6 | Ex. I-7 | Ex. I-8 | Ex. I-9 | Ex. I-10 | Ex. I-11 |
|---|---|---|---|---|---|---|
| H(0) | 55.0 | 55.0 | 55.0 | 55.0 | 55.0 | 55.0 |
| H(12.5) | 60.0 | 60.0 | 60.0 | 60.0 | 60.0 | 60.0 |
| H(25) | 66.0 | 66.0 | 66.0 | 66.0 | 66.0 | 66.0 |
| H(37.5) | 72.0 | 72.0 | 72.0 | 72.0 | 72.0 | 72.0 |
| H(50) | 80.0 | 80.0 | 80.0 | 80.0 | 80.0 | 80.0 |
| H(62.5) | 80.0 | 75.0 | 81.5 | 81.5 | 82.0 | 82.0 |
| H(75) | 81.0 | 77.0 | 83.0 | 83.0 | 83.0 | 82.5 |
| H(87.5) | 85.0 | 81.0 | 87.0 | 87.0 | 86.5 | 86.0 |
| H(100) | 88.0 | 82.0 | 91.0 | 90.0 | 90.5 | 90.0 |

TABLE I-9

Hardness Distribution of Core

| | Ex. I-12 | Ex. I-13 | Ex. I-14 | Comp. Ex. I-2 | Ex. I-15 | Ex. I-16 |
|---|---|---|---|---|---|---|
| H(0) | 55.0 | 55.0 | 55.0 | 55.0 | 55.0 | 55.0 |
| H(12.5) | 60.0 | 60.0 | 60.0 | 60.0 | 60.0 | 60.0 |
| H(25) | 66.0 | 66.0 | 66.0 | 66.0 | 66.0 | 66.0 |
| H(37.5) | 72.0 | 72.0 | 72.0 | 72.0 | 72.0 | 72.0 |
| H(50) | 80.0 | 80.0 | 80.0 | 80.0 | 80.0 | 80.0 |
| H(62.5) | 81.5 | 81.0 | 81.0 | 81.0 | 81.0 | 81.0 |
| H(75) | 83.0 | 83.0 | 83.0 | 83.0 | 83.0 | 83.0 |
| H(87.5) | 87.0 | 87.0 | 87.0 | 87.0 | 87.0 | 87.0 |
| H(100) | 91.0 | 91.0 | 91.0 | 91.0 | 91.0 | 91.0 |

TABLE I-10

Hardness Distribution of Core

| | Comp. Ex. I-3 | Ex. I-17 | Ex. I-18 | Ex. I-19 | Comp. Ex. I-4 | Comp. Ex. I-5 |
|---|---|---|---|---|---|---|
| H(0) | 55.0 | 55.0 | 55.0 | 55.0 | 55.0 | 55.0 |
| H(12.5) | 60.0 | 60.0 | 60.0 | 60.0 | 60.0 | 60.0 |
| H(25) | 66.0 | 66.0 | 66.0 | 66.0 | 66.0 | 66.0 |
| H(37.5) | 72.0 | 72.0 | 72.0 | 72.0 | 72.0 | 72.0 |
| H(50) | 80.0 | 80.0 | 77.0 | 77.0 | 80.0 | 80.0 |
| H(62.5) | 80.0 | 82.0 | 80.0 | 80.0 | 80.0 | 82.0 |
| H(75) | 82.0 | 84.0 | 81.0 | 81.0 | 82.0 | 84.0 |
| H(87.5) | 86.0 | 88.0 | 86.0 | 86.5 | 86.0 | 88.0 |
| H(100) | 90.0 | 92.0 | 91.0 | 91.0 | 90.0 | 92.0 |

TABLE I-11

Hardness Distribution of Core

| | Ex. I-20 | Ex. I-21 | Comp. Ex. I-6 | Ex. I-22 |
|---|---|---|---|---|
| H(0) | 55.0 | 55.0 | 55.0 | 55.0 |
| H(12.5) | 62.0 | 59.0 | 60.0 | 60.0 |
| H(25) | 70.0 | 63.0 | 66.0 | 66.0 |
| H(37.5) | 80.0 | 68.0 | 72.0 | 72.0 |
| H(50) | 81.0 | 71.0 | 80.0 | 80.0 |
| H(62.5) | 83.0 | 76.0 | 81.0 | 80.0 |
| H(75) | 88.0 | 80.0 | 83.0 | 81.5 |
| H(87.5) | 93.0 | 85.0 | 87.0 | 85.5 |
| H(100) | 91.0 | 91.0 | 91.0 | 88.5 |

TABLE I-12

| | Results of Evaluation | | | | | |
|---|---|---|---|---|---|---|
| | Comp. Ex. I-1 | Ex. I-2 | Ex. I-3 | Ex. I-4 | Ex. I-1 | Ex. I-5 |
| Center | | | | | | |
| Composition | A | B | B | B | B | B |
| Acid and/or salt (phr) | 0.0 | 5.0 | 5.0 | 5.0 | 5.0 | 5.0 |
| Diameter (mm) | 23.0 | 23.0 | 23.0 | 23.0 | 23.0 | 23.0 |
| Envelope layer | | | | | | |
| Composition | D | D | E | F | G | H |
| Acid and/or salt (phr) | 0.0 | 0.0 | 0.5 | 2.0 | 5.0 | 10.0 |
| Core | | | | | | |
| Diameter (mm) | 37.1 | 37.1 | 37.1 | 37.1 | 37.1 | 37.1 |
| H(100) − H(0) | 26.0 | 34.0 | 34.5 | 35.0 | 36.0 | 34.0 |
| $R^2$ | 0.96 | 0.94 | 0.95 | 0.95 | 0.97 | 0.95 |
| Gradient α | 0.25 | 0.34 | 0.34 | 0.35 | 0.36 | 0.34 |
| First mid layer | | | | | | |
| Composition | M3 | M3 | M3 | M3 | M3 | M3 |
| Hardness Hm1 (Shore D) | 50.0 | 50.0 | 50.0 | 50.0 | 50.0 | 50.0 |
| Thickness Tm1 (mm) | 1.0 | 1.0 | 1.0 | 1.0 | 1.0 | 1.0 |
| Second mid layer | | | | | | |
| Composition | M1 | M1 | M1 | M1 | M1 | M1 |
| Hardness Hm2 (Shore D) | 65.0 | 65.0 | 65.0 | 65.0 | 65.0 | 65.0 |
| Thickness Tm2 (mm) | 1.0 | 1.0 | 1.0 | 1.0 | 1.0 | 1.0 |
| Cover | | | | | | |
| Composition | C3 | C3 | C3 | C3 | C3 | C3 |
| Hardness Hc (Shore D) | 47.0 | 47.0 | 47.0 | 47.0 | 47.0 | 47.0 |
| Thickness Tc (mm) | 0.8 | 0.8 | 0.8 | 0.8 | 0.8 | 0.8 |
| Ball | | | | | | |
| Hm2 − Hm1 | 15.0 | 15.0 | 15.0 | 15.0 | 15.0 | 15.0 |
| Hm2 − Hc | 18.0 | 18.0 | 18.0 | 18.0 | 18.0 | 18.0 |
| Tm1 + Tm2 (mm) | 2.0 | 2.0 | 2.0 | 2.0 | 2.0 | 2.0 |
| Deformation amount Db (mm) | 2.5 | 2.5 | 2.5 | 2.5 | 2.5 | 2.5 |
| W#1 spin rate (rpm) | 3100 | 3000 | 3000 | 2950 | 2850 | 2950 |
| W#1 flight distance (m) | 238 | 242 | 243 | 244 | 247 | 244 |
| SW spin rate (rpm) | 6850 | 6850 | 6850 | 6850 | 6800 | 6850 |
| Durability | 100 | 102 | 103 | 108 | 114 | 112 |

TABLE I-13

| | Results of Evaluation | | | | | |
|---|---|---|---|---|---|---|
| | Ex. I-6 | Ex. I-7 | Ex. I-8 | Ex. I-9 | Ex. I-10 | Ex. I-11 |
| Center | | | | | | |
| Composition | B | B | B | B | B | B |
| Acid and/or salt (phr) | 5.0 | 5.0 | 5.0 | 5.0 | 5.0 | 5.0 |
| Diameter (mm) | 23.0 | 23.0 | 23.0 | 23.0 | 23.0 | 23.0 |
| Envelope layer | | | | | | |
| Composition | I | J | K | L | M | N |
| Acid and/or salt (phr) | 30.0 | 45.0 | 10.0 | 20.0 | 5.0 | 10.0 |
| Core | | | | | | |
| Diameter (mm) | 37.1 | 37.1 | 37.1 | 37.1 | 37.1 | 37.1 |
| H(100) − H(0) | 33.0 | 27.0 | 36.0 | 35.0 | 35.5 | 35.0 |
| $R^2$ | 0.94 | 0.86 | 0.96 | 0.96 | 0.96 | 0.95 |
| Gradient α | 0.33 | 0.26 | 0.36 | 0.35 | 0.35 | 0.35 |
| First mid layer | | | | | | |
| Composition | M3 | M3 | M3 | M3 | M3 | M3 |
| Hardness Hm1 (Shore D) | 50.0 | 50.0 | 50.0 | 50.0 | 50.0 | 50.0 |
| Thickness Tm1 (mm) | 1.0 | 1.0 | 1.0 | 1.0 | 1.0 | 1.0 |

TABLE I-13-continued

| | Results of Evaluation | | | | | |
|---|---|---|---|---|---|---|
| | Ex. I-6 | Ex. I-7 | Ex. I-8 | Ex. I-9 | Ex. I-10 | Ex. I-11 |
| Second mid layer | | | | | | |
| Composition | M1 | M1 | M1 | M1 | M1 | M1 |
| Hardness Hm2 (Shore D) | 65.0 | 65.0 | 65.0 | 65.0 | 65.0 | 55.0 |
| Thickness Tm2 (mm) | 1.0 | 1.0 | 1.0 | 1.0 | 1.0 | 1.0 |
| Cover | | | | | | |
| Composition | C3 | C3 | C3 | C3 | C3 | C3 |
| Hardness Hc (Shore D) | 47.0 | 47.0 | 47.0 | 47.0 | 47.0 | 47.0 |
| Thickness Tc (mm) | 0.8 | 0.8 | 0.8 | 0.8 | 0.8 | 0.8 |
| Ball | | | | | | |
| Hm2 − Hm1 | 15.0 | 15.0 | 15.0 | 15.0 | 15.0 | 15.0 |
| Hm2 − Hc | 18.0 | 18.0 | 18.0 | 18.0 | 18.0 | 18.0 |
| Tm1 + Tm2 (mm) | 2.0 | 2.0 | 2.0 | 2.0 | 2.0 | 2.0 |
| Deformation amount Db (mm) | 2.5 | 2.5 | 2.5 | 2.5 | 2.5 | 2.5 |
| W#1 spin rate (rpm) | 3000 | 3050 | 2850 | 2900 | 2900 | 2950 |
| W#1 flight distance (m) | 242 | 241 | 247 | 246 | 246 | 244 |
| SW spin rate (rpm) | 6850 | 6850 | 6800 | 6850 | 6850 | 6850 |
| Durability | 108 | 104 | 114 | 110 | 108 | 106 |

TABLE I-14

| | Results of Evaluation | | | | | |
|---|---|---|---|---|---|---|
| | Ex. I-12 | Ex. I-13 | Ex. I-14 | Comp. Ex. I-2 | Ex. I-15 | Ex. I-16 |
| Center | | | | | | |
| Composition | B | B | B | B | B | B |
| Acid and/or salt (phr) | 5.0 | 5.0 | 5.0 | 5.0 | 5.0 | 5.0 |
| Diameter (mm) | 23.0 | 23.0 | 23.0 | 23.0 | 23.0 | 23.0 |
| Envelope layer | | | | | | |
| Composition | O | P | G | G | G | G |
| Acid and/or salt (phr) | 5.0 | 5.0 | 5.0 | 5.0 | 5.0 | 5.0 |
| Core | | | | | | |
| Diameter (mm) | 37.1 | 37.1 | 37.1 | 37.1 | 37.1 | 37.1 |
| H(100) − H(0) | 36.0 | 36.0 | 36.0 | 36.0 | 36.0 | 36.0 |
| $R^2$ | 0.96 | 0.97 | 0.97 | 0.97 | 0.97 | 0.97 |
| Gradient α | 0.36 | 0.27 | 0.36 | 0.36 | 0.36 | 0.36 |
| First mid layer | | | | | | |
| Composition | M3 | M3 | M2 | M1 | M3 | M3 |
| Hardness Hm1 (Shore D) | 50.0 | 50.0 | 56.0 | 65.0 | 50.0 | 50.0 |
| Thickness Tm1 (mm) | 1.0 | 1.0 | 1.0 | 1.0 | 1.0 | 1.0 |
| Second mid layer | | | | | | |
| Composition | M1 | M1 | M1 | M3 | M1 | M1 |
| Hardness Hm2 (Shore D) | 65.0 | 65.0 | 65.0 | 50.0 | 65.0 | 65.0 |
| Thickness Tm2 (mm) | 1.0 | 1.0 | 1.0 | 1.0 | 1.0 | 1.0 |
| Cover | | | | | | |
| Composition | C3 | C3 | C3 | C3 | C2 | C1 |
| Hardness Hc (Shore D) | 47.0 | 47.0 | 47.0 | 47.0 | 36.0 | 29.0 |
| Thickness Tc (mm) | 0.8 | 0.8 | 0.8 | 0.8 | 0.8 | 0.8 |
| Ball | | | | | | |
| Hm2 − Hm1 | 15.0 | 15.0 | 9.0 | −18.0 | 15.0 | 15.0 |
| Hm2 − Hc | 18.0 | 18.0 | 18.0 | 0.0 | 29.0 | 36.0 |
| Tm1 + Tm2 (mm) | 2.0 | 2.0 | 2.0 | 2.0 | 2.0 | 2.0 |
| Deformation amount Db (mm) | 2.5 | 2.5 | 2.5 | 2.5 | 2.5 | 2.6 |
| W#1 spin rate (rpm) | 2900 | 2850 | 2800 | 3050 | 2900 | 3000 |
| W#1 flight distance (m) | 246 | 247 | 248 | 240 | 244 | 242 |
| SW spin rate (rpm) | 6800 | 6800 | 6650 | 6900 | 6900 | 7000 |
| Durability | 113 | 114 | 109 | 120 | 116 | 120 |

TABLE I-15

| | Results of Evaluation | | | | | |
|---|---|---|---|---|---|---|
| | Comp. Ex. I-3 | Ex. I-17 | Ex. I-18 | Ex. I-19 | Comp. Ex. I-4 | Comp. Ex. I-5 |
| Center | | | | | | |
| Composition | B | B | B | B | B | B |
| Acid and/or salt (phr) | 5.0 | 5.0 | 5.0 | 5.0 | 5.0 | 5.0 |
| Diameter (mm) | 23.0 | 23.0 | 23.0 | 23.0 | 23.0 | 23.0 |
| Envelope layer | | | | | | |
| Composition | R | Q | G | R | R | Q |
| Acid and/or salt (phr) | 5.0 | 5.0 | 5.0 | 5.0 | 5.0 | 5.0 |
| Core | | | | | | |
| Diameter (mm) | 37.1 | 37.1 | 36.3 | 34.5 | 37.1 | 37.1 |
| H(100) − H(0) | 35.0 | 37.0 | 36.0 | 36.0 | 35.0 | 37.0 |
| $R^2$ | 0.96 | 0.97 | 0.98 | 0.98 | 0.96 | 0.97 |
| Gradient α | 0.34 | 0.37 | 0.35 | 0.35 | 0.34 | 0.37 |
| First mid layer | | | | | | |
| Composition | M3 | M4 | M3 | M3 | M1 | M3 |
| Hardness Hm1 (Shore D) | 50.0 | 29.0 | 50.0 | 50.0 | 65.0 | 50.0 |
| Thickness Tm1 (mm) | 1.0 | 1.0 | 1.0 | 1.6 | 1.0 | 1.0 |
| Second mid layer | | | | | | |
| Composition | M2 | M1 | M1 | M1 | M1 | M3 |
| Hardness Hm2 (Shore D) | 56.0 | 65.0 | 65.0 | 65.0 | 65.0 | 50.0 |
| Thickness Tm2 (mm) | 1.0 | 1.0 | 1.0 | 1.7 | 1.0 | 1.0 |
| Cover | | | | | | |
| Composition | C4 | C3 | C3 | C3 | C3 | C3 |
| Hardness Hc (Shore D) | 60.0 | 47.0 | 47.0 | 47.0 | 47.0 | 47.0 |
| Thickness Tc (mm) | 0.8 | 0.8 | 1.2 | 0.8 | 0.8 | 0.8 |
| Ball | | | | | | |
| Hm2 − Hm1 | 6.0 | 36.0 | 15.0 | 15.0 | 0.0 | 0.0 |
| Hm2 − Hc | −4.0 | 18.0 | 18.0 | 18.0 | 18.0 | 0.0 |
| Tm1 + Tm2 (mm) | 2.0 | 2.0 | 2.0 | 3.3 | 2.0 | 2.0 |
| Deformation amount Db (mm) | 2.5 | 2.5 | 2.5 | 2.5 | 2.5 | 2.5 |
| W#1 spin rate (rpm) | 2600 | 2950 | 3000 | 2950 | 2750 | 3200 |
| W#1 flight distance (m) | 252 | 243 | 242 | 243 | 249 | 236 |
| SW spin rate (rpm) | 5800 | 6850 | 7000 | 6700 | 6500 | 7050 |
| Durability | 103 | 115 | 110 | 115 | 78 | 130 |

TABLE I-16

| | Results of Evaluation | | | |
|---|---|---|---|---|
| | Ex. I-20 | Ex. I-21 | Comp. Ex. I-6 | Ex. I-22 |
| Center | | | | |
| Composition | B | C | B | B |
| Acid and/or salt (phr) | 5.0 | 5.0 | 5.0 | 5.0 |
| Diameter (mm) | 17.0 | 31.0 | 23.0 | 23.0 |
| Envelope layer | | | | |
| Composition | G | G | G | S |
| Acid and/or salt (phr) | 5.0 | 5.0 | 5.0 | 20.0 |
| Core | | | | |
| Diameter (mm) | 37.1 | 37.1 | 37.1 | 37.1 |
| H(100) − H(0) | 36.0 | 36.0 | 36.0 | 33.5 |
| $R^2$ | 0.92 | 0.99 | 0.97 | 0.95 |
| Gradient α | 0.37 | 0.35 | 0.36 | 0.33 |
| First mid layer | | | | |
| Composition | M3 | M3 | M3 | M3 |
| Hardness Hm1 (Shore D) | 50.0 | 50.0 | 50.0 | 50.0 |
| Thickness Tm1 (mm) | 1.0 | 1.0 | 1.0 | 1.0 |
| Second mid layer | | | | |
| Composition | M1 | M1 | M1 | M1 |
| Hardness Hm2 (Shore D) | 65.0 | 65.0 | 65.0 | 65.0 |
| Thickness Tm2 (mm) | 1.0 | 1.0 | 1.0 | 1.0 |
| Cover | | | | |
| Composition | C3 | C3 | C5 | C3 |
| Hardness Hc (Shore D) | 47.0 | 47.0 | 70.0 | 47.0 |
| Thickness Tc (mm) | 0.8 | 0.8 | 0.8 | 0.8 |
| Ball | | | | |
| Hm2 − Hm1 | 15.0 | 15.0 | 15.0 | 15.0 |
| Hm2 − Hc | 18.0 | 18.0 | −5.0 | 18.0 |
| Tm1 + Tm2 (mm) | 2.0 | 2.0 | 2.0 | 2.0 |
| Deformation amount Db (mm) | 2.4 | 2.6 | 2.4 | 2.5 |
| W#1 spin rate (rpm) | 2950 | 2750 | 2500 | 2970 |
| W#1 flight distance (m) | 243 | 244 | 254 | 243 |
| SW spin rate (rpm) | 6850 | 6750 | 4800 | 6850 |
| Durability | 112 | 103 | 75 | 110 |

As shown in Tables I-12 to I-16, the golf balls according to Examples are excellent in various performance characteristics. From the results of evaluation, advantages of the present invention are clear.

Experiment 2

Example II-1

A rubber composition was obtained by kneading 100 parts by weight of a high-cis polybutadiene (trade name "BR-730", manufactured by JSR Corporation), 24 parts by weight of zinc diacrylate (trade name "Sanceler SR", manufactured by SANSHIN CHEMICAL INDUSTRY CO., LTD.), 5 parts by weight of zinc oxide, an appropriate amount of barium sulfate, 0.2 parts by weight of 2-thionaphthol, 0.7 parts by weight of dicumyl peroxide, and 5.0 parts by weight of zinc octoate. This rubber composition was placed into a mold including upper and lower mold halves each having a hemispherical cavity, and heated at 170° C. for 25 minutes to obtain a center with a diameter of 18 mm.

A rubber composition was obtained by kneading 100 parts by weight of a high-cis polybutadiene (the aforementioned "BR-730"), 33 parts by weight of zinc diacrylate (the aforementioned "Sanceler SR"), 5 parts by weight of zinc oxide, an appropriate amount of barium sulfate, 0.3 parts by weight of bis(pentabromophenyl)disulfide, and 0.9 parts by weight of dicumyl peroxide. Half shells were formed from this rubber composition. The center was covered with two of these half shells. The center and the half shells were placed into a mold including upper and lower mold halves each having a hemispherical cavity, and heated at 150° C. for 20 minutes to obtain a core with a diameter of 39.5 mm. An envelope layer was formed from the rubber composition. The amount of barium sulfate was adjusted such that the specific gravity of the envelope layer is equal to the specific gravity of the center and the weight of a ball is 45.4 g.

A resin composition was obtained by kneading 55 parts by weight of an ionomer resin (the aforementioned "Surlyn 8945"), 45 parts by weight of another ionomer resin (the aforementioned "Himilan AM7329"), and 3 parts by weight of titanium dioxide with a twin-screw kneading extruder. The core was placed into a mold including upper and lower mold halves each having a hemispherical cavity. The resin composition was injected around the core by injection molding to form a mid layer with a thickness of 1.1 mm.

An adhesive including a base material and a curing agent was prepared. The base material is a water-based epoxy composition manufactured by SHINTO PAINT CO., LTD. The base material includes 36 parts by weight of a bisphenol A type epoxy resin and 64 parts by weight of water. The epoxy equivalent of the base material is 1405 g/eq. The curing agent is a water-based amine composition manufactured by SHINTO PAINT CO., LTD. The curing agent includes 44 parts by weight of a modified polyamide amine, 50 parts by weight of water, 1 parts by weight of propylene glycol, and 5 parts by weight of titanium dioxide. The active hydrogen equivalent of the curing agent is 348 g/eq. This adhesive was applied to the surface of the mid layer with a spray gun, and kept at 23° C. for 12 hours to obtain a reinforcing layer with a thickness of 0.003 mm.

A resin composition was obtained by kneading 100 parts by weight of a thermoplastic polyurethane elastomer (the aforementioned "Elastollan NY82A"), 0.2 parts by weight of a hindered amine light stabilizer (trade name "TINUVIN 770", manufactured by Ciba Japan K.K.), 4 parts by weight of titanium dioxide, and 0.04 parts by weight of ultramarine blue with a twin-screw kneading extruder. Half shells were obtained from this resin composition by compression molding. The sphere consisting of the core, the mid layer, and the reinforcing layer was covered with two of these half shells. The sphere and the half shells were placed into a final mold that includes upper and lower mold halves each having a hemispherical cavity and that has a large number of pimples on its cavity face. A cover was obtained by compression molding. The thickness of the cover was 0.5 mm. Dimples having a shape that is the inverted shape of the pimples were formed on the cover. A clear paint including a two-component curing type polyurethane as a base material was applied to this cover to obtain a golf ball of Example II-1 with a diameter of 42.7 mm.

Examples II-2 to II-21 and Comparative Examples II-1 and II-2

Golf balls of Examples II-2 to II-21 and Comparative Examples II-1 and II-2 were obtained in the same manner as Example II-1, except the specifications of the center, the envelope layer, the mid layer, and the cover were as shown in Tables II-12 to II-16 below. The composition of the core is shown in detail in Tables II-1 to II-4 below. The composition of the mid layer is shown in detail in Table II-5 below. The composition of the cover is shown in detail in Table II-6 below. The hardness of the core is shown in Tables II-7 to II-11 below.

[Hit with Driver (W#1)]

A driver with a titanium head (trade name "XXIO", manufactured by DUNLOP SPORTS CO. LTD., shaft hardness: S, loft angle: 10.0°) was attached to a swing machine manufactured by True Temper Co. A golf ball was hit under the condition of a head speed of 45 m/sec. The spin rate was measured immediately after the hit. Furthermore, the distance from the launch point to the stop point was measured. The average value of data obtained by 10 measurements is shown in Tables II-12 to II-16 below.

[Hit with Sand Wedge (SW)]

A sand wedge (SW) was attached to the above swing machine. A golf ball was hit under the condition of a head speed of 21 m/sec. The spin rate was measured immediately after the hit. The average value of data obtained by 10 measurements is shown in Tables II-12 to II-16 below.

[Durability]

A golf ball was kept at 23° C. for 12 hours. The above driver was attached to the above swing machine. The golf ball was repeatedly hit under the condition of a head speed of 45 m/sec. The number of hits required to break the golf ball was counted. The average value of numbers of hits obtained by 12 measurements is shown as an index in Tables II-12 to II-16 below.

[Feel at Impact]

Golf players hit golf balls with drivers and evaluated the feel at impact on the basis of the following criteria.
A: very good
B: good
C: bad
D: very bad
The results are shown in Tables II-12 to II-16 below.

TABLE II-1

Composition of Core

| | 1 | 2 | 3 | 4 | 5 |
|---|---|---|---|---|---|
| | | | | (parts by weight) | |
| BR-730 | 100 | 100 | 100 | 100 | 100 |
| Sanceler SR | 20 | 24 | 24 | 24 | 25 |
| ZN-DA90S | — | — | — | — | — |
| Zinc oxide | 5 | 5 | 5 | 5 | 5 |
| Barium sulfate | * | * | * | * | * |
| 2-thionaphthol | 0.2 | 0.2 | 0.2 | 0.2 | 0.2 |
| Bis(pentabromophenyl)disulfide | — | — | — | — | — |
| Dicumyl peroxide | 0.7 | 0.7 | 0.7 | 0.7 | 0.7 |
| Zinc octoate | — | 0.5 | 2.0 | 5.0 | 10.0 |
| Zinc stearate | — | — | — | — | — |

TABLE II-1-continued

Composition of Core

| | 1 | 2 | 3 | 4 | 5 |
|---|---|---|---|---|---|
| Zinc myristate | — | — | — | — | — |
| Acid/salt | 0.0 | 0.5 | 2.0 | 5.0 | 10.0 |

* Appropriate amount

TABLE II-2

Composition of Core

| | 6 | 7 | 8 | 9 | 10 |
|---|---|---|---|---|---|
| BR-730 | 100 | 100 | 100 | 100 | 100 |
| Sanceler SR | 26 | 27 | 21 | 22 | 24 |
| ZN-DA90S | — | — | — | — | — |
| Zinc oxide | 5 | 5 | 5 | 5 | 5 |
| Barium sulfate | * | * | * | * | * |
| 2-thionaphthol | 0.2 | 0.2 | 0.2 | 0.2 | 0.2 |
| Bis(pentabromophenyl)disulfide | — | — | — | — | — |
| Dicumyl peroxide | 0.7 | 0.7 | 0.7 | 0.7 | 0.7 |
| Zinc octoate | 30.0 | 45.0 | — | — | — |
| Zinc stearate | — | — | 10.0 | 20.0 | — |
| Zinc myristate | — | — | — | — | 5.0 |
| Acid/salt | 30.0 | 45.0 | 10.0 | 20.0 | 5.0 |

* Appropriate amount

TABLE II-3

Composition of Core

| | 11 | 12 | 13 | 14 |
|---|---|---|---|---|
| BR-730 | 100 | 100 | 100 | 100 |
| Sanceler SR | 25 | 26 | — | 22 |
| ZN-DA90S | — | — | 24 | — |
| Zinc oxide | 5 | 5 | 5 | 5 |
| Barium sulfate | * | * | * | * |
| 2-thionaphthol | 0.2 | — | 0.2 | 0.2 |
| Bis(pentabromophenyl)disulfide | — | 0.3 | — | — |
| Dicumyl peroxide | 0.7 | 0.7 | 0.7 | 0.7 |
| Zinc octoate | — | 5.0 | 5.0 | 5.0 |
| Zinc stearate | — | — | — | — |
| Zinc myristate | 10.0 | — | — | — |
| Acid/salt | 10.0 | 5.0 | 5.0 | 5.0 |

* Appropriate amount

TABLE II-4

Composition of Core

| | 15 | 16 | 17 | 18 |
|---|---|---|---|---|
| BR-730 | 100 | 100 | 100 | 100 |
| Sanceler SR | 26 | 33 | 32 | 34 |
| ZN-DA90S | — | — | — | — |
| Zinc oxide | 5 | 5 | 5 | 5 |
| Barium sulfate | * | * | * | * |
| 2-thionaphthol | 0.2 | — | — | — |
| Bis(pentabromophenyl)disulfide | — | 0.3 | 0.3 | 0.3 |
| Dicumyl peroxide | 0.7 | 0.9 | 0.9 | 0.9 |
| Zinc octoate | 5.0 | — | — | — |
| Zinc stearate | — | — | — | — |
| Zinc myristate | — | — | — | — |
| Acid/salt | 5.0 | 0.0 | 0.0 | 0.0 |

* Appropriate amount

The details of the compounds listed in Tables II-1 to II-4 are as follows.

BR-730: a high-cis polybutadiene manufactured by JSR Corporation (cis-1,4-bond content: 96% by weight, 1,2-vinyl bond content: 1.3% by weight, Mooney viscosity ($ML_{1+4}$(100° C.)): 55, molecular weight distribution (Mw/Mn): 3)

Sanceler SR: zinc diacrylate manufactured by SANSHIN CHEMICAL INDUSTRY CO., LTD. (a product coated with 10% by weight of stearic acid)

ZN-DA90S: zinc diacrylate manufactured by Nihon Jyoryu Kogyo Co., Ltd. (a product coated with 10% by weight of zinc stearate)

2-thionaphthol: a product of Tokyo Chemical Industry Co., Ltd.

Bis(pentabromophenyl)disulfide: a product of Kawaguchi Chemical Industry Co., LTD.

Dicumyl peroxide: a product of NOF Corporation

Zinc octoate: a product of Mitsuwa Chemicals Co., Ltd.

Zinc stearate: a product of Wako Pure Chemical Industries, Ltd.

Zinc myristate: a product of NOF Corporation

TABLE II-5

Composition of Mid Layer

| | a | b | c |
|---|---|---|---|
| Surlyn 8945 | 55 | 45 | 27 |
| Himilan AM7329 | 45 | 45 | 45 |
| Rabalon T3221C | — | 10 | 28 |
| Titanium dioxide | 3 | 3 | 3 |
| Hardness Hm (Shore D) | 65 | 56 | 48 |

TABLE II-6

Composition of Cover

| | A | B | C | D |
|---|---|---|---|---|
| Elastollan NY82A | 100 | — | — | — |
| Elastollan NY85A | — | 50 | — | — |
| Elastollan NY90A | — | 50 | — | — |
| Elastollan NY97A | — | — | 100 | — |
| Surlyn 8945 | — | — | — | 40 |
| Himilan AM7329 | — | — | — | 55 |
| Rabalon T3221C | — | — | — | 5 |
| TINUVIN 770 | 0.2 | 0.2 | 0.2 | 0.2 |
| Titanium dioxide | 4 | 4 | 4 | 4 |
| Ultramarine blue | 0.04 | 0.04 | 0.04 | 0.04 |
| Hardness Hc (Shore D) | 29 | 36 | 47 | 60 |

TABLE II-7

Hardness of Core

| | Comp. Ex. II-1 | Ex. II-2 | Ex. II-3 | Ex. II-1 | Ex. II-4 |
|---|---|---|---|---|---|
| H(0.0) | 64.0 | 63.5 | 60.0 | 55.5 | 55.0 |
| H(12.5) | 67.0 | 67.0 | 62.0 | 61.0 | 61.0 |
| H(25.0) | 67.5 | 67.5 | 65.0 | 65.0 | 64.0 |
| H(37.5) | 68.0 | 68.5 | 69.0 | 70.0 | 69.0 |
| H(45.0) | 69.0 | 69.5 | 72.0 | 73.0 | 70.0 |
| H(50.0) | 77.0 | 77.0 | 77.0 | 77.0 | 77.0 |
| H(62.5) | 82.0 | 82.0 | 82.0 | 82.0 | 82.0 |
| H(75.0) | 83.0 | 83.0 | 83.0 | 83.0 | 83.0 |
| H(87.5) | 84.0 | 84.0 | 84.0 | 84.0 | 84.0 |
| Hs | 89.0 | 89.0 | 89.0 | 89.0 | 89.0 |
| Hs − H(0.0) | 25.0 | 25.5 | 29.0 | 33.5 | 34.0 |

TABLE II-8

Hardness of Core

|  | Ex. II-5 | Ex. II-6 | Ex. II-7 | Ex. II-8 | Ex. II-9 |
|---|---|---|---|---|---|
| H(0.0) | 55.0 | 55.0 | 56.0 | 56.5 | 57.0 |
| H(12.5) | 61.0 | 61.0 | 61.0 | 61.0 | 61.0 |
| H(25.0) | 64.0 | 63.0 | 65.0 | 65.0 | 66.0 |
| H(37.5) | 67.0 | 64.0 | 70.0 | 69.5 | 70.0 |
| H(45.0) | 68.0 | 65.0 | 73.0 | 72.0 | 72.0 |
| H(50.0) | 77.0 | 77.0 | 77.0 | 77.0 | 77.0 |
| H(62.5) | 82.0 | 82.0 | 82.0 | 82.0 | 82.0 |
| H(75.0) | 83.0 | 83.0 | 83.0 | 83.0 | 83.0 |
| H(87.5) | 84.0 | 84.0 | 84.0 | 84.0 | 84.0 |
| Hs | 89.0 | 89.0 | 89.0 | 89.0 | 89.0 |
| Hs − H(0.0) | 34.0 | 34.0 | 33.0 | 32.5 | 32.0 |

TABLE II-9

Hardness of Core

|  | Ex. II-10 | Ex. II-11 | Ex. II-12 | Ex. II-13 | Ex. II-14 |
|---|---|---|---|---|---|
| H(0.0) | 58.5 | 56.0 | 55.5 | 55.5 | 55.5 |
| H(12.5) | 61.0 | 60.5 | 60.5 | 61.0 | 61.0 |
| H(25.0) | 64.5 | 65.0 | 65.0 | 65.0 | 65.0 |
| H(37.5) | 70.0 | 70.0 | 70.0 | 70.0 | 70.0 |
| H(45.0) | 71.0 | 73.0 | 73.0 | 73.0 | 73.0 |
| H(50.0) | 77.0 | 77.0 | 77.0 | 77.0 | 78.0 |
| H(62.5) | 82.0 | 82.0 | 82.0 | 82.0 | 83.0 |
| H(75.0) | 83.0 | 83.0 | 83.0 | 83.0 | 84.0 |
| H(87.5) | 84.0 | 84.0 | 84.0 | 84.0 | 85.0 |
| Hs | 89.0 | 89.0 | 89.0 | 89.0 | 90.0 |
| Hs − H(0.0) | 30.5 | 33.0 | 33.0 | 33.5 | 34.5 |

TABLE II-10

Hardness of Core

|  | Ex. II-15 | Ex. II-16 | Comp. Ex. II-2 | Ex. II-17 |
|---|---|---|---|---|
| H(0.0) | 55.5 | 55.5 | 55.5 | 55.5 |
| H(12.5) | 61.0 | 61.0 | 61.0 | 61.0 |
| H(25.0) | 65.0 | 65.0 | 65.0 | 65.0 |
| H(37.5) | 70.0 | 70.0 | 70.0 | 70.0 |
| H(45.0) | 73.0 | 73.0 | 73.0 | 73.0 |
| H(50.0) | 77.0 | 77.0 | 76.0 | 76.0 |
| H(62.5) | 82.0 | 82.0 | 81.0 | 81.0 |
| H(75.0) | 83.0 | 83.0 | 82.0 | 82.0 |
| H(87.5) | 84.0 | 84.0 | 83.0 | 83.0 |
| Hs | 89.0 | 89.0 | 88.0 | 88.0 |
| Hs − H(0.0) | 33.5 | 33.5 | 32.5 | 32.5 |

TABLE II-11

Hardness of Core

|  | Ex. II-18 | Ex. II-19 | Ex. II-20 | Ex. II-21 |
|---|---|---|---|---|
| H(0.0) | 55.5 | 55.5 | 55.5 | 55.5 |
| H(12.5) | 61.0 | 65.0 | 60.0 | 60.0 |
| H(25.0) | 65.0 | 70.0 | 63.0 | 63.0 |
| H(37.5) | 70.0 | 77.0 | 65.0 | 66.0 |
| H(45.0) | 73.0 | 78.0 | 70.0 | 69.0 |
| H(50.0) | 76.0 | 80.0 | 73.0 | 71.0 |
| H(62.5) | 81.0 | 82.0 | 77.0 | 73.0 |
| H(75.0) | 82.0 | 84.0 | 82.5 | 79.0 |
| H(87.5) | 83.0 | 87.0 | 86.0 | 85.0 |
| Hs | 88.0 | 89.0 | 89.0 | 89.0 |
| Hs − H(0.0) | 32.5 | 33.5 | 33.5 | 33.5 |

TABLE II-12

Results of Evaluation

|  | Comp. Ex. II-1 | Ex. II-2 | Ex. II-3 | Ex. II-1 | Ex. II-4 |
|---|---|---|---|---|---|
| Center |  |  |  |  |  |
| Composition | 1 | 2 | 3 | 4 | 5 |
| Acid/salt (PHR) | 0.0 | 0.5 | 2.0 | 5.0 | 10.0 |
| Diameter (mm) | 18 | 18 | 18 | 18 | 18 |
| Envelope layer |  |  |  |  |  |
| Composition | 16 | 16 | 16 | 16 | 16 |
| Thickness (mm) | 10.75 | 10.75 | 10.75 | 10.75 | 10.75 |
| Core |  |  |  |  |  |
| Diameter (mm) | 39.5 | 39.5 | 39.5 | 39.5 | 39.5 |
| Mid layer |  |  |  |  |  |
| Composition | a | a | a | a | a |
| Hardness Hm | 65 | 65 | 65 | 65 | 65 |
| Thickness Tm (mm) | 1.1 | 1.1 | 1.1 | 1.1 | 1.1 |
| Cover |  |  |  |  |  |
| Composition | A | A | A | A | A |
| Hardness Hc | 29 | 29 | 29 | 29 | 29 |
| Thickness Tc (mm) | 0.5 | 0.5 | 0.5 | 0.5 | 0.5 |
| Ball |  |  |  |  |  |
| Hm − Hc | 36 | 36 | 36 | 36 | 36 |
| Comp'n (mm) | 2.6 | 2.6 | 2.6 | 2.6 | 2.6 |
| W#1 spin (rpm) | 3250 | 3150 | 3100 | 3000 | 3050 |
| W#1 flight distance (m) | 233 | 237 | 239 | 241 | 240 |
| SW spin (rpm) | 6700 | 6700 | 6700 | 6650 | 6650 |
| Durability | 100 | 108 | 112 | 117 | 115 |
| Fell at impact | C | B | A | A | A |

TABLE II-13

Results of Evaluation

|  | Ex. II-5 | Ex. II-6 | Ex. II-7 | Ex. II-8 | Ex. II-9 |
|---|---|---|---|---|---|
| Center |  |  |  |  |  |
| Composition | 6 | 7 | 8 | 9 | 10 |
| Acid/salt (PHR) | 30.0 | 45.0 | 10.0 | 20.0 | 5.0 |
| Diameter (mm) | 18 | 18 | 18 | 18 | 18 |
| Envelope layer |  |  |  |  |  |
| Composition | 16 | 16 | 16 | 16 | 16 |
| Thickness (mm) | 10.75 | 10.75 | 10.75 | 10.75 | 10.75 |
| Core |  |  |  |  |  |
| Diameter (mm) | 39.5 | 39.5 | 39.5 | 39.5 | 39.5 |
| Mid layer |  |  |  |  |  |
| Composition | a | a | a | a | a |
| Hardness Hm | 65 | 65 | 65 | 65 | 65 |
| Thickness Tm (mm) | 1.1 | 1.1 | 1.1 | 1.1 | 1.1 |
| Cover |  |  |  |  |  |
| Composition | A | A | A | A | A |
| Hardness Hc | 29 | 29 | 29 | 29 | 29 |
| Thickness Tc (mm) | 0.5 | 0.5 | 0.5 | 0.5 | 0.5 |
| Ball |  |  |  |  |  |
| Hm − Hc | 36 | 36 | 36 | 36 | 36 |
| Comp'n (mm) | 2.6 | 2.6 | 2.6 | 2.6 | 2.6 |
| W#1 spin (rpm) | 3050 | 3150 | 3000 | 3050 | 3100 |
| W#1 flight distance (m) | 239 | 237 | 241 | 240 | 238 |
| SW spin (rpm) | 6650 | 6700 | 6650 | 6650 | 6700 |
| Durability | 114 | 110 | 115 | 112 | 114 |
| Fell at impact | A | B | A | A | A |

TABLE II-14

Results of Evaluation

|  | Ex. II-10 | Ex. II-11 | Ex. II-12 | Ex. II-13 | Ex. II-14 |
|---|---|---|---|---|---|
| Center |  |  |  |  |  |
| Composition | 11 | 12 | 13 | 4 | 4 |
| Acid/salt (PHR) | 10.0 | 5.0 | 5.0 | 5.0 | 5.0 |
| Diameter (mm) | 18 | 18 | 18 | 18 | 18 |
| Envelope layer |  |  |  |  |  |
| Composition | 16 | 16 | 16 | 16 | 18 |
| Thickness (mm) | 10.75 | 10.75 | 10.75 | 10.75 | 10.75 |
| Core |  |  |  |  |  |
| Diameter (mm) | 39.5 | 39.5 | 39.5 | 39.5 | 39.5 |
| Mid layer |  |  |  |  |  |
| Composition | a | a | a | b | c |
| Hardness Hm | 65 | 65 | 65 | 56 | 48 |
| Thickness Tm (mm) | 1.1 | 1.1 | 1.1 | 1.1 | 1.1 |
| Cover |  |  |  |  |  |
| Composition | A | A | A | A | A |
| Hardness Hc | 29 | 29 | 29 | 29 | 29 |
| Thickness Tc (mm) | 0.5 | 0.5 | 0.5 | 0.5 | 0.5 |
| Ball |  |  |  |  |  |
| Hm − Hc | 36 | 36 | 36 | 27 | 19 |
| Comp'n (mm) | 2.6 | 2.6 | 2.6 | 2.7 | 2.6 |
| W#1 spin (rpm) | 3100 | 3050 | 3000 | 3100 | 3150 |
| W#1 flight distance (m) | 237 | 240 | 241 | 239 | 237 |
| SW spin (rpm) | 6700 | 6650 | 6650 | 6750 | 6800 |
| Durability | 113 | 116 | 118 | 119 | 122 |
| Fell at impact | A | A | A | A | A |

TABLE II-15

Results of Evaluation

|  | Ex. II-15 | Ex. II-16 | Comp. Ex. II-2 | Ex. II-17 |
|---|---|---|---|---|
| Center |  |  |  |  |
| Composition | 4 | 4 | 4 | 4 |
| Acid/salt (PHR) | 5.0 | 5.0 | 5.0 | 5.0 |
| Diameter (mm) | 18 | 18 | 18 | 18 |
| Envelope layer |  |  |  |  |
| Composition | 16 | 16 | 17 | 17 |
| Thickness (mm) | 10.75 | 10.75 | 10.75 | 10.15 |
| Core |  |  |  |  |
| Diameter (mm) | 39.5 | 39.5 | 39.5 | 38.3 |
| Mid layer |  |  |  |  |
| Composition | a | a | b | a |
| Hardness Hm | 65 | 65 | 56 | 65 |
| Thickness Tm (mm) | 1.1 | 1.1 | 1.1 | 1.1 |
| Cover |  |  |  |  |
| Composition | B | C | D | A |
| Hardness Hc | 36 | 47 | 60 | 29 |
| Thickness Tc (mm) | 0.5 | 0.5 | 0.5 | 1.1 |
| Ball |  |  |  |  |
| Hm − Hc | 29 | 18 | −4 | 36 |
| Comp'n (mm) | 2.6 | 2.6 | 2.6 | 2.6 |
| W#1 spin (rpm) | 2900 | 2850 | 2750 | 3150 |
| W#1 flight distance (m) | 244 | 245 | 247 | 237 |
| SW spin (rpm) | 6500 | 6350 | 5500 | 6850 |
| Durability | 114 | 107 | 102 | 122 |
| Fell at impact | A | B | C | A |

TABLE II-16

Results of Evaluation

|  | Ex. II-18 | Ex. II-19 | Ex. II-20 | Ex. 11-21 |
|---|---|---|---|---|
| Center |  |  |  |  |
| Composition | 4 | 14 | 15 | 15 |
| Acid/salt (PHR) | 5.0 | 5.0 | 5.0 | 5.0 |
| Diameter (mm) | 18 | 9 | 23 | 26 |
| Envelope layer |  |  |  |  |
| Composition | 17 | 16 | 16 | 16 |
| Thickness (mm) | 10.15 | 15.25 | 8.25 | 6.75 |
| Core |  |  |  |  |
| Diameter (mm) | 38.3 | 39.5 | 39.5 | 39.5 |
| Mid layer |  |  |  |  |
| Composition | a | a | a | a |
| Hardness Hm | 65 | 65 | 65 | 65 |
| Thickness Tm (mm) | 1.7 | 1.1 | 1.1 | 1.1 |
| Cover |  |  |  |  |
| Composition | A | A | A | A |
| Hardness Hc | 29 | 29 | 29 | 29 |
| Thickness Tc (mm) | 0.5 | 0.5 | 0.5 | 0.5 |
| Ball |  |  |  |  |
| Hm − Hc | 36 | 36 | 36 | 36 |
| Comp'n (mm) | 2.7 | 2.6 | 2.6 | 2.6 |
| W#1 spin (rpm) | 3050 | 3150 | 2900 | 2850 |
| W#1 flight distance (m) | 239 | 237 | 237 | 236 |
| SW spin (rpm) | 6650 | 6700 | 6600 | 6600 |
| Durability | 114 | 105 | 108 | 105 |
| Fell at impact | B | B | A | A |

As shown in Tables II-12 to II-16, the golf balls according to Examples are excellent in various performance characteristics. From the results of evaluation, advantages of the present invention are clear.

The golf ball according to the present invention can be used for playing golf on golf courses and practicing at driving ranges. The above descriptions are merely for illustrative examples, and various modifications can be made without departing from the principles of the present invention.

What is claimed is:

1. A golf ball comprising a core, a mid layer positioned outside the core, and a cover positioned outside the mid layer, wherein
   the core comprises a center and an envelope layer positioned outside the center,
   the center is formed by a first rubber composition being crosslinked,
   the first rubber composition includes:
   (a) a base rubber;
   (b) a co-crosslinking agent;
   (c) a crosslinking initiator; and
   (d) an acid and/or a salt,
   the co-crosslinking agent (b) is:
   (b1) an α,β-unsaturated carboxylic acid having 3 to 8 carbon atoms; or
   (b2) a metal salt of an α,β-unsaturated carboxylic acid having 3 to 8 carbon atoms,
   the acid and/or the salt (d) is an aromatic carboxylic acid with a carbon number equal to or greater than 5 but equal to or less than 8 and/or a salt thereof,
   the base rubber (a) is a polybutadiene,
   the envelope layer is formed by a second rubber composition being crosslinked wherein the second rubber composition includes a base rubber; a co-crosslinking agent; and a crosslinking initiator, wherein the second rubber composition of the envelope layer does not include the acid and/or the salt (d), a Shore D hardness Hm of the mid layer is greater than a Shore D hardness Hc of the cover, and wherein the acid and/or the salt (d) is not an α,β-unsaturated carboxylic acid having 3 to 8 carbon atoms; or a metal salt of an α,β-unsaturated carboxylic acid having 3 to 8 carbon atoms, wherein, when the distance from the core center to the core surface is divided at intervals of 12.5% of the distance so that ten points including the core central point and the core surface are included within the distance; and JIS-C hardness values at the points included in the center against the ratio (%) of the distance from the central point of the core to the radius of the core are plotted on a graph, then $R^2$ of a linear approximation curve of the graph obtained by a least-square method is equal to or greater than 0.95, the hardness linearly increases from a central point of the center toward a surface of the center, wherein the first rubber composition includes 0.2 parts by weight or greater but 0.7 parts by weight or less of the crosslinking initiator (c) per 100 parts by weight of the base rubber (a), and wherein the first rubber composition of the center, including the acid and/or the salt (d), forms the linear hardness distribution of the center.

2. The golf ball according to claim 1, wherein an amount of the acid and/or the salt (d) is equal to or greater than 1.0 parts by weight but less than 40 parts by weight, per 100 parts by weight of the base rubber (a).

3. The golf ball according to claim 1, wherein the difference (Hm-Hc) between the hardness Hm and the hardness Hc is equal to or greater than 18.

4. A golf ball comprising a core, a mid layer positioned outside the core, and a cover positioned outside the mid layer, wherein
the core comprises a center and an envelope layer positioned outside the center,
the center is formed by a first rubber composition being crosslinked,
the first rubber composition includes:
(a) a base rubber;
(b) a co-crosslinking agent;
(c) a crosslinking initiator; and
(d) an acid and/or a salt,
the co-crosslinking agent (b) is:
(b1) an α,β-unsaturated carboxylic acid having 3 to 8 carbon atoms; or
(b2) a metal salt of an 4-unsaturated carboxylic acid having 3 to 8 carbon atoms,
the acid and/or the salt (d) is a fatty acid with a carbon number equal to or greater than 1 but equal to or less than 8 and/or a salt thereof,
an amount of the acid and/or the salt (d) is equal to or greater than 1.0 parts by weight but less than 30 parts by weight, per 100 parts by weight of the base rubber (a),
the center has a diameter of 10 mm or greater but 25 mm or less, the envelope layer is formed by a second rubber composition being crosslinked wherein the second rubber composition includes a base rubber; a co-crosslinking agent; and a crosslinking initiator, wherein the second rubber composition of the envelope layer does not include the acid and/or the salt (d), a Shore D hardness Hm of the mid layer is greater than a Shore D hardness Hc of the cover, and wherein the acid and/or the salt (d) is not an α,β-unsaturated carboxylic acid having 3 to 8 carbon atoms; or a metal salt of an α,β-unsaturated carboxylic acid having 3 to 8 carbon atoms, wherein, when the distance from the core center to the core surface is divided at intervals of 12.5% of the distance so that ten points including the core central point and the core surface are included within the distance; and JIS-C hardness values at the points included in the center against the ratio (%) of the distance from the central point of the core to the radius of the core are plotted on a graph, then $R^2$ of a linear approximation curve of the graph obtained by a least-square method is equal to or greater than 0.95, a JIS-C hardness H(0) at the central point of the core is equal to or greater than 40 but equal to or less than 70, a JIS-C hardness Hs at the surface of the core is equal to or greater than 80 but equal to or less than 96, a difference (Hs−H(0)) between the surface hardness Hs and the central hardness H(0) is equal to or greater than 20 but equal to or less than 50, wherein the first rubber composition includes 0.2 parts by weight or greater but 0.7 parts by weight or less of the crosslinking initiator (c) per 100 parts by weight of the base rubber (a), and wherein the first rubber composition of the center, including the acid and/or the salt (d), forms the linear hardness distribution of the center.

5. The golf ball according to claim 4, wherein a difference (Hm−Hc) between the hardness Hm and the hardness Hc is equal to or greater than 18.

6. The golf ball according to claim 4, wherein the acid and/or the salt (d) is an octanoic acid and/or a salt thereof.

7. The golf ball according to claim 4, where the acid and/or the salt (d) is zinc octoate.

8. The golf ball according to claim 1, wherein the first rubber composition includes 15 parts by weight or greater but 50 parts by weight or less of the co-crosslinking agent (b) per 100 parts by weight of the base rubber (a).

9. The golf ball according to claim 4, wherein the first rubber composition includes 15 parts by weight or greater but 50 parts by weight or less of the co-crosslinking agent (b) per 100 parts by weight of the base rubber (a).

10. The golf ball according to claim 1, wherein the first rubber composition includes 0.05 parts by weight or greater but 5.0 parts by weight or less of an organic sulfur compound (e) per 100 parts by weight of the base rubber (a).

11. The golf ball according to claim 4, wherein the first rubber composition includes 0.05 parts by weight or greater but 5.0 parts by weight or less of an organic sulfur compound (e) per 100 parts by weight of the base rubber (a).

* * * * *